(12) United States Patent
Yamaguchi et al.

(10) Patent No.: US 12,433,183 B2
(45) Date of Patent: Oct. 7, 2025

(54) AGRICULTURAL ASSISTANCE SYSTEM, AGRICULTURAL MACHINE, AND AGRICULTURAL ASSISTANCE APPARATUS

(71) Applicant: KUBOTA CORPORATION, Osaka (JP)

(72) Inventors: Kotaro Yamaguchi, Sakai (JP); Ken Sakuta, Sakai (JP); Ryo Kuboshima, Sakai (JP); Kuya Kaihori, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 208 days.

(21) Appl. No.: 18/073,602

(22) Filed: Dec. 2, 2022

(65) Prior Publication Data

US 2023/0200282 A1 Jun. 29, 2023

(30) Foreign Application Priority Data

Dec. 28, 2021 (JP) .................................. 2021-214361

(51) Int. Cl.
*A01B 69/04* (2006.01)
*B62D 15/02* (2006.01)
(Continued)

(52) U.S. Cl.
CPC .......... *A01B 69/008* (2013.01); *B62D 15/025* (2013.01); *G05D 1/0274* (2013.01); *G05D 1/648* (2024.01)

(58) Field of Classification Search
CPC .. A01B 69/008; A01B 79/005; G05D 1/0088; G05D 1/0212; G05D 1/0219;
(Continued)

(56) References Cited

U.S. PATENT DOCUMENTS 6,128,574 A * 10/2000 Diekhans ............. G05D 1/0278
701/410
9,740,204 B2 8/2017 Yamamura et al.
(Continued)

FOREIGN PATENT DOCUMENTS

EP 3 900 507 A1 10/2021
JP 2009240221 A * 10/2009 ............. A01B 63/08
(Continued)

OTHER PUBLICATIONS

Ikegami, Seiichi et al., "The Kubota's New 'Bi-Speed Turn' Mechanism", SAE Paper 901630, SAE Transactions, vol. 99, Section 2: Journal of Commercial Vehicles (1990), pp. 516-523 (Year: 1990).*
(Continued)

Primary Examiner — David A Testardi
(74) Attorney, Agent, or Firm — Keating & Bennett, LLP

(57) ABSTRACT

An agricultural assistance system includes a route creator to create, on a map representing an agricultural field, a travel route along which an agricultural machine travels, an input to receive input of a turn mode which is one of turn modes differing in terms of how a traveling device of the agricultural machine is driven, a position detector to detect a position of the agricultural machine, an automatic operation controller to perform automatic operation in which the automatic operation controller automatically causes the agricultural machine to travel and automatically steers the agricultural machine, and a turn mode changer to, during automatic operation of the agricultural machine, allow the input to receive input of another turn mode to change the turn mode, and output, to the automatic operation controller, a change command to cause the agricultural machine to turn in the other turn mode inputted via the input.

10 Claims, 31 Drawing Sheets

(51) Int. Cl.
G05D 1/00 (2006.01)
G05D 1/648 (2024.01)

(58) Field of Classification Search
CPC .......... G05D 2201/0201; G05D 1/648; B62D 15/025; A01D 41/127
See application file for complete search history.

(56) References Cited

U.S. PATENT DOCUMENTS

| | | | |
|---|---|---|---|
| 2017/0144702 A1* | 5/2017 | Dang | B62D 6/001 |
| 2017/0168501 A1 | 6/2017 | Ogura et al. | |
| 2017/0367252 A1* | 12/2017 | Sakaguchi | A01B 69/008 |
| 2018/0209799 A1* | 7/2018 | Uoya | G05D 1/0212 |
| 2018/0338407 A1* | 11/2018 | Matsuzaki | B60T 7/18 |
| 2019/0033881 A1* | 1/2019 | Iwami | G01S 19/14 |
| 2019/0071115 A1* | 3/2019 | Brooks | B62D 7/1509 |
| 2019/0313567 A1* | 10/2019 | Tanaka | A01C 11/02 |
| 2020/0033143 A1* | 1/2020 | Hiramatsu | G05D 1/228 |
| 2020/0064144 A1* | 2/2020 | Tomita | A01B 79/005 |
| 2021/0191408 A1* | 6/2021 | Hayashida | G05D 1/648 |
| 2021/0389771 A1* | 12/2021 | Nishii | G05D 1/0214 |
| 2021/0397189 A1* | 12/2021 | Takase | G05D 1/0094 |
| 2021/0397190 A1* | 12/2021 | Takase | G05D 1/0212 |
| 2023/0320246 A1* | 10/2023 | Kodama | A01B 76/00 701/26 |

FOREIGN PATENT DOCUMENTS

| | | | | |
|---|---|---|---|---|
| JP | 2009240222 A | * | 10/2009 | .......... A01B 63/08 |
| JP | 2009240223 A | * | 10/2009 | .......... A01B 63/08 |
| JP | 2016007196 A | * | 1/2016 | |
| JP | 2018-39 A | | 1/2018 | |
| JP | 2018000156 A | * | 1/2018 | |
| JP | 2018117558 A | * | 8/2018 | .......... A01B 69/008 |
| JP | 2018-198552 A | | 12/2018 | |
| JP | 2019049896 A | * | 3/2019 | |
| JP | 2019168812 A | * | 10/2019 | |
| JP | 2019208424 A | * | 12/2019 | |
| JP | 2020080175 A | * | 5/2020 | .......... H01L 21/316 |
| JP | 2020113325 A | * | 7/2020 | |
| JP | 2020162281 A | * | 10/2020 | |
| JP | 2020162282 A | * | 10/2020 | |
| JP | 2021078440 A | * | 5/2021 | .......... A01B 69/008 |
| JP | 2021078467 A | * | 5/2021 | |
| JP | 2022052261 A | * | 4/2022 | .......... A01B 69/008 |
| WO | WO-2017159801 A1 | * | 9/2017 | .......... A01B 69/008 |
| WO | WO-2018047500 A1 | * | 3/2018 | ............ A01B 69/00 |
| WO | WO-2020129684 A1 | * | 6/2020 | .......... A01B 69/008 |
| WO | WO-2020129704 A1 | * | 6/2020 | .......... A01B 69/008 |

OTHER PUBLICATIONS

EPO machine translation of JP 2020-113325A (original JP document published Jul. 27, 2020) (Year: 2020).*
EPO machine translation of JP 2020-162281A (original JP document published Oct. 1, 2020) (Year: 2020).*
Wikipedia article, Differential (mechanical device), Old revision dated Nov. 19, 2021, 9 pages (Year: 2021).*
Official Communication issued in corresponding Japanese Patent Application No. 2021-214361, mailed on Jul. 2, 2024, 3 pages.
Official Communication issued in corresponding European Patent Application No. 22210214.7, mailed on May 31, 2023.

* cited by examiner

AGRICULTURAL ASSISTANCE SYSTEM, AGRICULTURAL MACHINE, AND AGRICULTURAL ASSISTANCE APPARATUS

CROSS REFERENCE TO RELATED APPLICATIONS

This application claims the benefit of priority to Japanese Patent Application No. 2021-214361 filed on Dec. 28, 2021. The entire contents of this application are hereby incorporated herein by reference.

BACKGROUND OF THE INVENTION

1. Field of the Invention

The present invention relates to an agricultural assistance system and an agricultural assistance apparatus each of which provides assistance in performing an agricultural job with an agricultural machine traveling over an agricultural field, and also relates to an agricultural machine.

2. Description of the Related Art

Japanese Unexamined Patent Application Publication No. 2018-39 discloses a technique to provide assistance in performing an agricultural job with a working device linked to an agricultural machine while causing the agricultural machine to travel in automatic operation over an agricultural field. The agricultural machine disclosed in Japanese Unexamined Patent Application Publication No. 2018-39 includes a controller which sets work/travel lines at predetermined intervals in the central portion of the agricultural field based on periphery position data of the agricultural field and the width of the agricultural machine and sets a turn line extending from the work end point of one of adjacent work/travel lines to the work start point of the other of the adjacent work/travel lines. The agricultural machine travels along the work/travel lines in automatic operation while the working device performs an agricultural job on the central portion of the agricultural field, and turns from one of adjacent work/travel lines toward the other of the adjacent work/travel lines.

An agricultural machine is capable of turning in two or more turn modes such as all-wheel-drive turn, double-speed turn, and automatic brake double-speed turn, as disclosed in, for example, Japanese Unexamined Patent Application Publication No. 2018-198552. The turn mode of the agricultural machine disclosed in Japanese Unexamined Patent Application Publication No. 2018-198552 can be changed by a driver operating a switch located in the vicinity of the steering wheel during automatic steering control in which the agricultural machine is steered automatically and is caused to travel manually.

SUMMARY OF THE INVENTION

To perform automatic operation of an agricultural machine, it is necessary to input various settings relating to the automatic operation one after another in advance, and the settings include the turn mode of the agricultural machine. Therefore, during the automatic operation of the agricultural machine, the agricultural machine turns in the pre-set turn mode. However, there may be cases in which the turn mode is desired to be changed during the automatic operation depending on the soil conditions and the like of the agricultural field. However, to change the turn mode during the automatic operation of the agricultural machine, it is necessary to stop the automatic operation and make various settings relating to the automatic operation all over again, and such operations are troublesome and inconvenient.

Preferred embodiments of the present invention provide improved convenience when the turn mode is changed during automatic operation of an agricultural machine.

Preferred embodiments of the present invention are described below.

An agricultural assistance system according to an aspect of a preferred embodiment of the present invention includes a route creator to create, on a map representing an agricultural field, a travel route along which an agricultural machine travels, an input to receive input of a turn mode which is one of turn modes differing in terms of how a traveling device of the agricultural machine is driven, a position detector to detect a position of the agricultural machine, an automatic operation controller to perform automatic operation of the agricultural machine based on the travel route created by the route creator, the turn mode inputted via the input, and the position of the agricultural machine detected by the position detector, and a turn mode changer to, during the automatic operation of the agricultural machine performed by the automatic operation controller, allow the input to receive input of another turn mode to change the turn mode to the other turn mode, the other turn mode being another of the turn modes, and output, to the automatic operation controller, a change command to cause the agricultural machine to turn in the other turn mode inputted via the input.

In an aspect of a preferred embodiment of the present invention, the automatic operation controller may be configured or programmed to, during the automatic operation of the agricultural machine, upon receipt of the change command from the turn mode changer, cause the agricultural machine to turn in the other turn mode indicated by the change command.

In an aspect of a preferred embodiment of the present invention, the turn mode changer may be configured or programmed to not allow the input to receive input of the other turn mode to change the turn mode to the other turn mode, while the agricultural machine is turning during the automatic operation of the agricultural machine performed by the automatic operation controller.

In an aspect of a preferred embodiment of the present invention, the turn mode changer may be configured or programmed to, upon receipt of input of the other turn mode by the input while the agricultural machine is turning during the automatic operation of the agricultural machine performed by the automatic operation controller, output, to the automatic operation controller, the change command to cause the agricultural machine to turn in the inputted other turn mode next time the agricultural machine turns.

In an aspect of a preferred embodiment of the present invention, the agricultural assistance system may further include an area definer to define, in the map, a first area and a second area located inward of the first area. The route creator may be configured or programmed to create work route portions in the first area and/or the second area, the work route portions being portions which are included in the travel route and along which an agricultural job is performed by a working device linked to the agricultural machine during travel of the agricultural machine. The turn mode changer may be configured or programmed to, during the automatic operation of the agricultural machine performed by the automatic operation controller based on the work route portions, not allow the input to receive input of the other turn mode to change the turn mode in which the agricultural machine turns from one of the work route portions toward another of the work route portions that is created in the first area.

In an aspect of a preferred embodiment of the present invention, the agricultural assistance system may further include an area definer to define, in the map, a first area and a second area located inward of the first area. The route creator may be configured or programmed to create work route portions in the first area and/or the second area, the work route portions being portions which are included in the travel route and along which an agricultural job is performed by a working device linked to the agricultural machine during travel of the agricultural machine. The turn mode changer may be configured or programmed such that, during the automatic operation of the agricultural machine performed by the automatic operation controller, if a turn dimension indicative of a size of a turn space for the agricultural machine to turn from one of the work route portions toward another of the work route portions that is created in the first area is equal to or greater than a predetermined threshold corresponding to the turn mode inputted via the input, the turn mode changer outputs, to the automatic operation controller, the change command to cause the agricultural machine to turn in the turn mode inputted via the input, and if the turn dimension is less than the threshold, the turn mode changer does not cause the agricultural machine to turn in the turn mode inputted via the input.

In an aspect of a preferred embodiment of the present invention, the turn mode in which the agricultural machine turns from the one of the work route portions toward the other of the work route portions that is created in the first area, the turn mode having been set before start of the automatic operation of the agricultural machine performed by the automatic operation controller, may be one of the turn modes that is with the smallest turning radius.

In an aspect of a preferred embodiment of the present invention, the agricultural machine may include a prime mover, a traveling device including front wheels and rear wheels, a transmission to transmit power from the prime mover to the traveling device and change a rotation speed of the front wheels and the rear wheels, and a brake to brake at least one of the front wheels and the rear wheels. The automatic operation controller may be configured or programmed to control the traveling device, the transmission, and the brake to cause the agricultural machine to turn in any of the turn modes at least including an all-wheel-drive turn, a double-speed turn, and an automatic brake double-speed turn, the all-wheel-drive turn being a mode in which the front wheels and the rear wheels are driven such that one of the front wheels and one of the rear wheels on outside of the turn are rotated at a higher speed than another of the front wheels and another of the rear wheels on inside of the turn, the double-speed turn being a mode in which the front wheels are rotated at a speed twice as fast as the rear wheels and the one of the front wheels and the one of the rear wheels on the outside of the turn are rotated at a higher speed than the other of the front wheels and the other of the rear wheels on the inside of the turn, the automatic brake double-speed turn being a mode in which the front wheels are rotated at a speed twice as fast as the rear wheels and the other of the rear wheels on the inside of the turn is braked by the brake. The input may be configured or programmed to receive input of the all-wheel-drive turn, the double-speed turn, or the automatic brake double-speed turn selectively as the turn mode.

In an aspect of a preferred embodiment of the present invention, the agricultural assistance system may further include a display to, during the automatic operation of the agricultural machine performed by the automatic operation controller, display the map, the travel route, the position of the agricultural machine, and the turn mode in which the agricultural machine turns.

An agricultural machine according to an aspect of a preferred embodiment of the present invention includes a vehicle body, a connector to link a working device to the vehicle body, a prime mover, a traveling device including front wheels and rear wheels to be driven to cause the vehicle body to travel, the front wheels supporting left and right front portions of the vehicle body, the rear wheels supporting left and right rear portions of the vehicle body, a transmission to transmit power from the prime mover to the traveling device and change a rotation speed of the front wheels and the rear wheels, a brake to brake at least one of the front wheels and the rear wheels, a route creator to create, on a map representing an agricultural field, a travel route along which the agricultural machine travels, an input to receive input of a turn mode which is one of turn modes differing in terms of how the traveling device is driven, a position detector to detect a position of the vehicle body, an automatic operation controller to perform automatic operation of the vehicle body based on the travel route created by the route creator, the turn mode inputted via the input, and the position of the vehicle body detected by the position detector, and a turn mode changer to, during the automatic operation of the agricultural machine performed by the automatic operation controller, allow the input to receive input of another turn mode to change the turn mode to the other turn mode, the other turn mode being another of the turn modes, and output, to the automatic operation controller, a change command to cause the vehicle body to turn in the other turn mode inputted via the input.

In an aspect of a preferred embodiment of the present invention, the automatic operation controller may be configured or programmed to, during the automatic operation of the vehicle body, upon receipt of the change command from the turn mode changer, cause the vehicle body to turn in the other turn mode indicated by the change command.

In an aspect of a preferred embodiment of the present invention, the agricultural machine may further include a display to, during the automatic operation performed by the automatic operation controller, display the map, the travel route, the position of the vehicle body, and the turn mode in which the vehicle body turns.

An agricultural assistance apparatus according to an aspect of a preferred embodiment of the present invention includes a route creator to create, on a map representing an agricultural field, a travel route along which an agricultural machine travels, an input to receive input of a turn mode which is one of turn modes differing in terms of how a traveling device of the agricultural machine is driven, and a turn mode changer to change the turn mode, wherein the turn mode changer is configured or programmed to, during the automatic operation of the agricultural machine performed by the automatic operation controller based on the travel route created by the route creator, the turn mode inputted via the input, and a position of the agricultural machine detected by a position detector, allow the input to receive input of another turn mode to change the turn mode to the other turn mode, the other turn mode being another of the turn modes, and output, to the automatic operation controller, a change command to cause the agricultural machine to turn in the other turn mode inputted via the input.

In an aspect of a preferred embodiment of the present invention, the agricultural assistance apparatus may further include a display to, during the automatic operation of the agricultural machine performed by the automatic operation controller, display the map, the travel route, the position of the agricultural machine, and the turn mode in which the agricultural machine turns.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
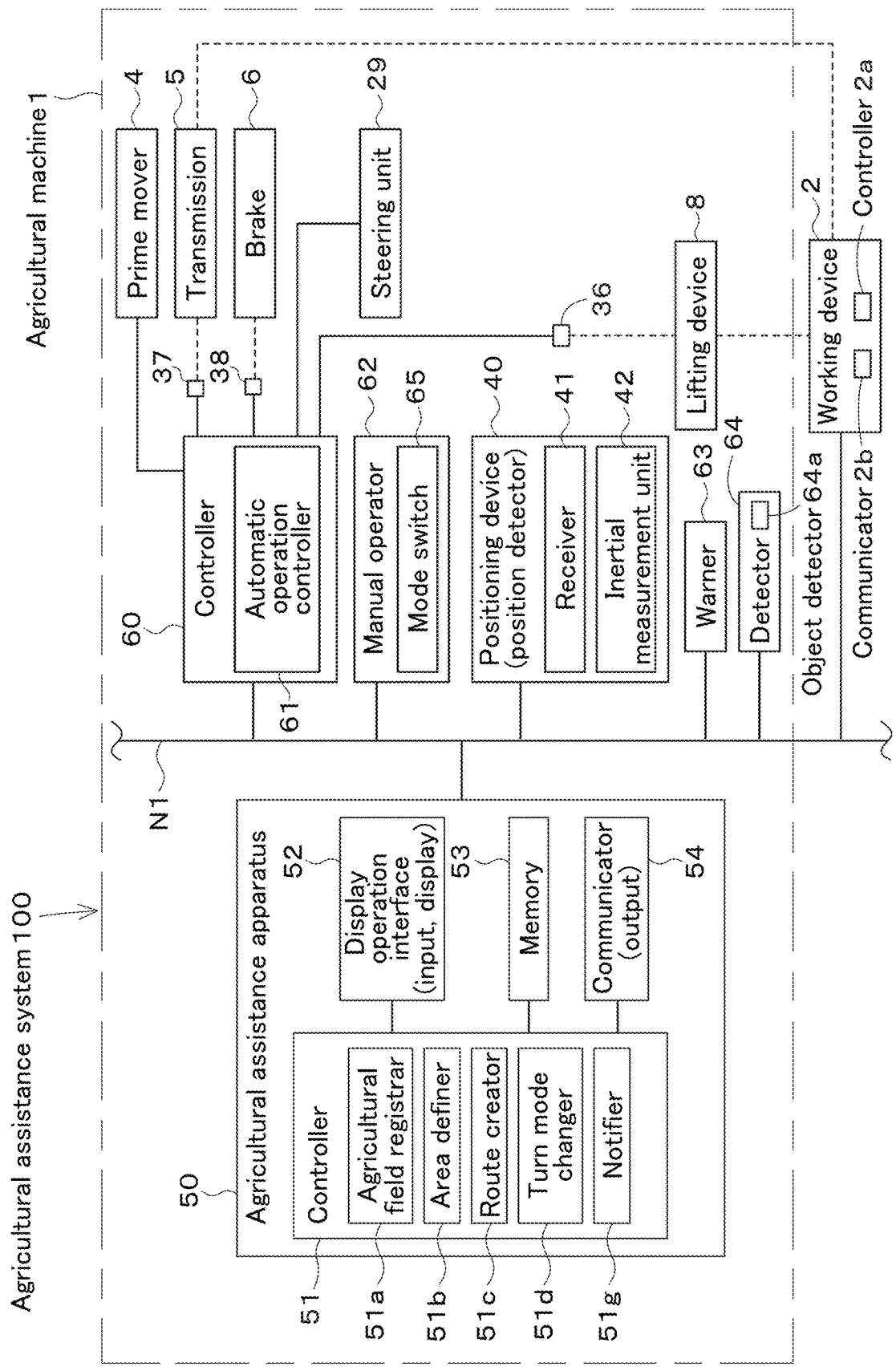
FIG. 1 is a block diagram of an agricultural assistance system.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses preferred embodiments of the present invention with reference to drawings.

Figure 18:
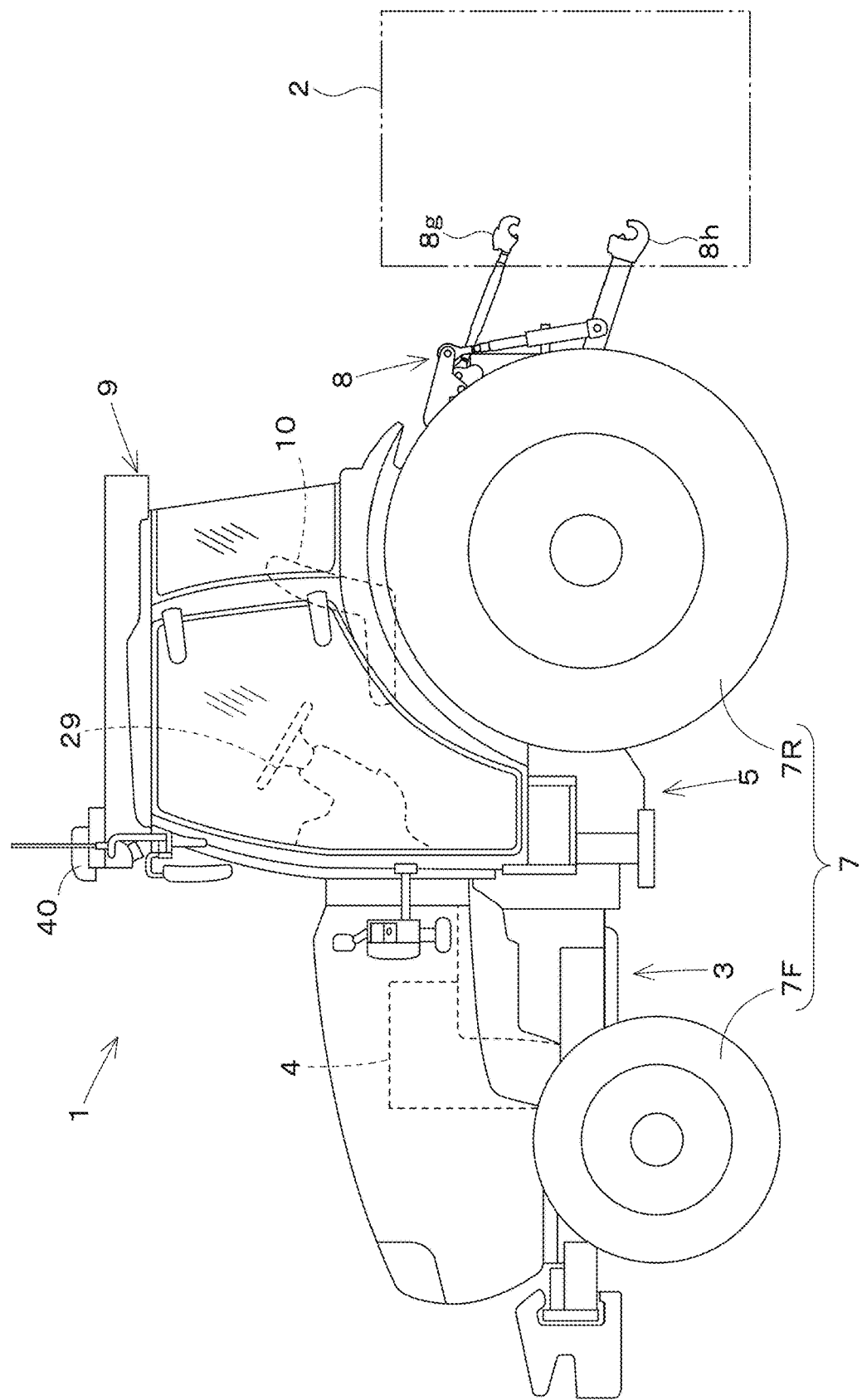
FIG. 18 is a side view of an agricultural machine.

First, an agricultural machine 1 according to the present preferred embodiment is discussed. FIG. 18 is a side view of the agricultural machine 1. The agricultural machine 1 is a tractor. Note that the agricultural machine 1 is not limited to a tractor, and may be, for example, some other agricultural machine such as a rice transplanter or a combine, a working vehicle which performs agricultural jobs other than the tractor, or the like.

The agricultural machine 1 includes a traveling vehicle body 3, a prime mover 4, a transmission 5, and a traveling device 7. The traveling device 7 includes a pair of left and right front wheels 7F and a pair of left and right rear wheels 7R. The front wheels 7F support left and right front portions of the traveling vehicle body 3, and the rear wheels 7R support left and right rear portions of the traveling vehicle body 3. The front wheels 7F may be tire wheels or crawler wheel(s). The rear wheels 7R may also be tire wheels or crawler wheel(s). The prime mover 4 is a diesel engine, an electric motor, and/or the like. In the present preferred embodiment, the prime mover 4 is a diesel engine. The transmission 5 is capable of changing the propelling force of the traveling device 7 by changing speed stages, and is also capable of switching between forward travel and rearward travel of the traveling device 7. The driving force from the prime mover 4 is transmitted to the traveling device 7 via the transmission 5 to drive the traveling device 7, causing the traveling vehicle body 3 to travel forward or rearward. Note that the left side of FIG. 18 corresponds to the front of the traveling vehicle body 3, and the right side of FIG. 18 corresponds to the rear of the traveling vehicle body 3. The far side in FIG. 18 corresponds to the right side of the traveling vehicle body 3, and the near side in FIG. 18 corresponds to the left side of the traveling vehicle body 3.

The traveling vehicle body 3 is provided with a cabin 9. The cabin 9 is provided with an operator's seat 10 therein. The traveling vehicle body 3 is provided, at the rear thereof, a lifting device 8 which is a three-point linkage and/or the like. The lifting device 8 includes connectors 8g and 8h to which a working device 2 to perform an agricultural job can be connected. When the working device 2 is connected to the connectors 8g and 8h, the working device 2 and the traveling vehicle body 3 (agricultural machine 1) are linked together to allow the traveling vehicle body 3 to tow the working device 2.

The working device 2 does ground work (work may be hereinafter referred to as a "job") on an agricultural field. Examples of the working device 2 include tillers (rotary tillers) for tilling in an agricultural field, stubble cultivators for stubble cultivation, harrows for puddling, spreaders for spreading fertilizer, agricultural chemicals, and/or the like, seeders for seeding, transplanters for transplanting seedlings, and harvesters for harvesting.

Next, an agricultural assistance system 100 according to the present preferred embodiment is discussed. FIG. 1 is a block diagram of the agricultural assistance system 100. The agricultural assistance system 100 includes an agricultural assistance apparatus 50. The agricultural assistance system 100 and the agricultural assistance apparatus 50 provide assistance in performing an agricultural job with the working device 2 while causing the agricultural machine 1 to travel in an agricultural field.

The agricultural machine 1 includes a controller 60, a manual operator 62, the prime mover 4, the transmission 5, a brake 6, a steering unit 29, the lifting device 8, a positioning device 40, a warner 63, and a detector 64. On the agricultural machine 1, there is an in-vehicle network N1 such as local area network (LAN) or control area network (CAN). The controller 60, the manual operator 62, the positioning device 40, the warner 63, and the detector 64 are connected to the in-vehicle network N1. Such elements of the agricultural machine 1 are included in the agricultural assistance system 100.

The controller 60 includes an electric circuit including a central processing unit (CPU) (or a microcomputer) and one or more memories, and/or the like. Examples of the one or more memories of the controller 60 include volatile memories and nonvolatile memories. The controller 60 controls operation of the elements of the agricultural machine 1. The controller 60 includes an automatic operation controller 61 to control travel (including steering and changing speed) of the agricultural machine 1 and operation of the working device 2. The manual operator 62 includes switch(es), lever(s), pedal(s), other key(s), and/or the like that can be operated by a user (operator) such as a human operator seated on the operator's seat 10 or a worker in the vicinity of the agricultural machine 1. The manual operator 62 includes a mode switch 65. The mode switch 65 is operated to switch the agricultural machine 1 between different modes.

The prime mover 4 (engine) is controlled by the controller 60 in terms of driving, stopping, and rotation speed. The transmission 5 is connected to control valve(s) 37. The control valve 37 is a solenoid valve actuated based on a control signal sent from the controller 60. The control valve 37 is supplied with hydraulic fluid delivered by a hydraulic pump 33. The control valve 37 in FIG. 1 is represented by a single block, but a plurality of the control valves 37 may be provided depending on the number of hydraulic devices such as hydraulic clutch(es), hydraulic cylinder(s), and/or the like of the transmission 5.

The brake 6 is connected to control valve(s) 38. The control valve 38 is a solenoid valve actuated based on a control signal sent from the controller 60. The control valve 38 is supplied with hydraulic fluid delivered by the hydraulic pump 33. The automatic operation controller 61 actuates the brake 6 by electrically controlling the switching position and the opening of the control valve 38, thus braking the traveling vehicle body 3.

Figure 2:
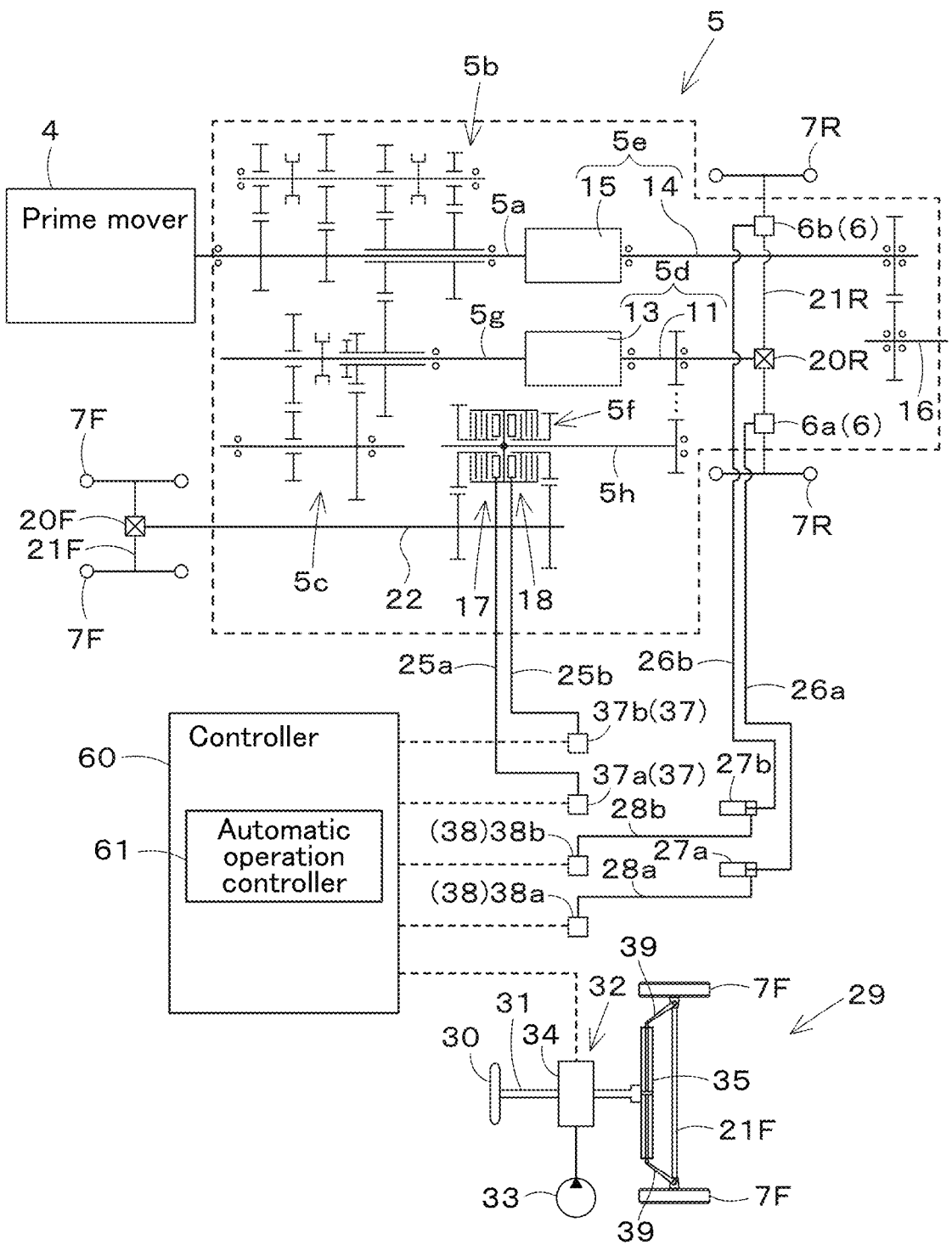
FIG. 2 illustrates details of a transmission, a brake, and a steering unit.

FIG. 2 illustrates details of the transmission 5, the brake 6, and the steering unit 29. The transmission 5 includes a propeller shaft (main shaft) 5a, a main transmission portion 5b, an auxiliary transmission portion 5c, a transmission shaft 5g, a shuttle portion 5d, a PTO power transmission portion 5e, a front transmission portion 5f, and/or the like. The propeller shaft 5a rotates in response to power transmitted from the crankshaft of the prime mover (engine) 4. The main transmission portion 5b includes gears and a shifter (not illustrated) used to change the connection (engagement) of the gears. The main transmission portion 5b changes the connection of the gears appropriately via the shifter to change the rotation speed of the propeller shaft 5a and change the magnitude of the torque (power) of the propeller shaft 5a.

The auxiliary transmission portion 5c includes gears and a shifter used to change the connection (engagement) of the gears, similarly to the main transmission portion 5b. The auxiliary transmission portion 5c changes the connection of the gears appropriately via the shifter to change the magnitude of the power received from the main transmission portion 5b. The transmission shaft 5g rotates in response to power transmitted from the auxiliary transmission portion 5c.

The shuttle portion 5d includes a shuttle shaft 11 and a forward/rearward travel switching portion 13. The shuttle shaft 11 receives power from the auxiliary transmission portion 5c via the transmission shaft 5g and the forward/rearward travel switching portion 13. The forward/rearward travel switching portion 13 includes a hydraulic clutch, for example. When the hydraulic clutch of the forward/rearward travel switching portion 13 is engaged or disengaged, the direction of rotation of the shuttle shaft 11 is changed, and therefore the direction of travel of the agricultural machine 1 is changed (changed to a forward or rearward direction). The shuttle shaft 11 is connected to a rear wheel differential 20R. The rear wheel differential 20R rotatably supports a rear axle 21R on which the rear wheels 7R are attached.

The PTO power transmission portion 5e includes a PTO propeller shaft 14 and a PTO clutch 15. The PTO propeller shaft 14 rotates in response to power transmitted from the propeller shaft 5a via the PTO clutch 15. The PTO propeller shaft 14 is connected to a PTO shaft 16 via gear(s) and the like. The PTO clutch 15 includes a hydraulic clutch, for example. The PTO clutch 15 is engaged or disengaged, thus switching between a state in which power from the propeller shaft 5a is transmitted to the PTO propeller shaft 14 and a state in which the power from the propeller shaft 5a is not transmitted to the PTO propeller shaft 14.

The front transmission portion 5f includes a first clutch 17 and a second clutch 18. The first clutch 17 and the second clutch 18 receive power from the shuttle shaft 11 via gear(s) and a power transmission shaft 5h. The power transmitted to the first clutch 17 and the second clutch 18 can be transmitted to a front axle 21F via a front power transmission shaft 22 and a front wheel differential 20F. The front power transmission shaft 22 is connected to the front wheel differential 20F. The front wheel differential 20F rotatably supports the front axle 21F on which the front wheels 7F are attached.

The first clutch 17 and the second clutch 18 each include a hydraulic clutch and/or the like. The first clutch 17 is connected to a fluid passage 25a, and the fluid passage 25a is connected to a first control valve 37a. The second clutch 18 is connected to a fluid passage 25b, and the fluid passage 25b is connected to a second control valve 37b. The first control valve 37a and the second control valve 37b are each a control valve 37 illustrated in FIG. 1. The control valves 37a and 37b each receive hydraulic fluid delivered by a hydraulic pump 33 of the agricultural machine 1 via fluid passage(s) (not illustrated).

The first control valve 37a and the second control valve 37b may each include, for example, a two-position switching valve with a solenoid valve. The controller 60 energizes or deenergizes the solenoid of the solenoid valve of the control valve 37a (37b) to bring the control valve 37a (37b) into a first position in which hydraulic fluid is supplied to the clutch 17 (18) via the fluid passage 25a (25b) or a second position in which hydraulic fluid is not supplied to the clutch 17 (18). The clutch 17 (18) is, for example, brought into its engaged state when supplied with hydraulic fluid from the control valve 37a (37b) via the fluid passage 25a (25b), and brought into its disengaged state when not supplied with hydraulic fluid. The controller 60 changes the positions of the control valve 37a (37b) to switch the clutch 17 (18) between the engaged state and the disengaged state. For another example, the control valves 37a and 37b may each include a solenoid proportional valve. In such a case, the controller 60 changes the opening of the control valve (solenoid proportional valve) 37a (37b) to switch the clutch 17 (18) between the engaged state and the disengaged state.

The rear axle 21R and the rear wheels 7R rotate in response to power (torque) transmitted from the shuttle shaft 11 to the rear axle 21R via the rear wheel differential 20R. The front axle 21F and the front wheels 7F rotate in response to power transmitted from the shuttle shaft 11 to the front axle 21F via the clutches 17 and 18, the front power transmission shaft 22, and the front wheel differential 20F. The drive state of the front wheels 7F relative to that of the rear wheels 7R changes depending on the state of the clutches 17 and 18.

Specifically, in the case where the first clutch 17 is disengaged and the second clutch 18 is engaged while the power from the shuttle shaft 11 is transmitted to the rear axle 21R, the power from the shuttle shaft 11 is transmitted to the front axle 21F via the second clutch 18, the front power transmission shaft 22, and the front wheel differential 20F. This results in the state in which the front wheels 7F and the rear wheels 7R are driven (four wheel drive) and the rotation speed of the front wheels 7F and the rotation speed of the rear wheels 7R are substantially the same (such a state is referred to as a four-wheel-drive-and-equal-speed state, or "4WD equal speed state").

In contrast, in the case where the first clutch 17 is engaged and the second clutch 18 is disengaged while the power from the shuttle shaft 11 is transmitted to the rear axle 21R, the power from the shuttle shaft 11 is transmitted to the front axle 21F via the first clutch 17, the front power transmission shaft 22, and the front wheel differential 20F. This results in the state in which the front wheels 7F and the rear wheels 7R are driven (four wheel drive) and the rotation speed of the front wheels 7F is higher than the rotation speed of the rear wheels 7R (such a state is referred to as a four-wheel-drive-and-speed-increasing state, or "4WD speed-increasing state").

In the case where both the first clutch 17 and the second clutch 18 are disengaged while the power from the shuttle shaft 11 is transmitted to the rear axle 21R, the power from the shuttle shaft 11 is not transmitted to the front axle 21F. This results in the state in which the front wheels 7F are not driven and only the rear wheels 7R are driven (such a state is referred to as a "two-wheel drive (2WD) state").

There is a left brake 6a on a left portion of the rear axle 21R, and there is a right brake 6b on a right portion of the rear axle 21R. The left brake 6a and the right brake 6b are each a disc brake included in the brake 6 (FIG. 1), and is switched between braking and non-braking states. There are a left brake pedal and a right brake pedal (not illustrated) in the vicinity of the operator's seat 10 (FIG. 18) of the agricultural machine 1. The left brake pedal is connected to a left connector 26a, and the right brake pedal is connected to a right connector 26b. The user (operator such as a driver) operates (depresses) the left brake pedal of the agricultural machine 1, thus moving the left connector 26a in the braking direction to bring the left brake 6a into the braking state. The user operates (depresses) the right brake pedal, thus moving the right connector 26b in the braking direction to bring the right brake 6b into the braking state.

The left connector 26a is connected to a left hydraulic actuator 27a, and the right connector 26b is connected to a right hydraulic actuator 27b. The left hydraulic actuator 27a and the right hydraulic actuator 27b each include a hydraulic cylinder. The left hydraulic actuator 27a is connected to a third control valve 38a via a fluid passage 28a, and the right hydraulic actuator 27b is connected to a fourth control valve 38b via a fluid passage 28b. The third control valve 38a and the fourth control valve 38b are each a control valve 38 illustrated in FIG. 1. Each of the control valves 38a and 38b is supplied with hydraulic fluid delivered by the hydraulic pump 33 via fluid passage(s) (not illustrated).

The third control valve 38a and the fourth control valve 38b each include, for example, a two-position switching valve with a solenoid valve. The controller 60 energizes or deenergizes the solenoid of the solenoid valve of the control valve 38a (38b) to bring the control valve 38a (38b) into a first position in which hydraulic fluid is supplied to the hydraulic actuator 27a (27b) via the fluid passage 28a (28b) or a second position in which hydraulic fluid is not supplied to the hydraulic actuator 27a (27b). The hydraulic fluid is supplied from the control valve 38a (38b) via the fluid passage 28a (28b) to the hydraulic actuator 27a (27b), so that the hydraulic actuator 27a (27b) is actuated, the connector 26a (26b) is moved in the braking direction, and the brake 6a (6b) is brought into the braking state.

As such, the left brake 6a and the right brake 6b can be caused to bring the left rear wheel 7R and the right rear wheel 7R into the braking state independently of each other, not only by a user operation of the left brake pedal and/or the right brake pedal but also by actuation of the third control valve 38a, the fourth control valve 38b, the left hydraulic actuator 27a, and/or the right hydraulic actuator 27b by the controller 60.

The automatic operation controller 61 illustrated in FIG. 1 controls driving of the transmission 5 by electrically controlling the switching position (opening) of the control valve(s) 37 (the first control valve 37a and the second control valve 37b). As described earlier, the transmission 5 transmits the driving force from the prime mover 4 to the traveling device 7 to actuate the traveling device 7, causing the traveling vehicle body 3 to travel forward or rearward. For example, when the working device 2 does ground work or the like, the transmission 5 transmits the driving force from the prime mover 4 to the working device 2. This increases the force to actuate the working device 2.

The automatic operation controller 61 communicates with the working device 2 via the in-vehicle network N1. Specifically, the working device 2 includes a controller 2a and a communicator 2b. The automatic operation controller 61 sends a work command to the working device 2 via the in-vehicle network N1. Upon receipt of the work command by the communicator 2b, the controller 2a of the working device 2 controls the operation of element(s) of the working device 2 according to the work command to cause the working device 2 to perform an agricultural job (ground work). The controller 2a transmits, to the controller 60, information or data indicative of the manner in which a job is performed and/or the like via the communicator 2b over the in-vehicle network N1. The automatic operation controller 61 detects the manner in which a job is performed by the working device 2 and/or the like based on the information or data received from the working device 2 via the in-vehicle network N1.

As illustrated in FIG. 2, the steering unit 29 includes a steering wheel 30, a steering shaft (rotary shaft) 31, and an assist mechanism (power steering mechanism) 32. The steering wheel 30 is provided inside the cabin 9 (FIG. 18). The steering shaft 31 rotates as the steering wheel 30 rotates. The assist mechanism 32 assists in performing steering using the steering wheel 30.

The assist mechanism 32 includes a control valve 34 and a steering cylinder 35. The control valve 34 is a solenoid valve actuated based on a control signal sent from the controller 60. Specifically, the control valve 34 is a three-way switching valve which achieves multi-position switching by movement of a spool or the like. The control valve 34 is supplied with hydraulic fluid delivered by the hydraulic pump 33. The controller 60 adjusts the hydraulic pressure applied to the steering cylinder 35 by electrically controlling the switching position and the opening of the control valve 34, thus causing the steering cylinder 35 to extend or retract. The steering cylinder 35 is connected to knuckle arms 39 to change the orientation of the front wheels 7F.

The switching position and the opening of the control valve 34 can also be controlled by rotating the steering shaft 31. Specifically, when the steering wheel 30 is rotated, the steering shaft 31 rotates according to how the steering wheel 30 is rotated, and the switching position and the opening of the control valve 34 are changed. The steering cylinder 35 extends or retracts leftward or rightward with respect to the traveling vehicle body 3 according to the switching position and the opening of the control valve 34. The extending/retracting movement of the steering cylinder 35 changes the direction in which the front wheels 7F are steered. Note that the above-described steering unit 29 is an example, and is not limited to the above-described configuration.

The traveling vehicle body 3 of the agricultural machine 1 can be steered manually by manual operation of the steering wheel 30 and can be steered automatically by the automatic operation controller 61. The transmission 5 or the brake 6 is actuated in response to the manual operation of an accelerator member (not illustrated) or a brake pedal (not illustrated) of the manual operator 62, thus causing the traveling vehicle body 3 to travel or stop. The traveling vehicle body 3 is also capable of traveling and stopping automatically in response to the control of the transmission 5 and the brake 6 by the automatic operation controller 61. That is, the agricultural machine 1 can operate in manual operation in which a user (driver) operates the agricultural machine 1 to travel and steers the agricultural machine 1, automatic operation in which the automatic operation controller 61 automatically operates the agricultural machine 1 to travel and steers the agricultural machine 1, and automatic steering control (also referred to as a "semi-automatic operation") in which the automatic operation controller 61 automatically steers the agricultural machine 1 and the user operates the agricultural machine 1 to travel.

The automatic operation controller 61 controls the traveling device 7, the transmission 5, and the brake 6 of the agricultural machine 1 to cause the agricultural machine 1 to turn in one of turn modes differing in terms of how the front wheels 7F and the rear wheels 7R of the traveling device 7 are driven. Specifically, the automatic operation controller 61 causes the agricultural machine 1 to turn in, for example, each of the following turn modes: "all-wheel-drive turn", "double-speed turn", and "automatic brake double-speed turn".

The "all-wheel-drive turn" refers to a mode in which power from the prime mover 4 is transmitted to the front wheels 7F and the rear wheels 7R via the transmission 5 to drive the front wheels 7F and the rear wheels 7R such that the front wheel 7F and the rear wheel 7R on the outside of the turn are rotated at a higher speed than the front wheel 7F and the rear wheel 7R on the inside of the turn, so that the agricultural machine 1 makes a turn.

The "double-speed turn" refers to a mode in which power from the prime mover 4 is transmitted to the front wheels 7F and the rear wheels 7R via the transmission 5 such that the front wheels 7F are rotated at a speed twice as fast as the rear wheels 7R and that the front wheel 7F and the rear wheel 7R on the outside of the turn are rotated at a higher speed than the front wheel 7F and the rear wheel 7R on the inside of the turn, so that the agricultural machine 1 makes a turn. The "all-wheel-drive turn" may also be referred to as "all-wheel-drive normal turn", and the "double-speed turn" may also be referred to as "all-wheel-drive double-speed turn".

The "automatic brake double-speed turn" refers to a mode in which power from the prime mover 4 is transmitted to the front wheels 7F and the rear wheels 7R via the transmission 5 such that the front wheels 7F are rotated at a speed twice as fast as the rear wheels 7R and that the rear wheel 7R on the inside of the turn is braked by the brake 6, so that the agricultural machine 1 makes a turn. The turning radius of the agricultural machine 1 decreases in the order of "all-wheel-drive turn", "double-speed turn", and then "automatic brake double-speed turn". The ability of the front wheels 7F and the rear wheels 7R to grip the road is greater in the case of the "automatic brake double-speed turn" than in the case of the "all-wheel-drive turn" or the "double-speed turn".

Figure 3:
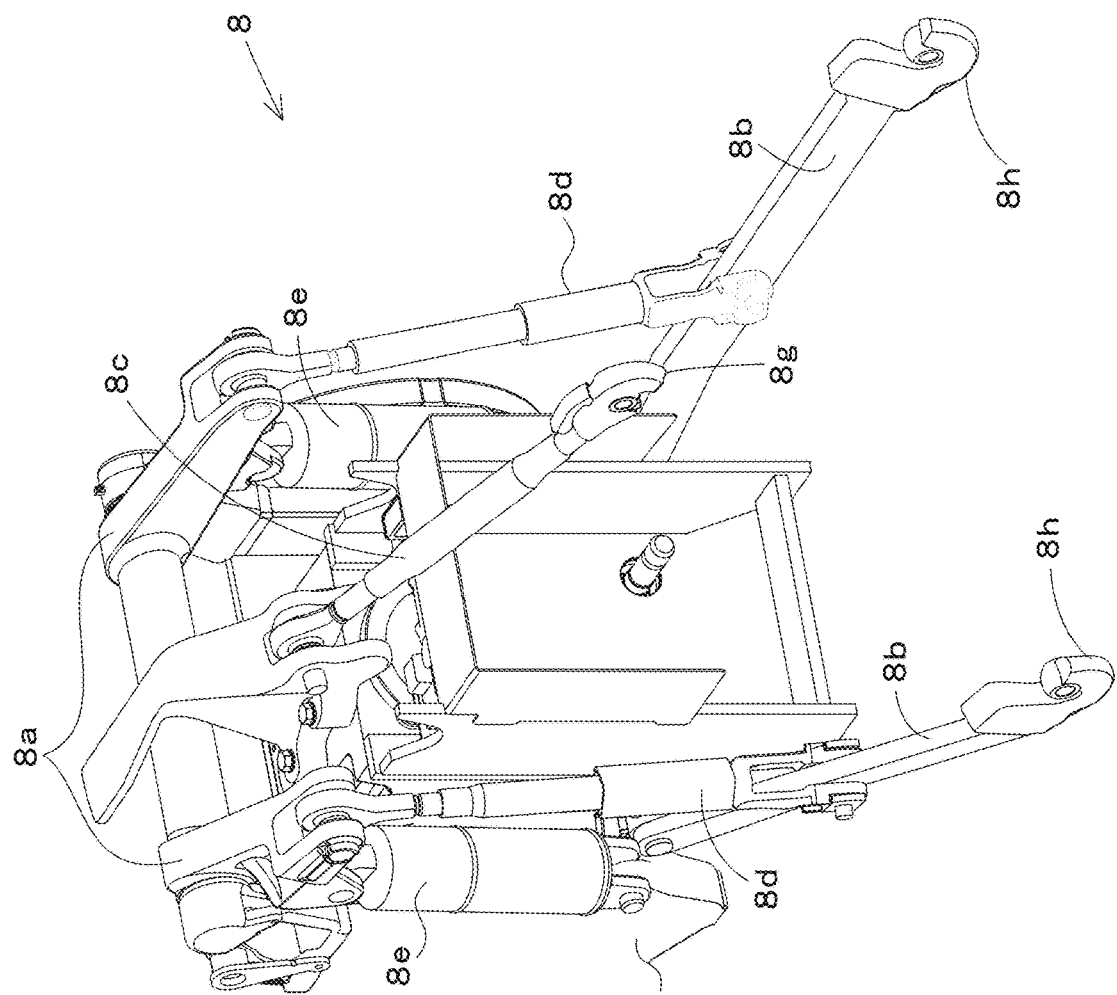
FIG. 3 is a perspective view of a lifting device.

FIG. 3 is a perspective view of the lifting device 8. The lifting device 8 includes one or more lift arms 8a, one or more lower links 8b, at least one top link 8c, one or more lift rods 8d, and one or more lift cylinders 8e. The front ends of the lift arms 8a are supported on an upper rear portion of a case (transmission case) housing the transmission 5 such that the lift arms 8a are swingable up and down. The lift arms 8a are driven by the lift cylinders 8e to swing (raised or lowered). The lift cylinders 8e are hydraulic cylinders. The lift cylinders 8e are connected to control valve(s) 36 (FIG. 1). The control valve 36 is a solenoid valve actuated based on a control signal sent from the controller 60. The control valve 36 is supplied with hydraulic fluid delivered by the hydraulic pump 33.

The front ends of the lower links 8b as illustrated in FIG. 3 are supported on a lower rear portion of the transmission 5 (FIGS. 1 and 18) such that the lower links 8b are swingable up and down. The front end of the top link 8c is supported, at a position higher than the lower links 8b, on a rear portion of the transmission 5 such that the top link 8c is swingable up and down. The lift rods 8d connect the lift arms 8a and the lower links 8b. The rear ends of the lower links 8b and the top link 8c are provided with the connectors 8g and 8h to which the working device 2 can be connected.

The automatic operation controller 61 (FIG. 1) adjusts hydraulic pressure applied to the lift cylinders 8e by electrically controlling the switching position and the opening of the control valve 36, thus causing the lift cylinders 8e to extend or retract. The extension or retraction of the lift cylinders 8e raises or lowers the lift arms 8a and raises or lowers the lower links 8b connected to the lift arms 8a via the lift rods 8d. With this, the working device 2 swings up or down (raised or lowered) about front portions of the lower links 8b (the opposite ends of the lower links 8b from the connectors 8g and 8h).

The positioning device 40 as illustrated in FIG. 1 includes a receiver 41 and an inertial measurement unit (IMU) 42. The receiver 41 receives satellite signal(s) (position(s) of positioning satellite(s), time of transmission, correction information, and/or the like) sent from a satellite positioning system (positioning satellite(s)) such as D-GPS, GPS, GLO-NASS, BeiDou, Galileo, and/or Michibiki. The positioning device 40 detects the current position (for example, latitude and longitude) based on the satellite signal(s) received at the receiver 41. That is, the positioning device 40 is a position detector to detect the position of the traveling vehicle body 3 of the agricultural machine 1. The inertial measurement unit 42 includes an acceleration sensor, a gyroscope sensor, and/or the like. The inertial measurement unit 42 detects the roll angle, pitch angle, yaw angle, and/or the like of the traveling vehicle body 3. The warner 63 includes a buzzer (beeper), a speaker, a warning lamp, and/or the like provided on the traveling vehicle body 3. The warner 63 provides a warning using sound and/or light to people in the vicinity of the traveling vehicle body 3.

The detector 64 includes sensor(s) and/or the like (which may include camera(s)) provided at some position(s) on the agricultural machine 1 and/or the working device 2. The detector 64 detects the operating states (driven or stopped state, current position, and/or the like) of respective elements of the agricultural machine 1 such as the transmission 5, the brake 6, the traveling device 7, the lifting device 8, the steering unit 29, and/or the manual operator 62 based on signal(s) outputted from the sensor(s) and/or the like. The detector 64 also detects the operating state of the working device 2 based on signal(s) outputted from the sensor(s) and/or the like. The detector 64 also includes an object detector 64a, laser sensor(s) such as LiDAR, ultrasonic sensor(s), and/or the like. The laser sensor(s), the ultrasonic sensor(s) and/or the like are located at the front, rear, left side, and/or right side of the traveling vehicle body 3. The object detector 64a detects the presence/absence of objects in the vicinity of the agricultural machine 1, the distance to an object, and/or the like based on signal(s) outputted from the laser sensor(s) and/or the ultrasonic sensor(s).

The agricultural assistance apparatus 50 includes, for example, a portable tablet terminal and/or the like. The agricultural assistance apparatus 50 is provided, for example, inside the cabin 9 of the agricultural machine 1, and is attachable to and detachable from the agricultural machine 1. That is, the agricultural machine 1 includes the agricultural assistance apparatus 50.

The agricultural assistance apparatus 50 includes a controller 51, a display operation interface 52, a memory 53, and a communicator 54. The controller 51 includes a CPU (or a microcomputer), one or more volatile memories, and one or more nonvolatile memories. The controller 51 controls elements of the agricultural assistance apparatus 50. The controller 51 includes an agricultural field registrar 51a, an area definer 51b, a route creator 51c, a turn mode changer 51d, and a notifier 51g. Such elements are software programs in the present example, but may alternatively be, for example, hardware such as semiconductor device(s) and/or electric circuit(s) (e.g., application specific integrated circuit(s) (ASIC)).

The display operation interface 52 includes a touchscreen and displays various types of information on the screen. It is also possible to perform various input operations by performing predetermined actions on the display screen of the display operation interface 52. The display operation interface 52 functions as a display and an input. The agricultural assistance apparatus 50 may include an independent display and an independent operation interface (input) instead of the display operation interface 52.

The memory 53 includes nonvolatile memory (memories) and/or the like. The memory 53 is a read/write memory which stores information and/or data for assisting the travel and work of the agricultural machine 1. The communicator 54 includes an interface for connection with the in-vehicle network N1. The controller 51 communicates with the controller 60, the manual operator 62, the positioning device 40, the warner 63, the detector 64, and the working device 2 through the communicator 54 via the in-vehicle network N1. The communicator 54 is an output to output information and/or data to the controller 60 of the agricultural machine 1.

The agricultural field registrar 51a registers information relating to agricultural field(s) in which agricultural job(s) is/are to be performed by the agricultural machine 1 and working device(s) 2. The area definer 51b defines predetermined area(s) in the agricultural field registered by the agricultural field registrar 51a. The route creator 51c creates a travel route to be traveled by the agricultural machine 1 in the agricultural field registered by the agricultural field registrar 51a.

The user performs predetermined operation(s) on the display operation interface 52 to selectively input the all-wheel-drive turn, the double-speed turn, or the automatic brake double-speed turn as the turn mode in which the agricultural machine 1 turns. During the automatic operation of the agricultural machine 1 performed by the automatic operation controller 61, the turn mode changer 51d allows (accepts) or does not allow (does not accept) input via the display operation interface 52 to change the turn mode, based on predetermined conditions. The turn mode changer 51d outputs, to the automatic operation controller 61, a change command to cause the agricultural machine 1 to turn in the turn mode inputted via the display operation interface 52. That is, the turn mode changer 51d changes the preset turn mode of the agricultural machine 1 to the turn mode inputted via the display operation interface 52. The notifier 51g provides a notification by causing the display operation interface 52 to display the content of certain information and/or data. The notifier 51g may provide a notification by outputting, via a speaker of the warner 63, sound indicative of the content of certain information and/or data.

Figure 4:
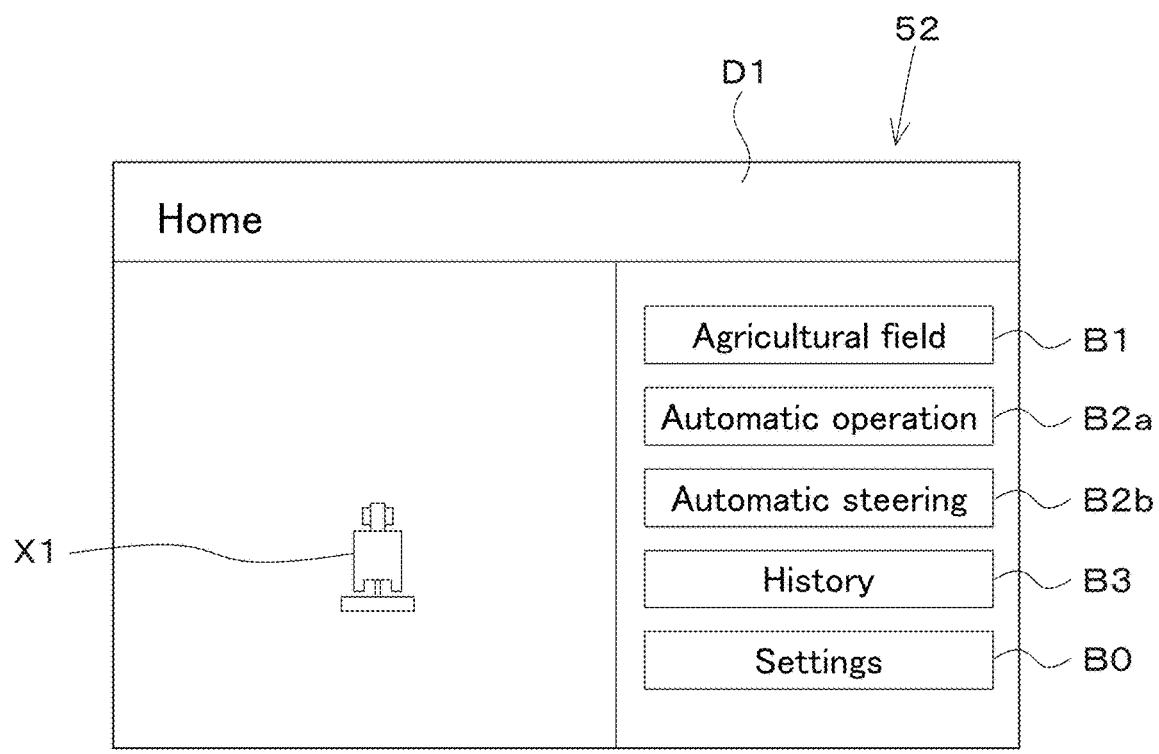
FIG. 4 illustrates an example of a home screen.

The following description discusses operation of elements of the agricultural assistance system 100. Upon startup of the agricultural assistance apparatus 50, the controller 51 causes the display operation interface 52 to display a home screen D1 as illustrated in FIG. 4. The data of the home screen D1 and data of screens described later are stored in the memory 53. The controller 51 reads the data from the memory 53 when needed, and causes the display operation interface 52 to display the screen based on the data.

The home screen D1 displays an agricultural machine symbol X1, an "agricultural field" key B1, an "automatic operation" key B2a, an "automatic steering" key B2b, a "history" key B3, and a "settings" key B0. The "settings" key B0 is used to make various settings. The "settings" key B0 is selected (tapped) to make settings and registration for certain items. Examples of the items include matters relating to the agricultural machine 1 provided with the agricultural assistance apparatus 50, a working device 2 linked to the agricultural machine 1, an agricultural job to be performed by the agricultural machine 1 and the working device 2, an agricultural field in which the agricultural job is to be performed, and the display operation interface 52.

The "history" key B3 is used to cause the history of job(s) performed by the agricultural machine 1 to be displayed. The "agricultural field" key B1 is used to register an agricultural field in which an agricultural job is performed by the agricultural machine 1. The "automatic operation" key B2a is used to make settings and estimation regarding an automatic traveling-and-working mode of the agricultural machine 1. The "automatic steering" key B2b is used to make settings and estimation regarding an automatic steering-and-working mode of the agricultural machine 1.

The automatic traveling-and-working mode is a mode in which the traveling vehicle body 3 of the agricultural machine 1 is caused to travel in automatic operation while the working device 2 is caused to perform an agricultural job (ground work). The automatic operation of the agricultural machine 1 indicates that the travel speed of the traveling vehicle body 3 is changed automatically and the traveling vehicle body 3 is steered automatically. The automatic steering-and-working mode is a mode in which the traveling vehicle body 3 is steered automatically while the working device 2 is caused to perform an agricultural job (ground work). When the agricultural machine 1 is in the automatic steering-and-working mode, the operator of the agricultural machine 1 operates the accelerator member or the brake member of the manual operator 62 (FIG. 1), so that the travel speed of the traveling vehicle body 3 is changed in response to the operation of the accelerator member or the brake member. That is, in the automatic steering-and-working mode, the travel speed of the traveling vehicle body 3 is changed based on manual operation.

Needless to say, it is also possible to cause the agricultural machine 1 to travel by manual operation, and possible, during the travel, to cause the working device 2 to do ground work. The manual operation of the agricultural machine 1 indicates that the operator operates the accelerator member or the brake member of the manual operator 62 to change the travel speed of the traveling vehicle body 3, and moves the steering wheel 30 (FIG. 2) to steer the traveling vehicle body 3.

Figure 5:
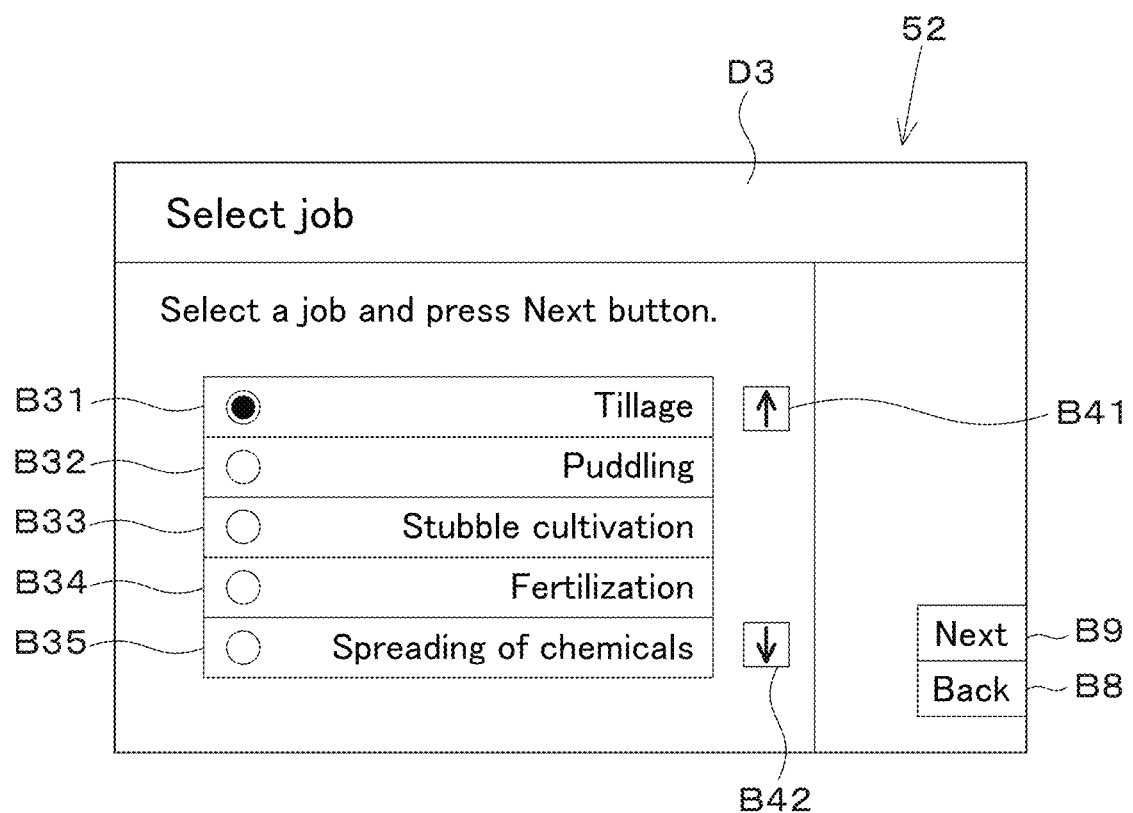
FIG. 5 illustrates an example of a "select job" screen.

Upon selection of the "agricultural field" key B1 by the user on the home screen D1 in FIG. 4, the controller 51 causes the display operation interface 52 to display an agricultural field registration screen (not illustrated). The user performs predetermined action(s) on the agricultural field registration screen to input agricultural field information such as the position, outline, identification information, and/or the like of an agricultural field. The controller 51 registers the agricultural field information inputted via the agricultural field registration screen by causing the memory 53 to store the agricultural field information in a predetermined area thereof. After the registration of the agricultural field information, upon selection of the "automatic operation" key B2a by the user on the home screen D1, the controller 51 causes the display operation interface 52 to display a "select job" screen D3 as illustrated in FIG. 5.

The "select job" screen D3 displays a message indicative of instructions for input operations. The "select job" screen D3 also displays job keys B31 to B35, an up-pointing arrow key B41, a down-pointing arrow key B42, a "next" key B9, and a "back" key B8. The job keys B31 to B35 indicate agricultural jobs that can be performed by the agricultural machine 1 and working device(s) 2 linked to the agricultural machine 1. In FIG. 5, five job keys B31, B32, B33, B34, and B35 are displayed. If the number of the agricultural jobs that can be performed by the agricultural machine 1 and the working device(s) 2 is six or more, the controller 51 causes job key(s) indicating another type(s) of job(s) to be displayed on the "select job" screen D3 upon selection of the up-pointing arrow key B41 or the down-pointing arrow key B42 by the user.

Figure 6A:
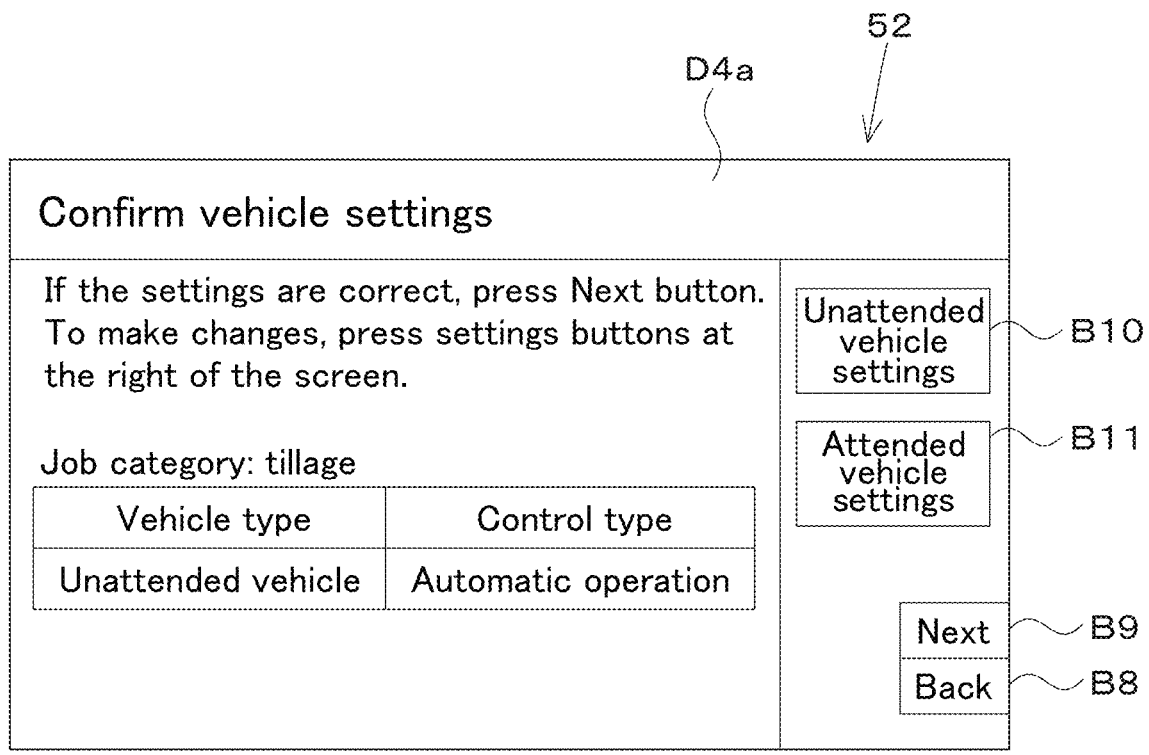
FIG. 6A illustrates an example of a "confirm vehicle settings" screen.

Upon selection of any one of the job keys B31 to B35 by the user, the controller 51 causes the selected job key to be displayed on the "select job" screen D3 in a manner that differs from the other job keys. In the example in FIG. 5, only the selected job key ("tillage" key B31) is assigned a filled circle. Upon selection of the "next" key B9 by the user when any one of the job keys B31, B32, B33, and B34 is in the selected state, the controller 51 causes the display operation interface 52 to display a "confirm vehicle settings" screen D4a as illustrated in FIG. 6A. That is, the "next" key B9 is used to move from the current screen to the next screen on the display operation interface 52. Note that, upon selection of the "back" key B8 by the user, the controller 51 causes the display operation interface 52 to display the home screen D1 as illustrated in FIG. 4. That is, the "back" key B8 is used to go back from the current screen to the previous screen on the display operation interface 52.

The "confirm vehicle settings" screen D4a as illustrated in FIG. 6A displays a message indicating instructions for input operations, the category of the agricultural job, the type of agricultural machine 1, an "unattended vehicle settings" key B10, an "attended vehicle settings" key B11, a "next" key B9, and a "back" key B8. The agricultural job selected on the "select job" screen D3 is displayed in the "job category" portion. The type of agricultural machine 1 includes vehicle type and control type. In FIG. 6A, the preregistered (preset) type of agricultural machine 1 is displayed on the "confirm vehicle settings" screen D4a.

Note that the user can input the type of agricultural machine 1 by, for example, selecting the "settings" key B0 on the home screen D1 (FIG. 4) and performing predetermined input operation(s) on the display operation interface 52. In so doing, the user can also input the specifications such as the name and/or the size of the agricultural machine 1 by performing predetermined input operation(s). Upon the user's further predetermined input operation(s), the controller 51 registers the inputted type and specifications of the agricultural machine 1 by causing the memory 53 to store them in a predetermined area thereof. It is also possible to input information about the agricultural machine 1 (described later) and information about the working device 2 (described later) and register (store) them in the memory 53 in the same manner starting from the home screen D1.

Figure 6B:
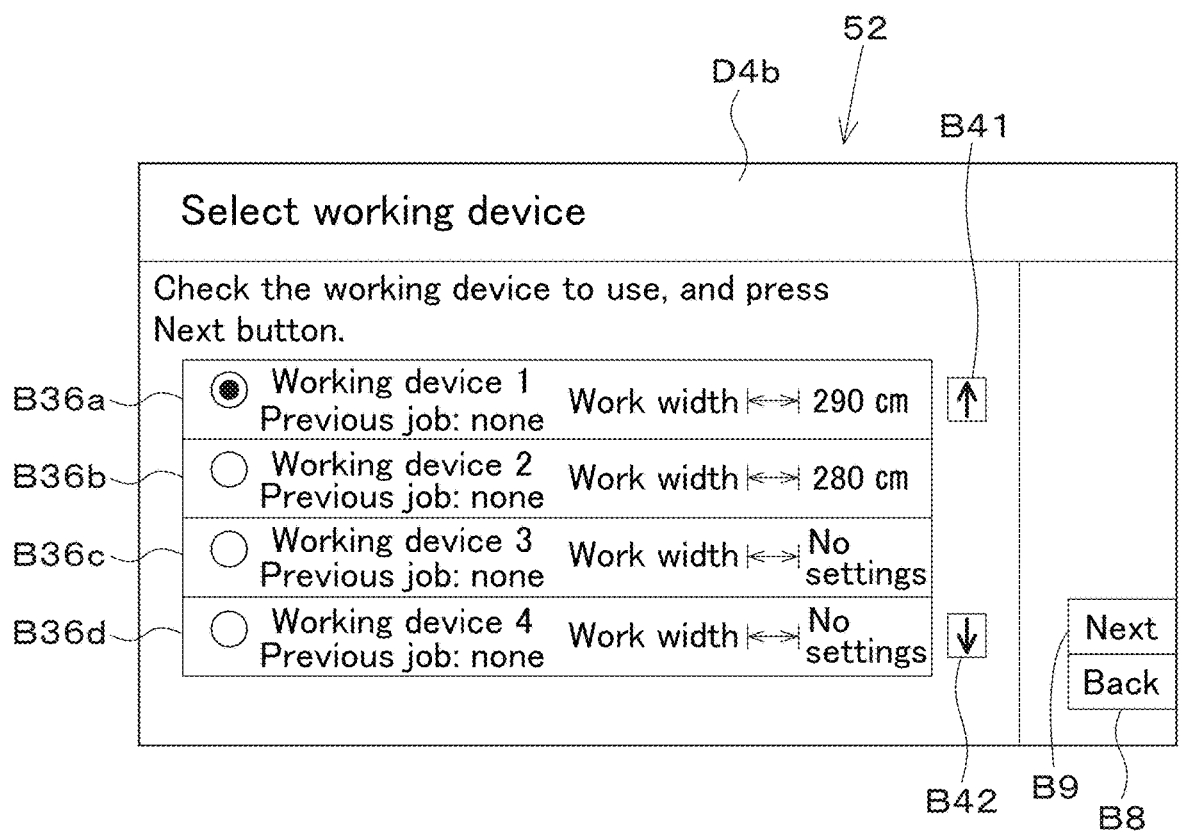
FIG. 6B illustrates an example of a "select working device" screen.

The user can change the type of agricultural machine 1 by selecting the "unattended vehicle settings" key B10 or the "attended vehicle settings" key B11 on the "confirm vehicle settings" screen D4a and performing predetermined input operation(s). Upon selection of the "next" key B8 on the "confirm vehicle settings" screen D4a by the user, the controller 51 causes an internal memory to store settings information (the category of agricultural job and the type of agricultural machine 1) displayed on the "confirm vehicle settings" screen D4a, and causes the display operation interface 52 to display a "select working device" screen D4b as illustrated in FIG. 6B.

The "select working device" screen D4b displays a message indicating instructions for input operations, working device keys B36a to B36d, an up-pointing arrow key B41, a down-pointing arrow key B42, a "next" key B9, and a "back" key B8. The working device keys B36a to B36d indicate preregistered representative information specific to respective working devices 2. The representative information specific to a working device 2 includes the name of the working device 2, the presence or absence of previous job(s) performed by the working device 2, and work width. The work width refers to the sideways dimension, which is perpendicular to the direction of travel in a horizontal plane, of the portion of the working device 2 that does ground work. In FIG. 6B, four working device keys B36a to B36d are displayed. If the number of working devices 2 registered in the agricultural assistance apparatus 50 is five or more, the controller 51 causes working device key(s) indicating another working device(s) 2 to be displayed on the "select working device" screen D4b upon selection of the up-pointing arrow key B41 or the down-pointing arrow key B42 by the user.

Upon selection of any one of the working device keys B36a to B36d by the user, the controller 51 causes the selected working device key to be displayed on the "select working device" screen D4b in a manner that differs from the other working device keys. In the example in FIG. 6B, only the selected working device key (working device key B36a) is assigned a filled circle. Upon selection of the "next" key B9 by the user when any one of the working device keys B36a to B36d is in the selected state, the controller 51 causes the display operation interface 52 to display a "confirm working device settings" screen D4c as illustrated in FIG. 6C.

The "confirm working device settings" screen D4c displays a message indicating instructions for input operations, information specific to the working device 2 selected on the "select working device" screen D4b (FIG. 6B), settings keys B37 to B39, a "next" key B9, and a "back" key B8. The information specific to the working device 2 includes the name of the working device 2, the presence or absence of previous job(s) performed by the working device 2, size information of the working device 2, and the type of the working device 2. That is, the "confirm working device settings" screen D4c displays detailed specifications of the working device 2 selected on the "select working device" screen D4b. In FIGS. 6B and 6C, preregistered information specific to the working device 2 is displayed on the screens D4b and D4c.

Figure 6C:
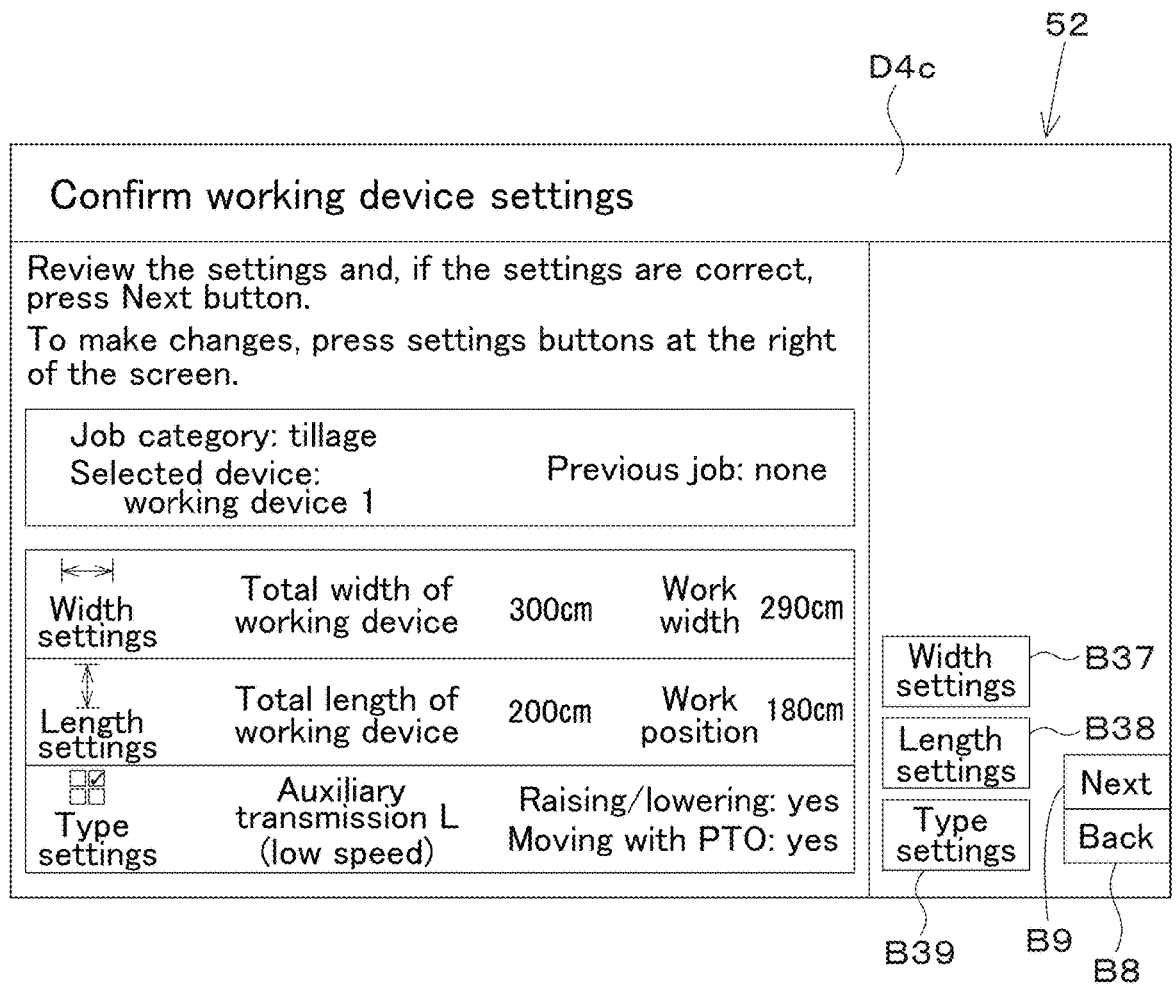
FIG. 6C illustrates an example of a "confirm working device settings" screen.

As illustrated in FIG. 6C, the size information of the working device 2 includes the total width, work width, total length, and work position of the working device 2. The type of the working device 2 includes the speed stage of an auxiliary transmission (not illustrated) to drive the working device 2 (tiller) to rotate, whether or not the working device 2 is to be raised and lowered by the lifting device 8, and whether or not the working device 2 is to move together with a power take-off (PTO) of the agricultural machine 1.

The settings keys B37 to B39 are each used to set and change the size information or the type of the working device 2. Specifically, the user can input and change the set values of the total width and the work width of the working device 2 by selecting the "width settings" key B37 and performing predetermined input operation(s). The total width of the working device 2 indicates an outer dimension of the working device 2 in a sideways direction perpendicular to the front-rear direction and the up-and-down direction of the agricultural machine 1. The user can input and change the set values of the total length and the work position of the working device 2 by selecting the "length settings" key B38 and performing predetermined input operation(s). The total length of the working device 2 is the dimension of the working device 2 from the portion of the working device 2 at which the working device 2 is linked to the lower links 8b (FIG. 3) of the lifting device 8 to the rear edge of the working device 2 (the opposite edge of the working device 2 from the traveling vehicle 3 of the agricultural machine 1). The work position of the working device 2 is the distance from the portion of the working device 2 at which the working device 2 is linked to the lower links 8b to the front edge of the portion of the working device 2 that does ground work (the traveling vehicle body 3-side edge of the portion that does ground work).

The user can input and change the low-speed stage (L (low speed)) or the medium-speed stage (M (medium speed)) as the speed stage of the auxiliary transmission by selecting the "type settings" key B39 and performing predetermined input operation(s). In the present example, the movement of the working device 2 together with the PTO of the agricultural machine 1 and the raising/lowering of the working device 2 by the lifting device 8 are both fixed to "yes", and cannot be changed. For another example, "yes" or "no" may be selected for the movement of the working device 2 together with the PTO of the agricultural machine 1 and the raising/lowering of the working device 2 by the lifting device 8.

Figure 7:
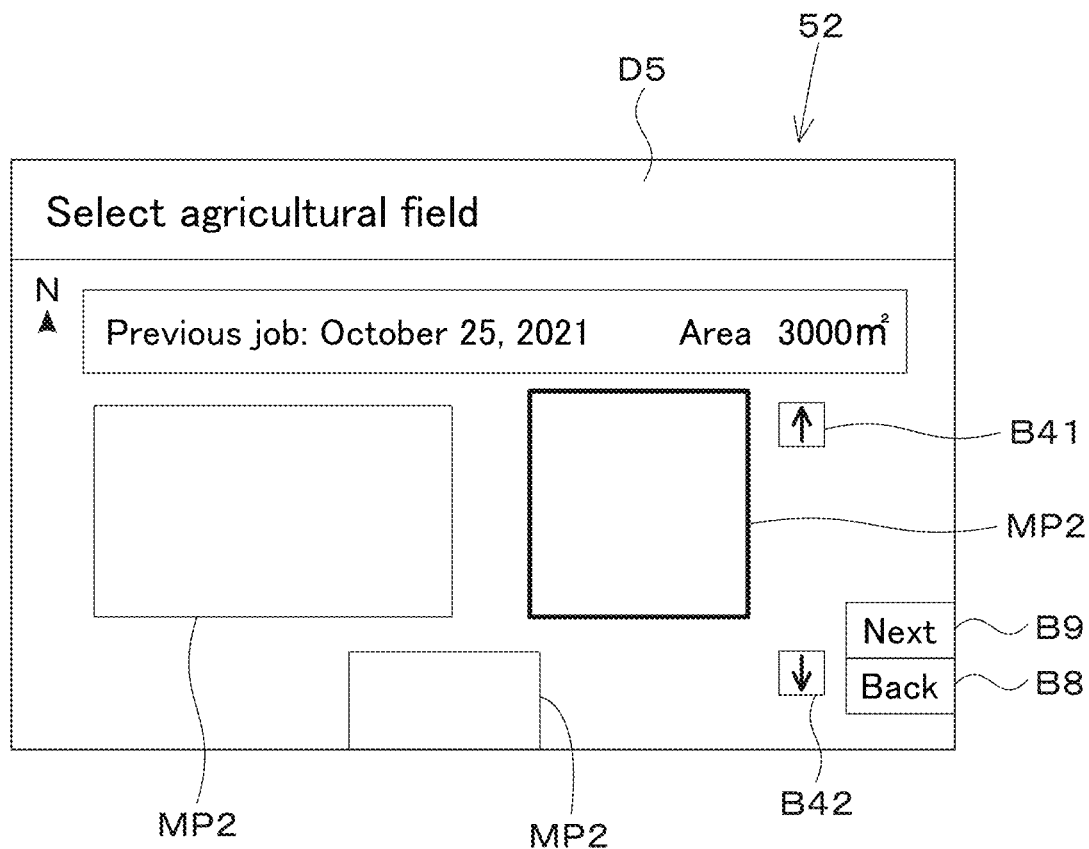
FIG. 7 illustrates an example of a "select agricultural field" screen.

Upon selection of the "next" key B9 by the user on the "confirm working device settings" screen D4c, the controller 51 causes the internal memory to store the settings information displayed on the "confirm working device settings" screen D4c, and causes the display operation interface 52 to display a "select agricultural field" screen D5 as illustrated in FIG. 7. The "select agricultural field" screen D5 displays one or more registered agricultural field maps MP2, an up-pointing arrow key B41, a down-pointing arrow key B42, a "next" key B9, and a "back" key B8. The number of the registered agricultural field maps MP2 displayed in FIG. 7 is three. If the number of the registered agricultural field maps MP2 is four or more, the controller 51 causes another agricultural field map(s) MP2 to be displayed on the "select agricultural field" screen D5 upon selection of the up-pointing arrow key B41 or the down-pointing arrow key B42 by the user.

Figure 8:
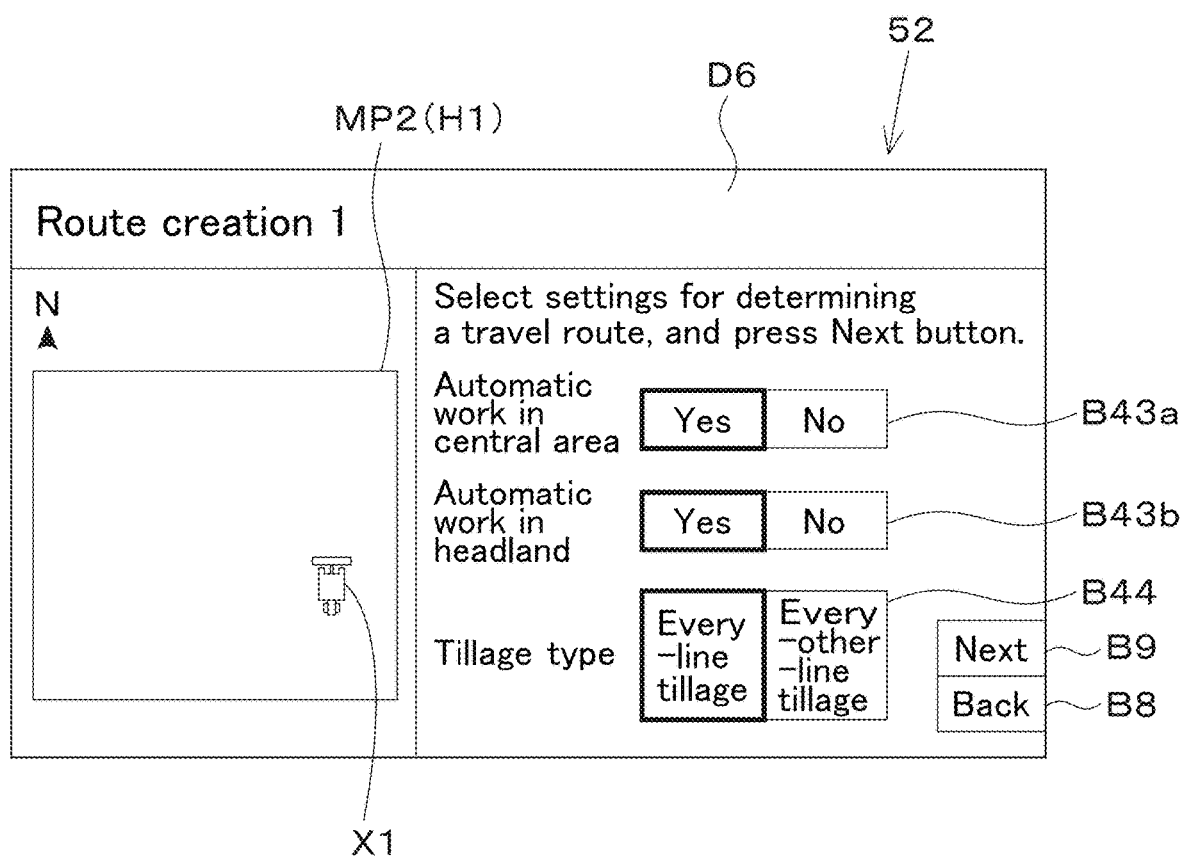
FIG. 8 illustrates an example of a "route creation 1" screen.

Upon selection of any of the agricultural field maps MP2 by the user, the controller 51 causes the selected agricultural field map MP2 to be displayed in a manner differing from the other agricultural field maps MP2. The selected agricultural field map MP2 only is enclosed by a bold line in FIG. 7. The controller 51 causes the date/time of the previous agricultural job performed in the agricultural filed shown in the selected agricultural field map MP2 and the area of the agricultural filed shown in the selected agricultural field map MP2 to be displayed on the "select agricultural field" screen D5. Upon selection of the "next" key B9 by the user when any of the agricultural field maps MP2 is in the selected state, the controller 51 reads agricultural field information including the selected agricultural field map MP2 from the memory 53, causes the internal memory to store the agricultural field information, and causes the display operation interface 52 to display a "route creation 1" screen D6 as illustrated in FIG. 8. Note that the agricultural field information at the time of setting includes the identification information, outline, and the area of the selected agricultural field map MP2 as information about the agricultural field map MP2, and includes the identification information, position, outline, and/or the like of the agricultural field as information about the agricultural field corresponding to the agricultural field map MP2. The agricultural field information also includes the date/time of the previous job.

The "route creation 1" screen D6 as illustrated in FIG. 8 displays the selected agricultural field map MP2 (outline H1), an agricultural machine symbol X1, a message indicating instructions for input operations, job keys B43*a*, B43*b*, and B44, a "next" key B9, and a "back" key B8. The job keys B43*a*, B43*b*, and B44 are used to select settings for creation of a travel route for the agricultural machine 1 (described later). In other words, the job keys B43*a*, B43*b*, and B44 are used to make job settings for the agricultural job to be performed by the agricultural machine 1 (traveling vehicle body 3) and the working device 2 on the agricultural field.

More specifically, the "automatic work in central area" key B43*a* is used to select whether or not to perform the agricultural job with the working device 2 while causing the traveling vehicle body 3 of the agricultural machine 1 to travel in automatic operation in the central area defined in the agricultural field map MP2 (described later). The "automatic work in headland" key B43*b* is used to select whether or not to perform the agricultural job with the working device 2 while causing the traveling vehicle body 3 of the agricultural machine 1 to travel in automatic operation in the headland(s) defined in the agricultural field map MP2 (described later).

The job type key B44 is used to select the manner in which the job is performed by the working device 2. The present preferred embodiment assumes that tillage is selected on the "select job" screen D3 in FIG. 5 for example, and therefore the job type key B44 in FIG. 8 is a key used to select whether the type of the tillage is every-line tillage or every-other-line tillage. If some other job is selected on the "select job" screen D3 in FIG. 5, the job type key B44 in FIG. 8 is a key used to select the manner in which the other job is performed.

Figure 9A:
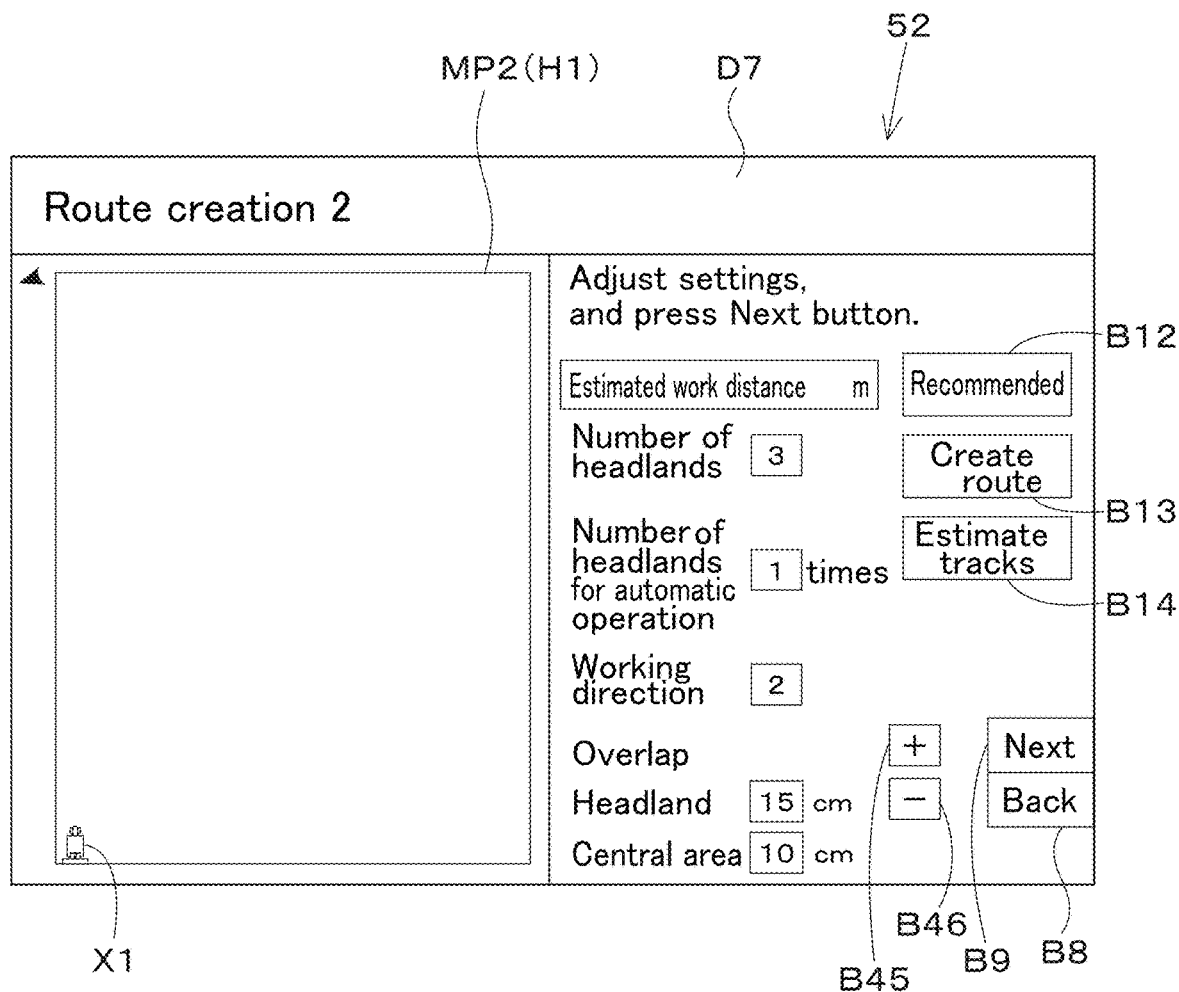
FIG. 9A illustrates an example of a "route creation 2" screen.

In FIG. 8, "agricultural job is performed by the working device 2 while the agricultural machine 1 travels in automatic operation in the central area of the agricultural field" is selected using the "automatic work in central area" key B43*a*, "agricultural job is performed by the working device 2 while the agricultural machine 1 travels in automatic operation in the headland(s) of the agricultural field" is selected using the "automatic work in headland" key B43*b*, and every-line tillage is selected as the type of tillage using the job type key B44. Upon selection of the "next" key B9 by the user, the controller 51 causes the internal memory to store job settings (settings made using the job keys B43*a*, B43*b*, and B44) displayed on the "route creation 1" screen D6, and causes the display operation interface 52 to display a "route creation 2" screen D7 as illustrated in FIG. 9A.

The "route creation 2" screen D7 displays the selected agricultural field map MP2, an agricultural machine symbol X1, a message indicating instructions for input operations, setting items and their corresponding value input fields, a "recommended" key B12, a "create route" key B13, an "estimate tracks" key B14, a plus sign key B45, a minus sign key B46, a "next" key B9, and a "back" key B8. While the "route creation 2" screen D7 is displayed, the controller 51 may cause the communicator 54 to acquire the actual position of the traveling vehicle body 3 detected by the positioning device 40 and cause the agricultural machine symbol X1 to be displayed at the point on the agricultural field map MP2 that corresponds to the actual position of the traveling vehicle body 3.

The setting items on the "route creation 2" screen D7 indicate settings for use in creating a travel route and also job settings for use in performing the agricultural job with the agricultural machine 1 and the working device 2 on the agricultural field. The setting items include estimated work distance, the number of headlands, the number of headlands for automatic operation, working direction, overlap-on-headland, and overlap-in-central-portion. It is possible to input values of the items except for the estimated work distance. The number of headlands indicates the number of headland(s) extending inside and along the outline H1 of the registered agricultural field (agricultural field map MP2). The number of headlands for automatic operation indicates in how many of the above defined headlands the agricultural job is performed by the working device 2 while the agricultural machine 1 travels in automatic operation (how many times the agricultural machine 1 runs around the central area C1 in automatic operation).

The working direction refers to the direction in which the working device 2 is caused to perform the job while the traveling vehicle body 3 is caused to travel straight back and forth in the central portion located inward of the headland(s) of the agricultural field. Upon input of a predetermined value (such as any of "1" to "4") into the value input field for the working direction, the upward, downward, leftward, or rightward direction corresponding to that value is set on the "route creation 2" screen D7. The overlap-on-headland indicates an overlap of the work width of the working device 2 with a headland. The overlap-in-central-portion indicates an overlap between work widths when the job is performed by the working device 2 while the traveling vehicle body 3 is caused to travel straight back and forth in the central portion of the agricultural field.

On the "route creation 2" screen D7, the user can, by selecting any of the value input fields for the setting items and operating the plus sign key B45 or the minus sign key B46, input a value in the selected value input field. Furthermore, upon selection of the "recommended" key B12 by the user, the controller 51 reads recommended values for the respective setting items corresponding to the agricultural job selected on the "select job" screen D3 (FIG. 5) from recommended values pre-stored in the memory 53, and inputs (displays) the read recommended values into the value input fields.

Figure 9B:
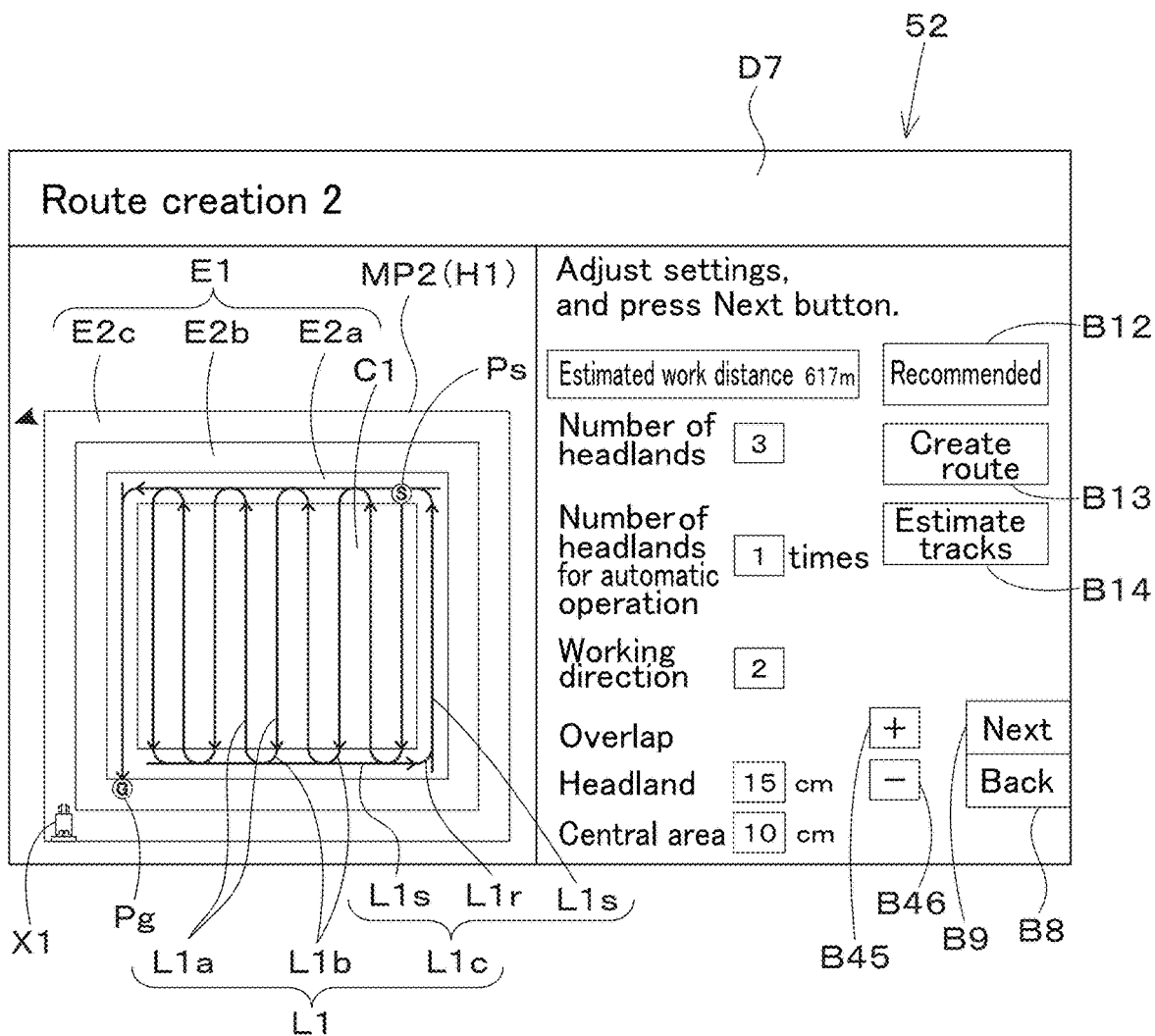
FIG. 9B illustrates an example of the "route creation 2" screen.

After the input of the values of the setting items on the "route creation 2" screen D7 by the user, upon selection of the "create route" key B13 by the user, the controller 51 causes the internal memory to store the values of the setting items. The area definer 51*b* (FIG. 1) defines a central area (second area) C1 and a headland area (first area) E1 on the agricultural field map MP2 as illustrated in FIG. 9B. The route creator 51*c* (FIG. 1) creates a travel route (planned travel route) L1 on the agricultural field map MP2.

Specifically, the area definer 51*b* defines the central area C1 and the headland area E1 based on the agricultural field information, the size information of the working device 2, and the number of headlands and/or the overlap-on-headland inputted on the "route creation 2" screen D7. More specifically, for example, the area definer 51*b* calculates outlines by displacing the outline H1 of the agricultural field inward by a width (which is obtained by subtracting the overlap-on-headland from the work width of the working device 2 (or from the total width of the working device 2)) one or more times corresponding to the number of headlands. Then, the area definer 51*b* defines, as the central area C1, an area (central portion) enclosed by the outline which is the innermost outline. The area definer 51*b* defines, as the headland area E1, an area in the form of a frame (such an area is "outer frame portion") located outward of the central area C1 and inward of the outline H1 of the agricultural field. The area definer 51b defines, as headlands E2c, E2b, and E2c, areas each between adjacent ones of the outline H1 of the agricultural field and the outlines obtained by displacing the outline H1, in the headland area E1. The area definer 51b causes the memory 53 to store data of the positions indicative of the areas C1 and E1 (including the headlands E2c, E2b, and E2c) and/or the like.

The route creator 51c creates the travel route L1 based on the agricultural field information, the areas C1 and E1, the size information of the agricultural machine 1 and the working device 2, the working direction inputted on the "route creation 2" screen D7, the overlap-on-headland, and the overlap-in-central-portion. More specifically, the route creator 51c first creates unit work sections in the central area C1 from one of the opposite edges (the right edge in FIG. 9B) of the central area C1 each extending parallel to the working direction (up-and-down direction in FIG. 9B) such that the unit work sections each have a width obtained by subtracting the overlap-in-central-portion from the work width of the working device 2. The route creator 51c then creates a straight route portion L1a, along which the traveling vehicle body 3 travels straight, on the widthwise (sideways direction in FIG. 9B) centerline of each unit work section.

Next, the route creator 51c creates turn route portions L1b each connecting adjacent ones of the straight route portions L1a in the headland area E1. Each of the turn route portions L1b is a route portion on which the traveling vehicle body 3 turns to travel from one of the two adjacent straight route portions L1a to the other. The route creator 51c, when creating each of the turn route portions L1b, defines, in the headland area E1, a turn space for the agricultural machine 1 and the working device 2 to turn.

The turn route portions L1b in the form of a simple semicircle are shown as an example in FIG. 9B for convenience of description, such as for ease of displaying the turn route portions L1b on the display screen of the display operation interface 52 and for easy visual recognition of the travel route L1 on the display screen. When the traveling vehicle body 3 of the agricultural machine 1 and the working device 2 actually travel along one of adjacent straight route portions L1a and then turn toward the other of the adjacent straight route portions L1a, the traveling vehicle body 3 and the like may make a multi-point turn or travel rearward in addition to traveling forward, forming a path of a more complex shape than the simple semicircle. That is, the turn route portions L1b are for display on the display operation interface 52, and there may be cases in which the agricultural machine 1 does not turn along the turn route portions L1b. The route creator 51c may create the turn route portions L1b in the form different from a semicircle.

The automatic operation controller 61 (FIG. 1) of the agricultural machine 1 causes the lifting device 8 (FIG. 3) to lower the working device 2 to cause the working device 2 to do ground work while causing the traveling vehicle body 3 to travel based on the straight route portions L1a. The automatic operation controller 61 causes the lifting device 8 to raise the working device 2 to stop the working device 2 from doing the ground work when causing the traveling vehicle body 3 to turn in an area corresponding to each of the turn route portions L1b, i.e., when causing the traveling vehicle body 3 to turn from one of adjacent straight route portions L1a toward the other.

That is, the straight route portions L1a are work route portions on which ground work is done by the working device 2 while the traveling vehicle body 3 of the agricultural machine 1 is caused to travel in automatic operation. The central area C1 in which the straight route portions L1a are created is a work area in which ground work is done by the working device 2 while the traveling vehicle body 3 is caused to travel straight back and forth in automatic operation. Note that the work route portions are not limited to those in the form of a straight line such as the straight route portions L1a, and may be curved route portions. It is only necessary that one or more work route portions in the form of a straight line and/or one or more work route portions in the form of a curve be created in the work area.

For example, assume that doing work in the central area C1 is selected via the "automatic work in central area" key B43a, doing no work in headland(s) is selected via the "automatic work in headland" key B43b, and every-line tillage is selected via the job type key B44 on the "route creation 1" screen D6 in FIG. 8. In such a case, the route creator 51c creates the travel route L1 including the straight route portions L1a and the turn route portions L1b. The route creator 51c sets a starting point Ps at the end of one endmost strait route portion L1a that is not connected to any turn route portions L1b in the central area C1, and sets a goal point Pg at the end of the opposite endmost strait route portion L1a in the central area C1. The route creator 51c then causes the internal memory to store, as route information, information indicative of the areas C1 and E1, the travel route L1, the starting point Ps, the goal point Pg, and the turn space.

Assume that doing work in the central area C1 is selected via the "automatic work in central area" key B43a, doing work in headland(s) is selected via the "automatic work in headland" key B43b, and every-line tillage is selected via the job type key B44 on the "route creation 1" screen D6 in FIG. 8. In such a case, the route creator 51c creates, in the headland area E1, a go-around route portion L1c which extends around the central area C1 in addition to the straight route portions L1a and the turn route portions L1b, as illustrated in FIG. 9B. For example, in the case where the number of headlands for automatic operation is set to 1 (one) on the "route creation 2" screen D7 as illustrated in FIG. 9A, the route creator 51c creates the go-around route portion L1c in the headland E2a that is nearest the central area C1 of the one or more headlands E2a, E2b, and/or E2c defined outside the central area C1 by the area definer 51b.

The go-around route portion L1c is a work route portion on which ground work is done by the working device 2 while the traveling vehicle body 3 of the agricultural machine 1 is caused to travel in automatic operation. The go-around route portion L1c includes straight route portions L1s which are substantially straight and turn route portions L1r in the form of a curve with a curvature equal to or greater than a predetermined value. Each of the straight route portions L1s is created on the widthwise centerline of the headland E2a such that the straight route portions L1s correspond to respective straight portions of the outline H2a of the central area C1.

Each of the turn route portions L1r is a route portion extending from one of adjacent straight route portions L1s toward the other. The adjacent straight route portions L1s extend in different directions, but the end point of one of the straight route portions L1s is connected to the starting point of the other of the straight route portions L1s by a turn route portion L1r. Also when creating each turn route portion L1r, the route creator 51c defines, in the headland area E1, a turn space for the traveling vehicle body 3 of the agricultural machine 1 and the working device 2 to turn.

The turn route portions L1r in the form of a simple arc are shown as an example in FIG. 9B for convenience of description. However, when the agricultural machine 1 or the like actually turns from one of adjacent straight route portions L1s toward the other, the agricultural machine 1 or the like may make a multi-point turn or travel rearward in addition to traveling forward, forming a path of a more complex shape than the arc. That is, the turn route portions L1r are for display on the display operation interface 52, and there may be cases in which the agricultural machine 1 does not turn along the turn route portions L1r. The route creator 51c may create the turn route portions L1r in the form different from an arc.

The go-around route portion L1c may also include slightly curved portion(s) with a curvature less than the predetermined value (curved route portion(s), not illustrated) in addition to the straight route portions L1s and the turn route portions L1r, depending on the shape of the outline H1 of the agricultural field (for example, when the outline H1 of the agricultural field has an irregular shape). In such a case, the automatic operation controller 61 may cause the working device 2 to do ground work while the traveling vehicle body 3 is traveling in automatic operation based on the straight route portions L1s and the slightly curved portion(s) of the go-around route portion L1c. That is, the straight route portions L1s and the slightly curved portion(s) are work route portions.

When the automatic operation controller 61 is about to cause the traveling vehicle body 3 to turn in an area corresponding to a turn route portion L1r, i.e., when the automatic operation controller 61 is about to cause the traveling vehicle body 3 to turn from one of straight route portions L1s toward the other, the automatic operation controller 61 causes the lifting device 8 to raise the working device 2 to stop the ground work done by the working device 2. Also when the automatic operation controller 61 is about to cause the traveling vehicle body 3 to turn from one of the straight route portions L1a in the central area C1 toward one of the straight route portions L1s in the headland area E1, the automatic operation controller 61 causes the lifting device 8 to raise the working device 2 to stop the ground work done by the working device 2.

The headland E2a in which the go-around route portion L1c is created as described above is a work area in which ground work is done by the working device 2 while the traveling vehicle body 3 travels around the central area C1. For another example, the route creator 51c may create go-around route portions also in the other headlands E2b and E2c located outward of the headland E2a. The "route creation 2" screen D7 may include a key used to input the number of headlands in which a go-round route portion is to be created.

The route creator 51c may create a go-around route portion that goes through at least one of the headlands E2a, E2b, and E2c two or more times. The route creator 51c may create a go-around route portion that goes through each of adjacent headlands. That is, the route creator 51c may create, in the headland area E1, a go-around route portion that goes around the central area C1 one or more times equal to or more than the number of headlands.

After creating the go-around route portion L1c, the route creator 51c sets a starting point Ps at the end not connected to any turn route portion L1b (the upper end of the rightmost straight route portion L1a in FIG. 9B) of one of endmost straight route portions L1a (the leftmost and rightmost straight route portions L1a in FIG. 9B) in the central area C1, and connects the go-around route portion L1c to the end of the other of the endmost straight route portions L1a (to the lower end of the leftmost straight route portion L1a in FIG. 9B). The route creator 51c sets a goal point Pg at the end of the go-around route portion L1c that is not connected to any straight route portion L1a. The route creator 51c then causes the internal memory to store, as route information, information indicative of the areas C1 and E1, the travel route L1, the starting point Ps, the goal point Pg, and the turn space.

After the route creator 51c creates the travel route L1, as illustrated in FIG. 9B, the controller 51 causes the route information such as the areas C1 and E1, the travel route L1, the starting point Ps, and the goal point Pg to be displayed on the "route creation 2" screen D7. The route creator 51c also calculates an estimated work distance over which ground work is done by the working device 2 while the traveling vehicle body 3 is caused to travel based on all the straight route portions L1a and L1s. The controller 51 causes the estimated work distance to be displayed on the "route creation 2" screen D7.

After the travel route L1 and the like are displayed on the "route creation 2" screen D7, the user selects the "estimate tracks" key B14. Upon the selection by the user, the controller 51 calculates a work portion in which ground work is to be done by the working device 2 while the traveling vehicle body 3 is caused to travel in automatic operation based on the travel route L1, i.e., calculates estimated work track(s) of the working device 2. The controller 51 then causes the estimated work track(s) to be displayed on the travel route L1 of the agricultural field map MP2 on the "route creation 2" screen D7 such that the estimated work track(s) is/are superimposed on the travel route L1 (this is not illustrated).

Figure 10A:
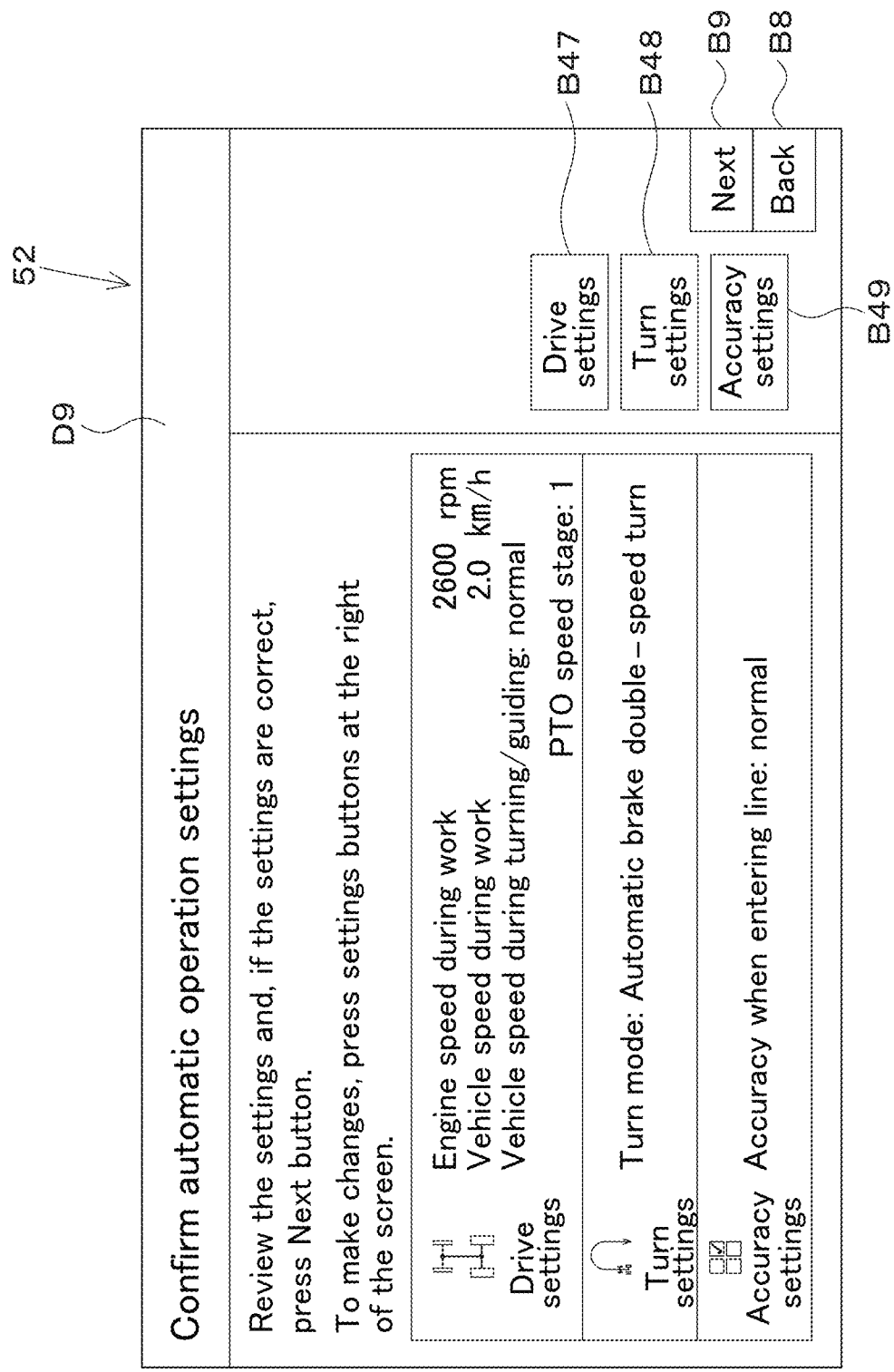
FIG. 10A illustrates an example of a "confirm automatic operation settings" screen.

After the travel route L1 and the like are displayed on the "route creation 2" screen D7, upon selection of the "next" key B9 by the user, the controller 51 causes the display operation interface 52 to display a "confirm automatic operation settings" screen D9a as illustrated in FIG. 10A. The "confirm automatic operation settings" screen D9a displays a message indicating instructions for input operations, information about work in automatic operation (hereinafter "automatic operation/work information"), settings keys B47 to B49, a "next" key B9, and a "back" key B8. The automatic operation/work information includes job setting (s) for the agricultural job performed by the working device 2 while the agricultural machine 1 operates automatically. The automatic operation/work information includes the rotation speed of the engine (prime mover 4) during the agricultural job, the vehicle speed of the traveling vehicle body 3 performing the agricultural job, the vehicle speed of the traveling vehicle body 3 making a turn, PTO speed stage, turn mode, the accuracy of matching between the traveling vehicle body 3 and the travel route L1 when entering the travel route L1, and/or the like. Preregistered automatic operation/work information is displayed on the "confirm automatic operation settings" screen D9a in FIG. 10A.

The user can change the rotation speed of the engine (prime mover 4) during the agricultural job, the vehicle speed of the traveling vehicle body 3 performing the agricultural job, the vehicle speed of the traveling vehicle body 3 making a turn, and the PTO speed stage by selecting the "drive settings" key B47 and performing a predetermined input operation. The user can also change the accuracy of matching between the traveling vehicle body 3 and the travel route L1 when entering the travel route L1 by selecting the "accuracy settings" key B49 and performing a predetermined input operation.

The user can also change the turn mode of the agricultural machine 1 for automatic operation by selecting the "turn settings" key B48 and performing predetermined input operation(s). Specifically, upon selection of the "turn settings" key B48 by the user, the controller 51 causes the display operation interface 52 to display the "select turn mode" screen D9*b* illustrated in FIG. 10B. The "select turn mode" screen D9*b* displays a message indicating instructions for input operations, turn mode selection keys B50*a*, B50*b*, and B50*c*, a "next" key B9, and a "back" key B8. The turn mode selection keys B50*a*, B50*b*, and B50*c* indicate respective turn modes which can be performed by the agricultural machine 1. In the present preferred embodiment, the agricultural machine 1 is capable of performing three modes, i.e., automatic brake double-speed turn, double-speed turn, and all-wheel-drive turn. Therefore, the "select turn mode" screen D9*b* displays the three turn mode selection keys B50*a*, B50*b*, and B50*c* indicating the respective turn modes.

For another example, in the case where there are four or more turn modes which can be performed by the agricultural machine 1, it is only necessary to provide four or more turn mode selection keys representative of the respective turn modes. Note that, if the four or more turn mode selection keys cannot be displayed on the "select turn mode" screen D9*b* at a time, it is only necessary to cause the "select turn mode" screen D9*b* to display one or more of the turn mode selection keys and, upon operation by the user of the up-pointing arrow key B41 or the down-pointing arrow key B42, cause the "select turn mode" screen D9*b* to display the other one or more of the turn mode selection keys.

Figure 10B:
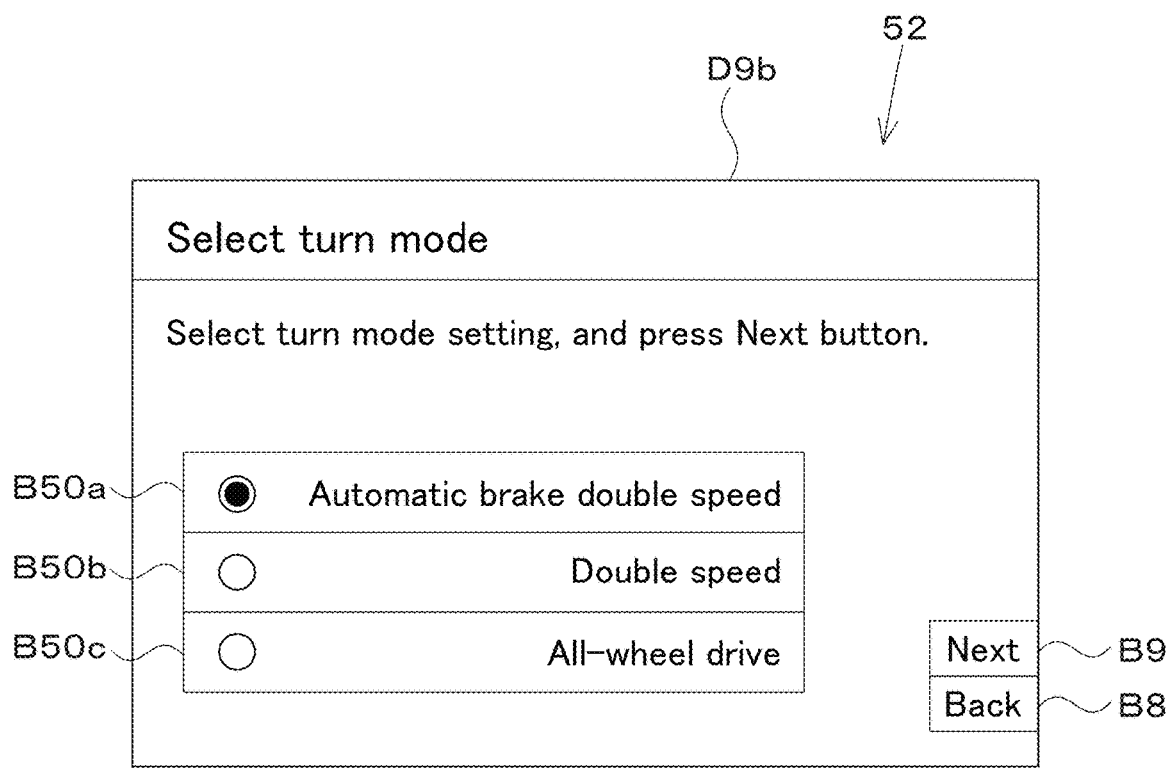
FIG. 10B illustrates an example of a "select turn mode" screen.

In the examples in FIGS. 10A and 10B, the automatic brake double-speed turn, which is one of the automatic brake double-speed turn, double-speed turn, all-wheel-drive turn modes and which is a turn mode in which the turning radius of the agricultural machine 1 is smallest, is displayed as the preregistered turn mode. Specifically, in the "select turn mode" screen D9*b* as illustrated in FIG. 10B, only the turn mode selection key B50*a* corresponding to the automatic brake double-speed turn is assigned a filled circle. Upon selection of the other turn mode selection key B50*b* or B50*c* by the user on the "select turn mode" screen D9*b*, only the selected turn mode selection key is assigned a filled circle. Upon operation of the "next" key B9 by the user while one of the turn mode selection keys B50*b* and B50*c* is in the selected state, the turn mode corresponding to the selected turn mode selection key is confirmed (set) as the turn mode for the automatic operation, and the controller 51 causes the display operation interface 52 to display the "confirm automatic operation settings" screen D9*a* indicating the turn mode (FIG. 10A). Note that the turn mode which has been selected on the "select turn mode" screen D9*b* (e.g., B50*a* in the above example) may be referred to as a "first turn mode", and the turn mode which is different from the first select turn mode and selected later by the user via the "select turn mode" screen D9*b* (e.g., B50*b* or B50*c* in the above example) may be referred to as a "second turn mode" hereinafter.

Figure 11:
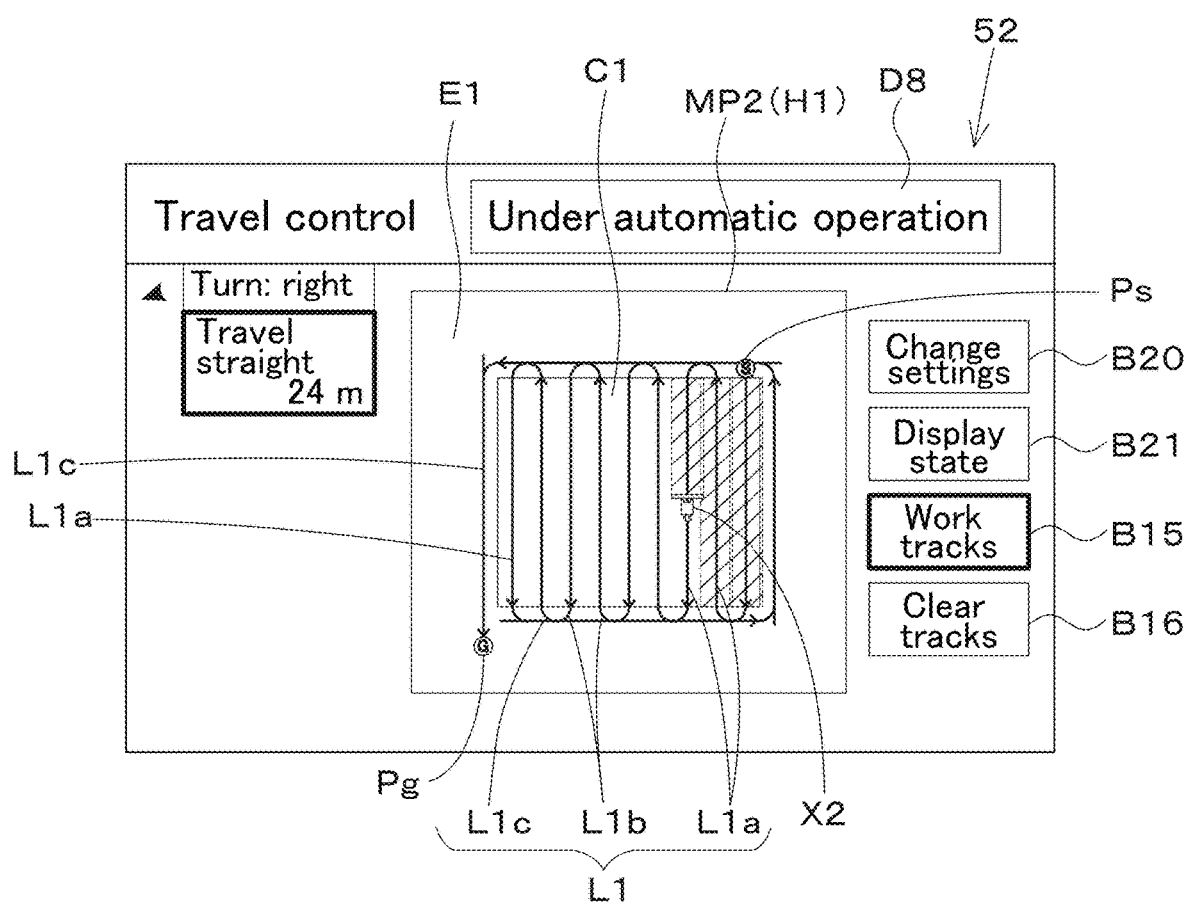
FIG. 11 illustrates an example of a "travel control" screen.

Upon selection of the "next" key B9 by the user on the "confirm automatic operation settings" screen D9*a*, the controller 51 causes the internal memory to store the automatic operation/work information including the job settings displayed on the screen D9*a*, and causes the display operation interface 52 to display a "travel control" screen D8 as illustrated in FIG. 11. The controller 51 generates automatic travel data based on the settings information stored in the internal memory, and transmits (outputs) the automatic travel data to the controller 60 of the agricultural machine 1 via the communicator 54. The automatic travel data includes the route information, the settings information of the agricultural machine 1, the settings information of the working device 2, and the automatic operation/work information. The information of the travel route L1 included in the route information in the automatic travel data includes information indicative of the positions of the straight route portions L1*a* and/or L1*s* which are work route portions, and does not need to include information indictive of the positions of the turn route portions L1*b* and/or L1*r*. The settings information of the agricultural machine 1 and the settings information of the working device 2 include size information of the agricultural machine 1 and size information of the working device 2.

The "travel control" screen D8 as illustrated in FIG. 11 displays the manner in which the agricultural machine 1 travels and the manner in which the working device 2 performs a job in the automatic traveling-and-working mode. Note that the "travel control" screen D8 in FIG. 11 displays the manner in which the agricultural machine 1 travels and the manner in which a job is performed, after a certain period from the start of the automatic traveling-and-working mode. The "travel control" screen D8 displays the agricultural field map MP2, the travel route L1, the starting point Ps, the goal point Pg, the agricultural machine symbol X2, the manner in which the agricultural machine 1 travels, a "change settings" key B20, a "display state" key B21, a "work tracks" key B15, and a "clear tracks" key B16.

The controller 51 acquires, via the communicator 54, the actual position of the traveling vehicle body 3 detected by the positioning device 40 at predetermined intervals, and causes the agricultural machine symbol X2 to be always displayed at the point on the agricultural field map MP2 that corresponds to the actual position of the traveling vehicle body 3. That is, the agricultural machine symbol X2 on the "travel control" screen D8 indicates the actual position of the traveling vehicle body 3 of the agricultural machine 1.

For example, the user manually operates the agricultural machine 1 to move to the starting point Ps while looking at the "travel control" screen D8, and then performs a predetermined operation using the mode switch 65 (FIG. 1) to place the agricultural machine 1 in the automatic traveling-and-working mode. With this, the automatic operation controller 61 (FIG. 1) is brought into the automatic traveling-and-working mode, and causes the working device 2 to do ground work while causing the traveling vehicle body 3 to travel in automatic operation based on the automatic travel data received from the agricultural assistance apparatus 50 and the position of the traveling vehicle body 3 detected by the positioning device 40.

Specifically, the automatic operation controller 61 first reads the route information included in the automatic travel data to acquire the areas C1 and E1, the travel route L1 (work route portions L1*a* and L1*s*), the starting point Ps, and the goal point Pg. Next, the automatic operation controller 61 causes the working device 2 to do ground work while causing the traveling vehicle body 3 to travel in automatic operation based on the straight route portions L1*a* of the travel route L1 from the starting point Ps. When the traveling vehicle body 3 (agricultural machine 1) reaches the end point of one of adjacent straight route portions L1*a*, the automatic operation controller 61 interrupts the ground work done by the working device 2, causes the working device 2 to be raised, and causes the traveling vehicle body 3 to turn toward the starting point of the other of the adjacent route portions L1*a*. That is, the automatic operation controller 61 causes the agricultural machine 1 and the working device 2 to turn in an area corresponding to a turn route portion L1*b*. In so doing, the automatic operation controller 61 causes the agricultural machine 1 and the working device 2 to turn based on position information of the areas C1 and E1, position information of the straight route portions L1*a*, size information of the agricultural machine 1 and the working device 2, the position of the traveling vehicle body 3 detected by the positioning device 40, the result of detection by the detector 64, and/or the like.

Next, when the traveling vehicle body 3 reaches the starting point of the other of the adjacent straight route portions L1*a*, the automatic operation controller 61 causes the working device 2 to be lowered, and resumes the ground work by the working device 2 when causing the traveling vehicle body 3 to start traveling in automatic operation based on the other of the adjacent straight route portions L1*a*. With this, the traveling vehicle body 3 travels straight back and forth in automatic operation in the central area C1 and ground work is done by the working device 2 on the central area C1.

Then, the automatic operation controller 61 causes the working device 2 to do ground work while causing the traveling vehicle body 3 to travel in automatic operation based on the go-around route portion L1*c* and the position of the traveling vehicle body 3. In so doing, the automatic operation controller 61 causes the working device 2 to do ground work while causing the traveling vehicle body 3 to travel in automatic operation based on the straight route portions L1*s*, and, when causing the traveling vehicle body 3 to turn in an area corresponding to a turn route portion L1*r*, causes the working device 2 to be raised to stop the ground work. The turn is performed in the following manner: the automatic operation controller 61 causes the agricultural machine 1 and the working device 2 to turn based on the position information of the areas C1 and E1, the position information of the straight route portions L1*s*, the size information of the agricultural machine 1 and the working device 2, the position of the traveling vehicle body 3 detected by the positioning device 40, the results of detection by the detector 64, and/or the like. With this, the traveling vehicle body 3 travels around the central area C1 in automatic operation, and the working device 2 does ground work on the headland E2*a* surrounding the central area C1 (see FIG. 9B).

FIGS. 12A to 12D illustrate automatic steering of the agricultural machine 1. In the automatic traveling-and-working mode, the automatic operation controller 61 calculates the deviation of the position of the traveling vehicle body 3 detected by the positioning device 40 from the travel route L1 (work route portions L1*a* and L1*s*), while causing the traveling vehicle body 3 to travel automatically. If the deviation is less than a threshold (for example, FIG. 12A), the automatic operation controller 61 maintains the angle of rotation of the steering shaft 31 (FIG. 1). If the deviation of the position of the traveling vehicle body 3 from the travel route L1 is equal to or more than the threshold and the traveling vehicle body 3 is positioned leftward of the travel route L1 (for example, FIG. 12B), the automatic operation controller 61 rotates the steering shaft 31 so that the traveling vehicle body 3 is steered right. If the deviation of the position of the traveling vehicle body 3 from the travel route L1 is equal to or more than the threshold and the traveling vehicle body 3 is positioned rightward of the travel route L1 (for example, FIG. 12C), the automatic operation controller 61 rotates the steering shaft 31 so that the traveling vehicle body 3 is steered left.

Figure 12A:
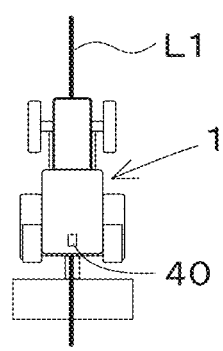
FIG. 12A is an illustration of automatic operation of an agricultural machine.
Figure 12B:
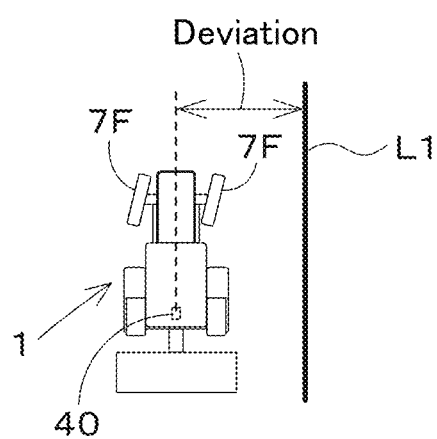
FIG. 12B is an illustration of the automatic operation of the agricultural machine.
Figure 12C:
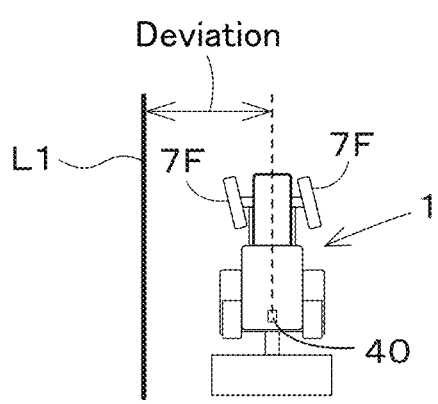
FIG. 12C is an illustration of the automatic operation of the agricultural machine.
Figure 12D:
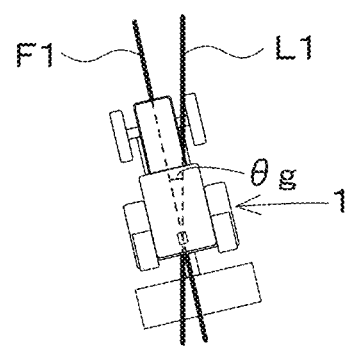
FIG. 12D is an illustration of the automatic operation of the agricultural machine.

The steering angle of (the steering angle achieved by) the steering unit 29 is changed based on the deviation of the position of the traveling vehicle body 3 from the travel route L1 in the above example. Note, however, that, for another example, the steering angle of the steering unit 29 may be changed based on the angle θg of the direction-of-travel F1 of the traveling vehicle body 3 to the travel route L1 as illustrated in FIG. 12D. In such a case, for example, the automatic operation controller 61 calculates the direction-of-travel F1 of the traveling vehicle body 3 from changes in position of the traveling vehicle body 3, and calculates the angle θg of the direction-of-travel F1 to the travel route L1. If the angle θg is equal to or greater than a threshold, the automatic operation controller 61 rotates the steering shaft 31 so that the direction-of-travel F1 of the traveling vehicle body 3 matches the direction of the travel route L1 (i.e., so that the angle θg is zero degrees).

For another example, the automatic operation controller 61 may calculate a first steering angle based on the deviation of the position of the traveling vehicle body 3 from the travel route L1 and calculate a second steering angle based on the travel route L1 and the direction-of-travel F1 of the traveling vehicle body 3. The automatic operation controller 61 may then calculate a third steering angle based on the first steering angle and the second steering angle and rotate the steering shaft 31 based on the third steering angle.

The automatic operation controller 61 calculates the actual vehicle speed of the traveling vehicle body 3 based on changes in position of the traveling vehicle body 3 while the automatic operation controller 61 is causing the traveling vehicle body 3 to travel automatically based on the travel route L1. The automatic operation controller 61 then controls the driving of the transmission 5, the brake 6, and the prime mover 4 so that the actual vehicle speed matches the vehicle speed set on the "confirm automatic operation settings" screen D9*a* (FIG. 10A).

As has been discussed, when the agricultural machine 1 is in the automatic traveling-and-working mode, the automatic operation controller 61 automatically steers the traveling vehicle body 3 while automatically changing the travel speed of the traveling vehicle body 3 based on the travel route L1 and the position of the traveling vehicle body 3 (agricultural machine 1). The automatic operation controller 61 also automatically causes the working device 2 to perform an agricultural job (ground work) and stop the agricultural job (ground work).

Upon selection of the "work tracks" key B15 by the user on the "travel control" screen D8 (FIG. 11), the controller 51 calculates actual work track(s) on which the working device 2 has done the ground work, based on the positions of the traveling vehicle body 3 detected by the positioning device 40 and the work width of the working device 2. The controller 51 then causes the actual work track(s) (hatched portions) to be displayed such that the actual work track(s) are superimposed on the straight route portions (work route portions) L1*a* of the agricultural field map MP2, as illustrated in FIG. 11. Upon selection of the "clear tracks" key B16 by the user, the controller 51 causes the actual work track(s) to disappear.

During the automatic operation of the agricultural machine 1 (while in the automatic traveling-and-working mode), the automatic operation controller 61 causes the agricultural machine 1 (traveling vehicle body 3) to turn in areas corresponding to the turn route portions L1*b* and L1*r* in the turn mode set on the "confirm automatic operation settings" screen D9*a* (FIG. 10A) or the "select turn mode" screen D9*b* (FIG. 10B) at the vehicle speed (predetermined normal value) set on the "confirm automatic operation settings" screen D9a (FIG. 10A) or the "select turn mode" screen D9b (FIG. 10B). During the automatic operation of the agricultural machine 1, the turn mode changer 51d (FIG. 1) performs a turn mode changing process.

Figure 13:
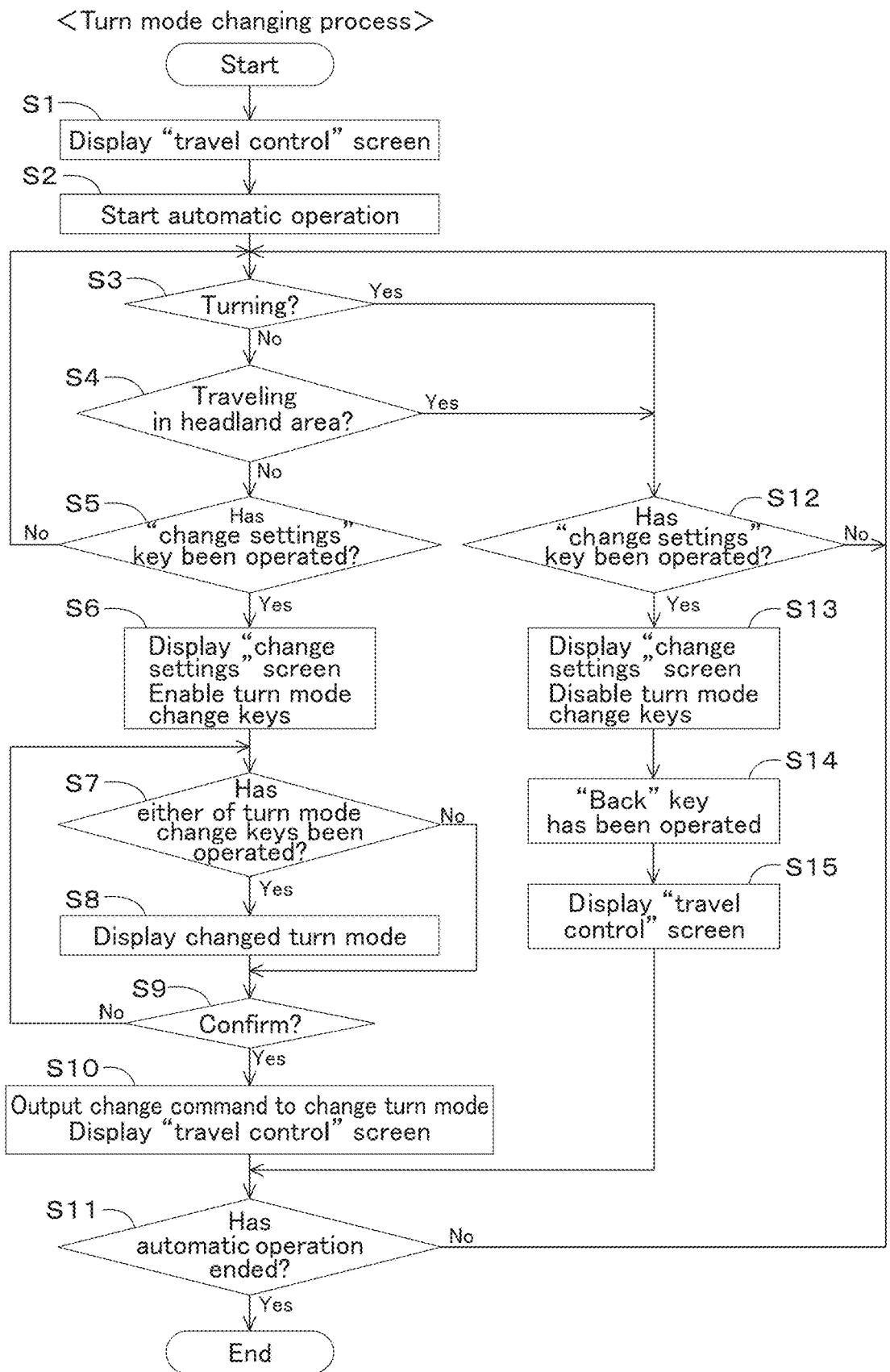
FIG. 13 is a flowchart showing an example of a turn mode changing process.

FIG. 13 is a flowchart showing an example of the turn mode changing process. Once the turn mode changer 51d has determined that the display operation interface 52 displays the "travel control" screen D8 (FIG. 11) (S1 in FIG. 13), the turn mode changer 51d checks the operating states of the agricultural machine 1 and the working device 2 based on the result of detection by the detector 64 received at the communicator 54. The turn mode changer 51d next determines, based on the result of detection by the detector 64, that the automatic operation of the agricultural machine 1 has started (S2), and then checks whether or not the agricultural machine 1 is turning and whether or not the agricultural machine 1 is traveling in the headland area E1.

Figure 14A:
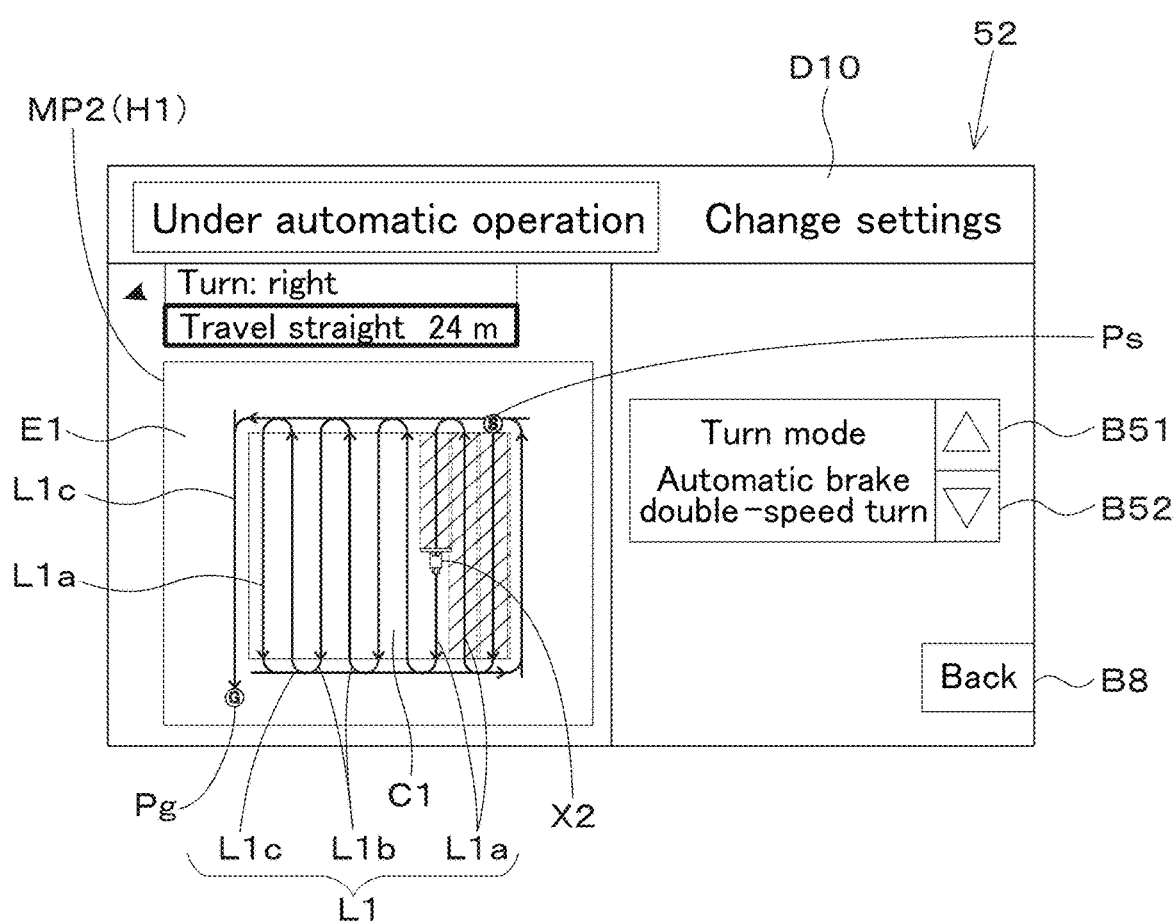
FIG. 14A illustrates an example of a "change settings" screen.

Upon operation of the "change settings" key B20 (YES in S5 in FIG. 13) on the "travel control" screen D8 (FIG. 11) when the agricultural machine 1 is not turning (NO in S3) or traveling in the headland area E1 (NO in S4), the turn mode changer 51d causes the display operation interface 52 to display, for example, a "change settings" screen D10 as illustrated in FIG. 14A, and enables (makes operable) turn mode change keys B51 and B52 on the screen D10 (S6 in FIG. 13).

As illustrated in FIG. 14A, the "change settings" screen D10 displays the agricultural field map MP2, the travel route L1, the starting point Ps, the goal point Pg, the agricultural machine symbol X2, the manner in which the agricultural machine 1 travels (in automatic operation), the turn mode of the agricultural machine 1, the turn mode change keys B51 and B52, and the "back" key B8. In FIG. 14A, the "change settings" screen D10 displays the manner in which the agricultural machine 1 travels and the manner in which a job is performed, after a certain period of time from the start of the automatic operation of the agricultural machine 1 (the same applies to FIGS. 14B to 14D discussed later). The "change settings" screen D10 also displays, as the turn mode of the agricultural machine 1, the "automatic brake double-speed turn" set on, for example, the foregoing "confirm automatic operation settings" screen D9a (FIG. 10A).

The turn mode change keys B51 and B52 are used to make an input to change the turn mode of the agricultural machine 1. When the turn mode changer 51d places the turn mode change keys B51 and B52 in the enabled state (S6 in FIG. 13), the turn mode change keys B51 and B52 are displayed such that the turn mode change keys B51 and B52 can be operated (tapped) as illustrated in FIG. 14A (the same applies to FIGS. 14B and 14C discussed later). That is, the display operation interface 52 is allowed to receive input to change the turn mode of the agricultural machine 1.

As discussed earlier, the turn modes of the agricultural machine 1 (traveling vehicle body 3) that can be performed by the automatic operation controller 61 (FIG. 1) include the "double-speed turn" and the "all-wheel-drive turn" in addition to the "automatic brake double-speed turn". The "automatic brake double-speed turn" is smaller in the turning radius of the agricultural machine 1 than the "all-wheel-drive turn and the "double-speed turn", and the ability of the front wheels 7F and the rear wheels 7R to grip the road is higher in the "automatic brake double-speed turn" than in the "all-wheel-drive turn and the "double-speed turn". Therefore, in cases where, for example, the headland area E1 is narrow, causing the agricultural machine 1 to turn in the "automatic brake double-speed turn" mode allows the traveling vehicle body 3 to make a sharp turn and reduces the number of back and forth movements, as compared to the "double-speed turn" and the "all-wheel-drive turn".

Also when the soil in the agricultural field is in muddy, causing the agricultural machine 1 to turn in the "automatic brake double-speed turn" mode makes it possible to reduce the number of back and forth movements and eliminate or reduce the likelihood that the traveling vehicle body 3 will stop in the middle, as compared to the "double-speed turn" and the "all-wheel-drive turn". However, when the agricultural machine 1 turns in the "automatic brake double-speed turn" mode, the muddy soil becomes rough. Therefore, when leveling the agricultural field, it is preferable to cause the agricultural machine 1 to turn in the "double-speed turn" or the "all-wheel-drive turn" mode which is less in the ability of the front wheels 7F and the rear wheels 7R to grip the road and causes less roughness than the "automatic brake double-speed turn" mode.

Figure 14B:
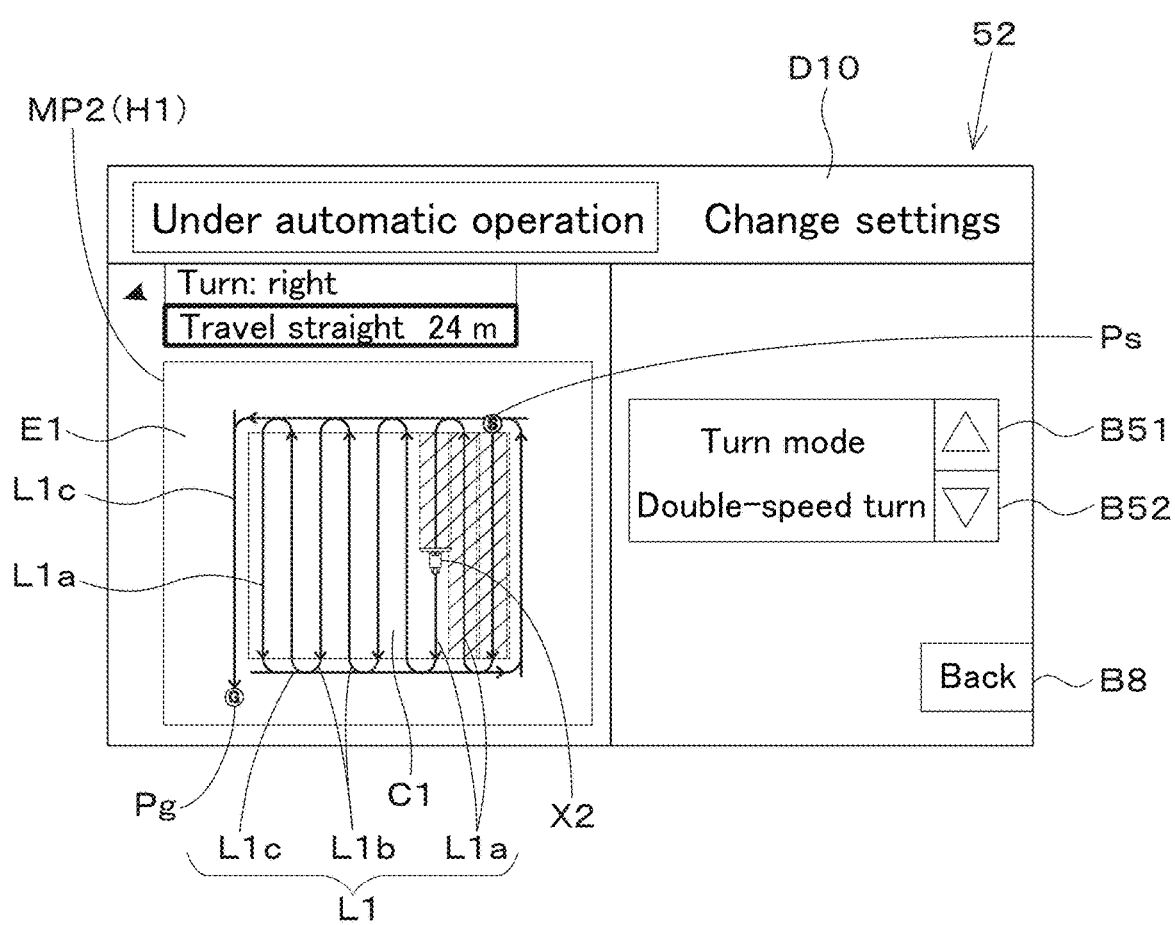
FIG. 14B illustrates another example of the "change settings" screen.
Figure 14C:
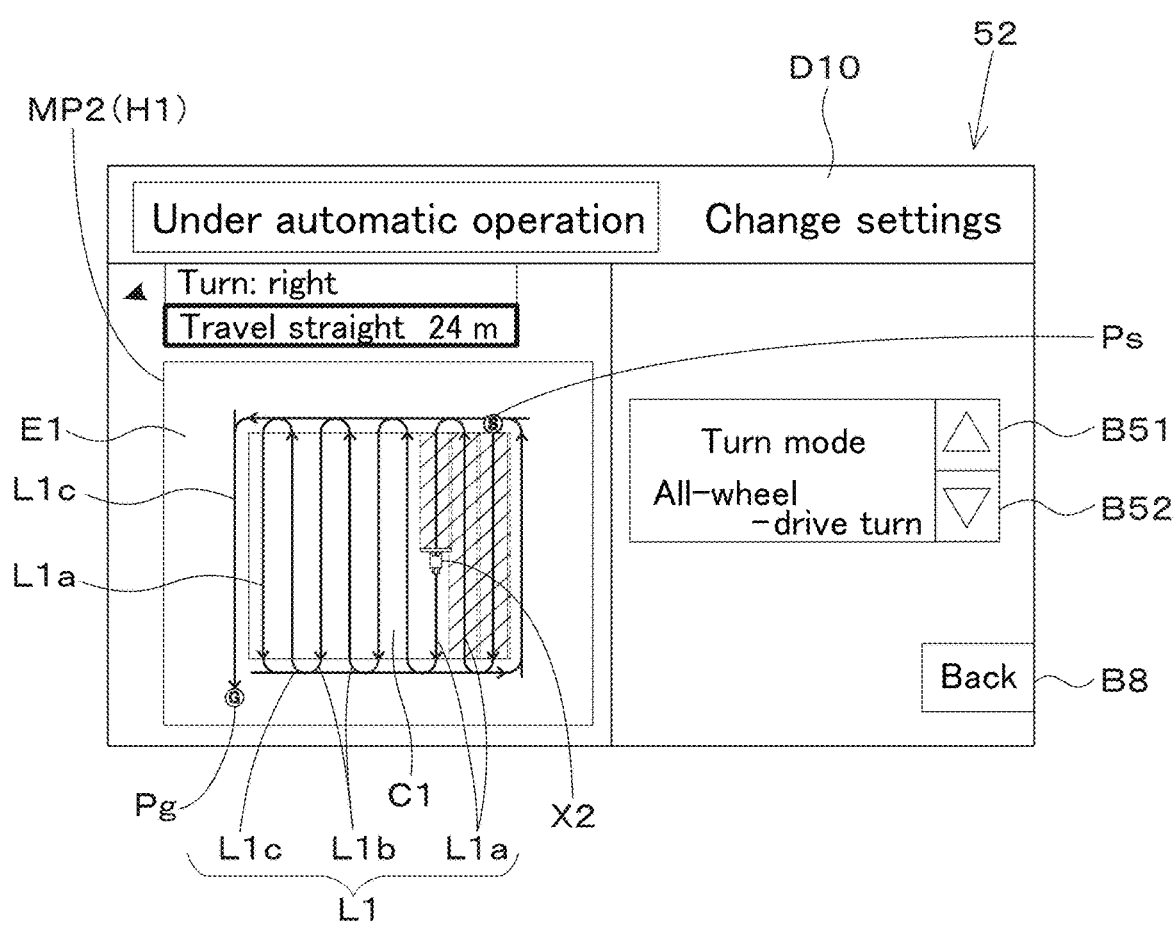
FIG. 14C illustrates a further example of the "change settings" screen.

Upon operation of the enabled turn mode change key B51 or B52 by the user (YES in S7 in FIG. 13), the turn mode changer 51d changes the turn mode displayed on the "change settings" screen D10 to the "automatic brake double-speed turn", the "double-speed turn", or the "all-wheel-drive turn" as illustrated in FIGS. 14A, 14B, and 14C (S8 in FIG. 13). The user operates the turn mode change key B51 or B52 to change the turn mode of the agricultural machine 1 in consideration of, for example, the soil conditions in the agricultural field, the size of the headland area E1, and/or the like.

Upon selection of the "back" key B8 by the user on the "change settings" screen D10 in FIGS. 14A to 14C, the turn mode changer 51d determines that the turn mode displayed on the screen D10 is confirmed (S9 in FIG. 13) and causes the internal memory to store the turn mode. The turn mode changer 51d then outputs, via the communicator 54 to the automatic operation controller 61, a change command to cause the agricultural machine 1 (traveling vehicle body 3) to turn in the confirmed turn mode, and causes the display operation interface 52 to display the "travel control" screen D8 again (S10). Upon receipt of the change command form the turn mode changer 51d, the automatic operation controller 61 causes the agricultural machine 1 (traveling vehicle body 3) to turn in the turn mode indicated by the change command when making all subsequent turns or only when making the next turn. Then, if the automatic operation of the agricultural machine 1 is not ended (NO in S11), the turn mode changer 51d repeats step S3 and subsequent steps.

Figure 14D:
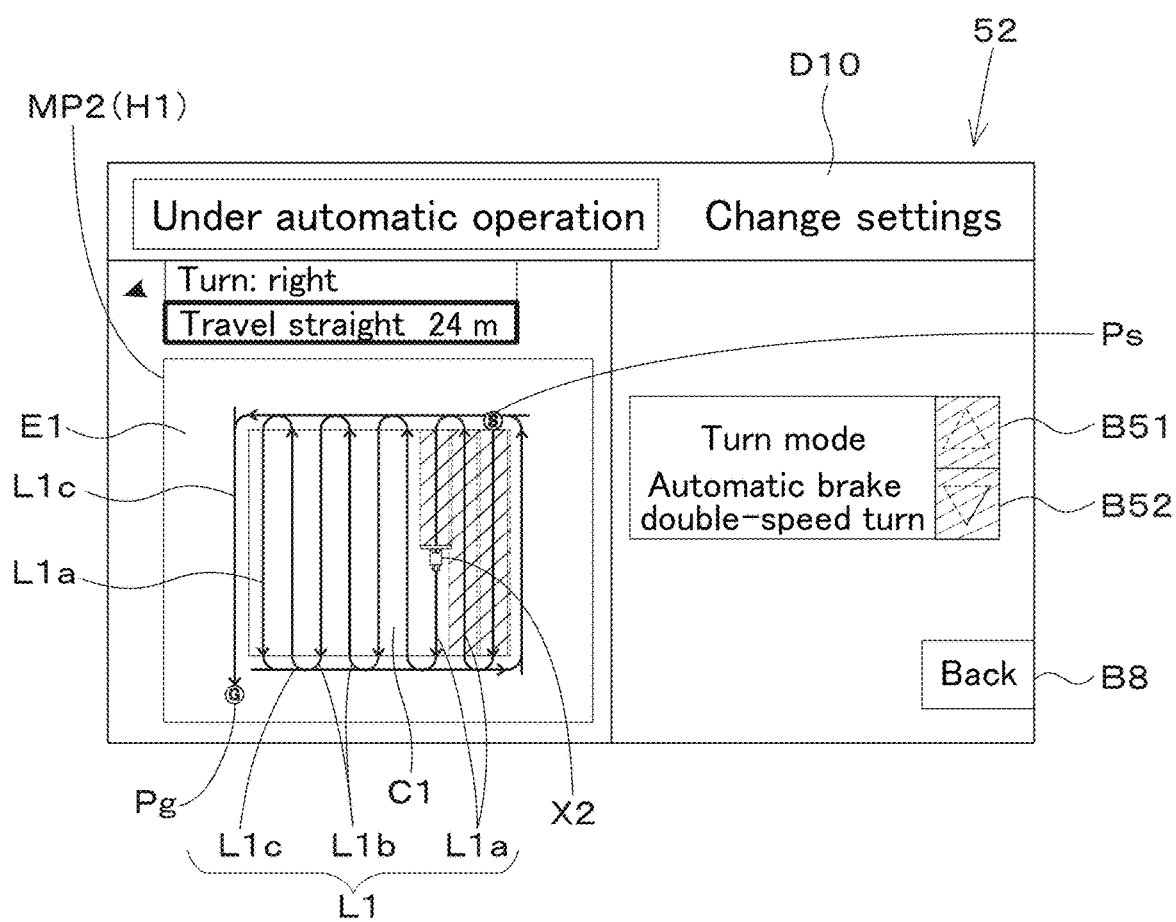
FIG. 14D illustrates still a further example of the "change settings" screen.

On the other hand, upon operation of the "change settings" key B20 (YES in S12) on the "travel control" screen D8 (FIG. 11) when the agricultural machine 1 is turning (YES in S3) or when the agricultural machine 1 is traveling in the headland area E1 (YES in S4), the turn mode changer 51d causes the display operation interface 52 to display the "change settings" screen D10 as illustrated in FIG. 14D and disables (makes inoperable) the turn mode change keys B51 and B52 on the screen D10 (S13).

The "change settings" screen D10 illustrated in FIG. 14D displays the turn mode change keys B51 and B52 such that they cannot be tapped (cannot be operated). That is, the display operation interface 52 is not allowed to receive input to change the turn mode of the agricultural machine 1. Therefore, the turn mode of the agricultural machine 1 cannot be changed while the agricultural machine 1 is turning and while the agricultural machine 1 is traveling in the headland area E1.

Upon selection of the "back" key B8 by the user on the "change settings" screen D10 in FIG. 14D (S14 in FIG. 13), the turn mode changer 51*d* causes the display operation interface 52 to display the "travel control" screen D8 again (S15). Then, if the automatic operation of the agricultural machine 1 is not ended (NO in S11), the turn mode changer 51*d* repeats step S3 and subsequent steps.

The automatic operation controller 61 causes the working device 2 to do ground work while causing the traveling vehicle body 3 to travel in automatic operation based on the travel route L1 and the position of the traveling vehicle body 3, so that the working device 2 reaches the goal point Pg. Upon reaching the goal point Pg, the automatic operation controller 61 stops the automatic traveling-and-working mode (automatic operation) to stop the traveling vehicle body 3 and the working device 2. This is the end of the agricultural job performed by the agricultural machine 1 and the working device 2 based on the travel route L1 in the automatic traveling-and-working mode. Then, the turn mode changer 51*d* confirms that the automatic operation of the agricultural machine 1 is ended (YES in S11), and the turn mode changing process ends.

In the above-discussed preferred embodiment, the display operation interface 52 is not allowed to receive the input to cause the turn mode changer 51*d* to change the turn mode of the agricultural machine 1 while the agricultural machine 1 is turning and while the agricultural machine 1 is traveling in the headland area E1. However, the display operation interface 52 may be allowed to receive the input to cause the turn mode changer 51*d* to change the turn mode also while the agricultural machine 1 is turning and/or while the agricultural machine 1 is traveling in the headland area E1. In such a case, the turn mode changer 51*d* performs the turn mode changing process in the manner as shown in, for example, FIGS. 15A and 15B.

Figure 15A:
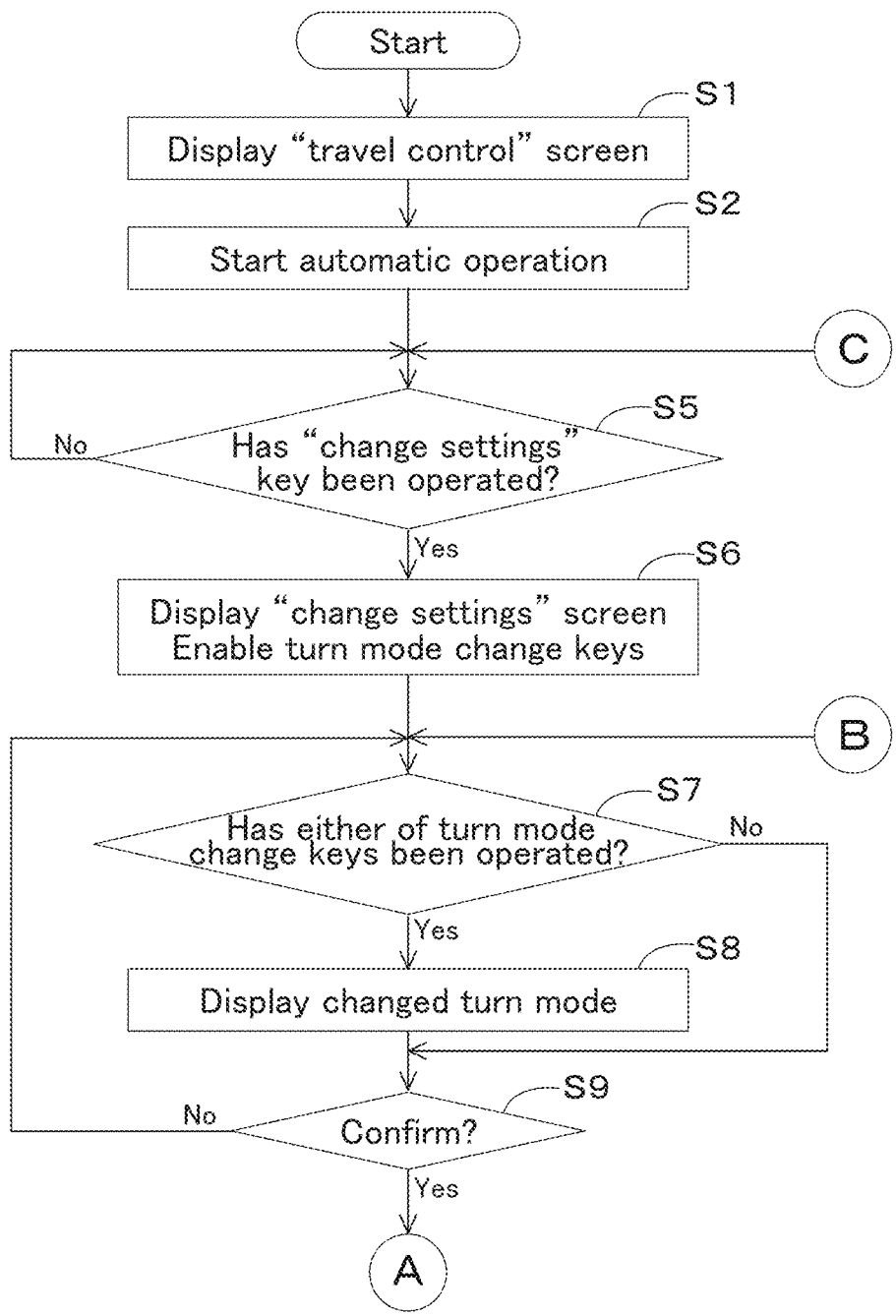
FIG. 15A is a flowchart showing another example of the turn mode changing process.
Figure 15B:
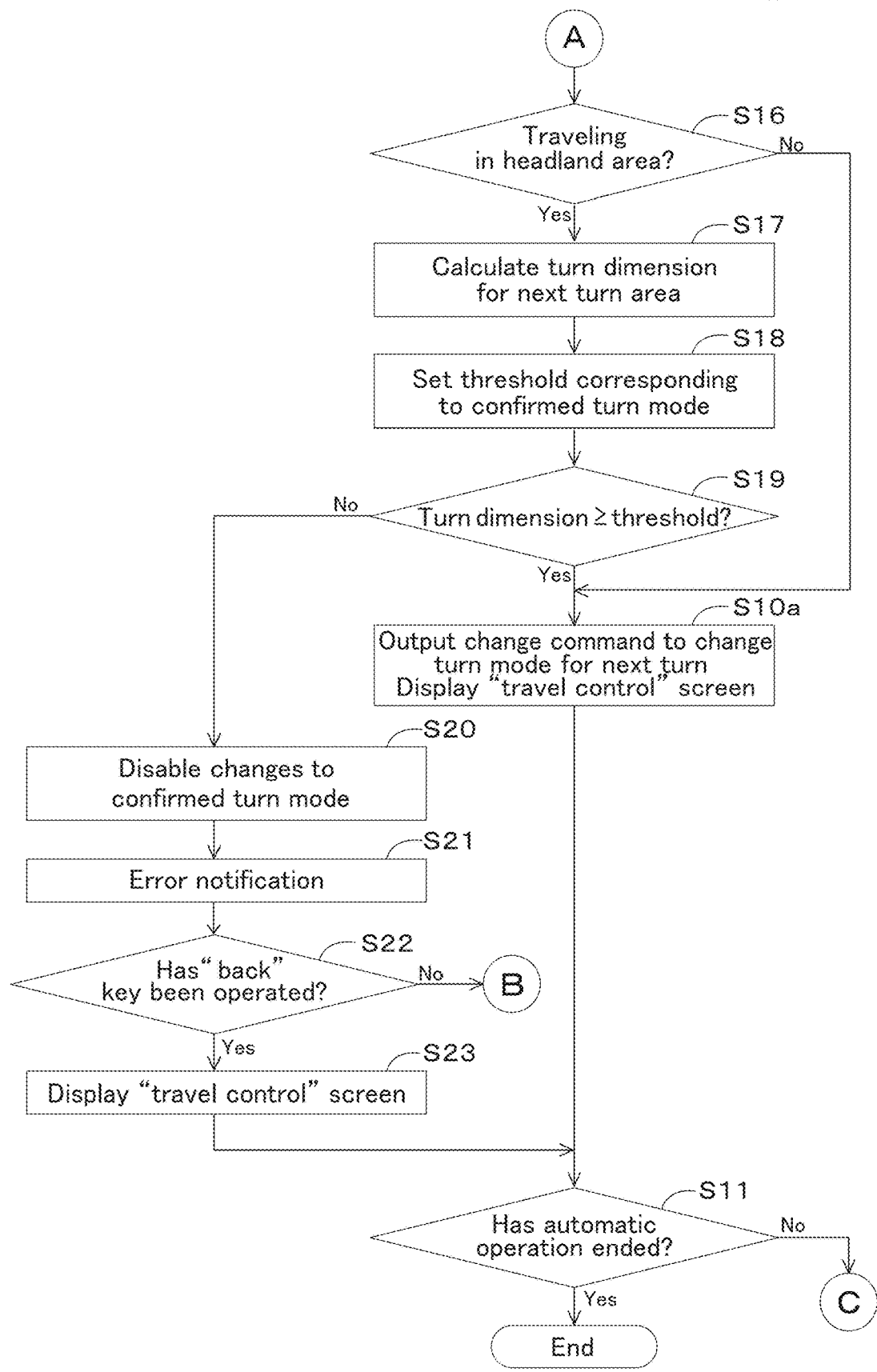
FIG. 15B is a flowchart continuing from FIG. 15A.

FIGS. 15A and 15B are flowcharts showing another example of the turn mode changing process. In FIGS. 15A and 15B, the same steps as those in FIG. 13 are assigned identical reference signs. Once the turn mode changer 51*d* has determined that the "travel control" screen D8 is displayed (S1 in FIG. 15A) and the automatic operation of the agricultural machine 1 is started (S2), upon operation of the "change settings" key B20 (YES in S5), the turn mode changer 51*d* causes the display operation interface 52 to display the "change settings" screen D10 (any of the "change settings" screens D10 in FIGS. 14A to 14C) and enables the turn mode change keys B51 and B52 (S6). That is, the turn mode changer 51*d* allows the display operation interface 52 to receive input to change the turn mode also while the agricultural machine 1 is turning and while the agricultural machine 1 is traveling in the headland area E1.

Once the user has, for example, checked and/or changed the turn mode on the "change settings" screen D10 and then selected the "back" key B8, the turn mode changer 51*d* determines that the turn mode displayed on the screen D10 is confirmed (S9) and causes the internal memory to store the turn mode. It is noted here that if the agricultural machine 1 is not traveling in the headland area E1 (NO in S16 in FIG. 15B), the turn mode changer 51*d* outputs, via the communicator 54 to the automatic operation controller 61, a change command to cause the agricultural machine 1 (traveling vehicle body 3) to turn in the confirmed turn mode next time the agricultural machine 1 (traveling vehicle body 3) turns, and causes the display operation interface 52 to display the "travel control" screen D8 again (S10*a*).

Upon receipt of the change command regarding the turn mode from the turn mode changer 51*d*, if the agricultural machine 1 is currently turning, the automatic operation controller 61 does not change the current turn mode but causes the agricultural machine 1 (traveling vehicle body 3) to turn in the turn mode indicated by the change command the next time the agricultural machine 1 (traveling vehicle body 3) turns. That is, while the agricultural machine 1 is turning, the current turn mode is not changed to the turn mode inputted via the input 52. Also when the agricultural machine 1 is not turning, the automatic operation controller 61 causes the agricultural machine 1 to turn in the turn mode indicated by the change command the next time the agricultural machine 1 turns.

If the agricultural machine 1 is traveling in the headland area E1 (YES in S16 in FIG. 15B), the turn mode changer 51*d* determines a turn space at a location where the next time the agricultural machine 1 turns, and calculates a turn dimension indicative of the size of the determined turn space (S17). In so doing, the turn mode changer 51*d* calculates the turn dimension of the determined turn space based on the size information of the agricultural machine 1 and the working device 2, the position information of the areas C1 and E1 and the work route portions L1*a* and L1*s*, the position of the agricultural machine 1, and/or the like stored in the internal memory of the controller 51 (described later).

Figure 16A:
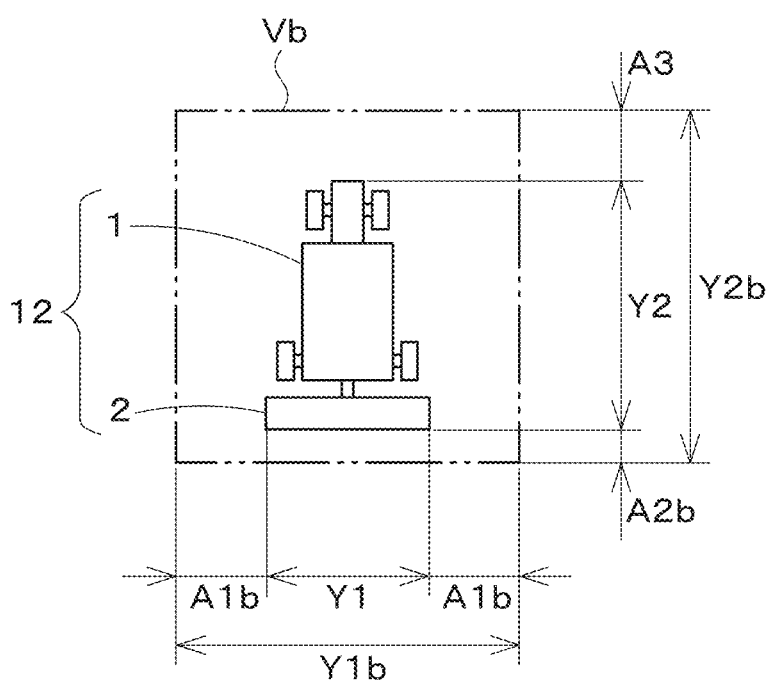
FIG. 16A illustrates an example of a safety space for an agricultural machine.
Figure 16B:
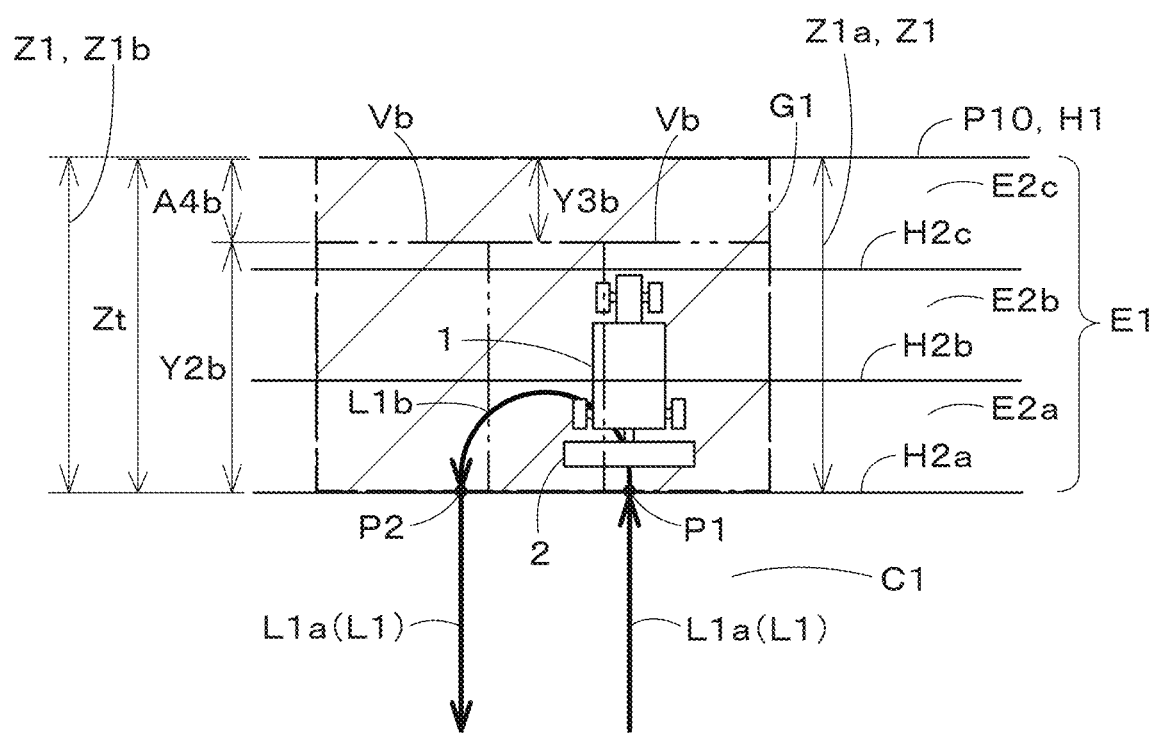
FIG. 16B illustrates an example of a turn dimension for an agricultural machine.
Figure 16C:
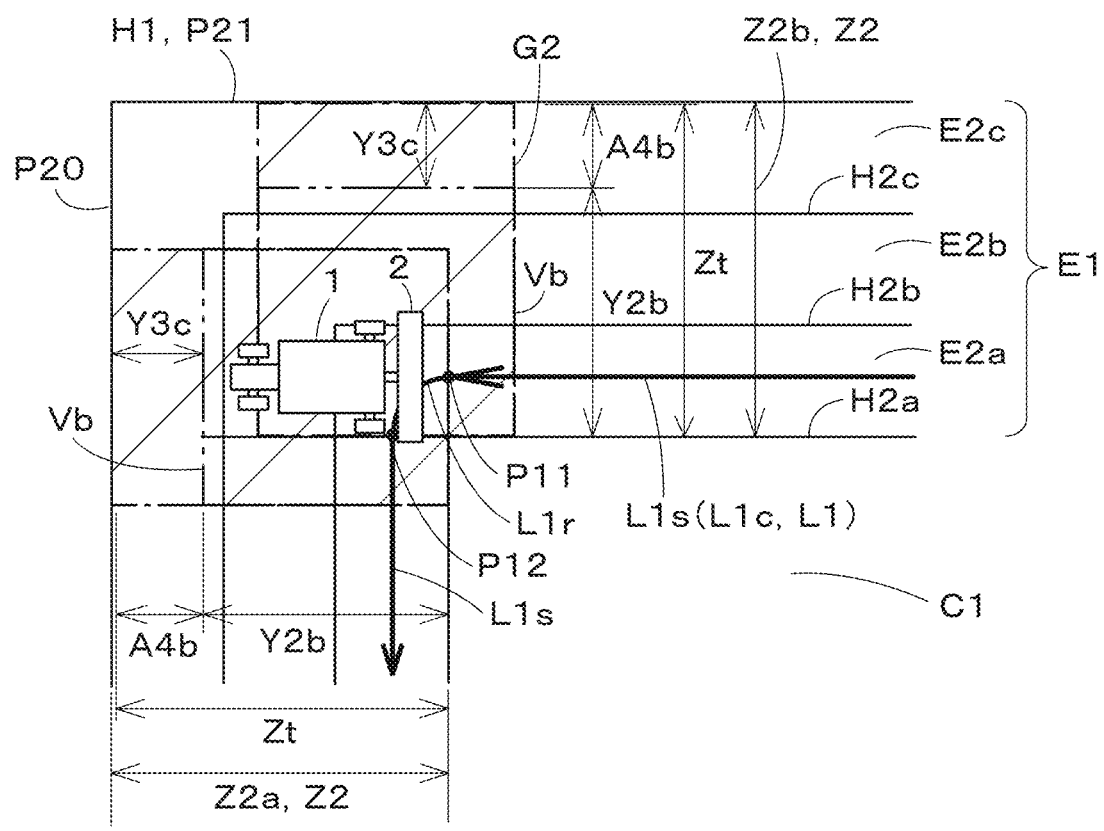
FIG. 16C illustrates another example of a turn dimension for an agricultural machine.

FIG. 16A illustrates a safety space Vb for the agricultural machine 1. FIG. 16B illustrates a turn space G1 and a turn dimension Z1 for the agricultural machine 1. FIG. 16C illustrates another turn space G2 and another turn dimension Z2 for the agricultural machine 1.

When creating the foregoing travel route L1, for example, as illustrated in FIG. 16A, the route creator 51*c* calculates an imaginary width Y1*b* by adding predetermined first safety margins A1*b* to the total width Y1 of an agricultural work unit 12 at the left and right of the total width Y1 (the total width of the working device 2 in FIG. 16A) (Y1*b*=Y1+A1*b*× 2). Note that the agricultural work unit 12 is a unit of the agricultural machine 1 and the working device 2 linked to the agricultural machine 1. The route creator 51*c* also calculates an imaginary length Y2*b* by adding a predetermined second safety margin A2*b* to the total length Y2 of the agricultural work unit 12 at the rear of the total length Y2 and adding a predetermined third safety margin A3 to the total length Y2 of the agricultural work unit 12 at the front of the total length Y2 (Y2*b*=Y2+A2*b*+A3). Note that the total length Y2 is, in FIG. 16A, the distance from the front end of the traveling vehicle body 3 of the agricultural machine 1 (the opposite end of the traveling vehicle body 3 from the working device 2) to the rear end of the working device 2 linked via the connectors 8*h* and 8*g* to the rear of the traveling vehicle body 3 (the opposite end of the working device 2 from the traveling vehicle body 3).

Next, the route creator 51*c* calculates a safety space Vb in the form of a rectangle determined by the imaginary width Y1*b* and the imaginary length Y2*b*. The safety space Vb is space to be left for safety between the agricultural work unit 12 and its surroundings in the case where the agricultural machine 1 is an unattended agricultural machine (autonomous agricultural machine) 1B which can operate automatically without human attendance. In the case where the agricultural machine 1 is an attended agricultural machine 1A which can be operated by an operator seated on the operator's seat 10 (FIG. 18) using the manual operator 62, the imaginary length and the safety space may be calculated without adding the second safety margin A2*b* and/or the third safety margin A3.

As illustrated in FIG. 16B, when creating a turn route portion L1*b* extending from one of adjacent straight route portions L1*a* in the central area C1 to the other, the route creator 51*c* places a safety space Vb such that the safety space Vb extends from the end point P1 of the one of the straight route portions L1a toward the nearest end P10 of the agricultural field map MP2 that is closest from the end point P1 in the direction of travel on that straight route portion L1a. The route creator 51c places another safety space Vb such that the safety space Vb extends from the start point P2 of the other of the straight route portions L1a toward the nearest end P10 of the agricultural field map MP2 that is closest from the start point P2 in the direction opposite to the direction of travel on that straight route portion L1a. Next, the route creator 51c defines, as a turn space G1 (hatched area), an area covered by at least one of the two safety spaces Vb (area within the safety space(s) Vb) and the area between the safety spaces Vb and the end P10 of the agricultural field map MP2. The route creator 51c also creates, in the turn space G1, the turn route portion L1b extending from the one of the straight route portions L1a to the other.

The turn mode changer 51d detects that the turn space G1 is defined as described above, based on the size information of the agricultural machine 1 and the working device 2, the position information of the areas C1 and E1 and the work route portions L1a and L1s, the position of the agricultural machine 1, and/or the like. Next, the turn mode changer 51d calculates, as the turn dimension Z1 of the turn space G1, a width Z1a of the turn space G1 extending from the end point P1 of the one of the straight route portions L1a in the direction of travel on the one of the straight route portions L1a or a width Z1b of the turn space G1 extending from the start point P2 of the other of the straight route portions L1a in the direction opposite to the direction of travel on the other of the straight route portions L1a. Specifically, the turn mode changer 51d calculates the width Z1a or Z1b and the turn dimension Z1 of the turn space G1 by adding a margin Y3b (which is the distance between the safety space Vb and the end P10 of the agricultural field map MP2) to the imaginary length Y2b of one of the safety spaces Vb ($Z1a=Y2b+Y3b=Z1$, $Z1b=Y2b+Y3b=Z1$). In the example in FIG. 16B, the distance from the end point P1 of the one of the straight route portions L1a to the nearest end P10 of the agricultural field map MP2 is the same as the distance from the start point P2 of the other of the straight route portions L1a to the nearest end P10 of the agricultural field map MP2, and therefore the width Z1a and the width Z1b of the turn space G1 have the same value ($Z1a=Z1b=Z1$).

As illustrated in FIG. 16C, when creating a turn route portion L1r extending from one of adjacent straight route portions L1s to the other of the straight route portions L1s of the go-around route portion L1c in the headland area E1, the route creator 51c places a safety space Vb such that the safety space Vb extends from the end point P11 of the one of the straight route portions L1s to the nearest end P20 of the agricultural field map MP2 that is closest from the end point P11 in the direction of travel on that straight route portion L1s. The route creator 51c places another safety space Vb such that the safety space Vb extends from the start point P12 of the other of the straight route portions L1s to the nearest end P21 of the agricultural field map MP2 that is closest from the start point P12 in the direction opposite to the direction of travel on that straight route portion L1s. Next, the route creator 51c defines, as a turn space G2 (hatched area), an area covered by at least one of the two safety spaces Vb, the area between the safety space Vb and the end P20, and the area between the other safety space Vb and the end P21 of the agricultural field map MP2. The route creator 51c also creates, in the turn space G2, the turn route portion L1r extending from the one of the straight route portions L1s to the other.

The turn mode changer 51d detects that the turn space G2 is defined as described above, based on the size information of the agricultural machine 1 and the working device 2, the position information of the areas C1 and E1 and the work route portions L1a and L1s, the position of the agricultural machine 1, and/or the like. Next, the turn mode changer 51d calculates, as the turn dimension Z2 of the turn space G2, a width Z2a of the turn space G2 extending from the end point P11 of the one of the straight route portions L1s in the direction of travel on the one of the straight route portions L1s or a width Z2b of the turn space G2 extending from the start point P12 of the other of the straight route portions L1s in the direction opposite to the direction of travel on the other of the straight route portions L1s.

Specifically, the turn mode changer 51d calculates the width Z2a or Z2b and the turn dimension Z2 of the turn space G2 by adding a margin Y3c (which is the distance between the safety space Vb and the end P20 or P21 of the agricultural field map MP2) to the imaginary length Y2b of one of the safety spaces Vb ($Z2a=Y2b+Y3c=Z2$, $Z2b=Y2b+Y3c=Z2$). Also in the example in FIG. 16C, the distance from the end point P11 of the one of the straight route portions L1s to the nearest end P20 of the agricultural field map MP2 is the same as the distance from the start point P12 of the other of the straight route portions L1s to the nearest end P21 of the agricultural field map MP2, and therefore the width Z2a and the width Z2b of the turn space G2 have the same value ($Z2a=Z2b=Z2$).

In the examples as discussed above, the route creator 51c places safety spaces Vb in a virtual manner both between the end point P1 (P11) of one of the adjacent straight route portions L1a (L1s) and the end P10 (P20) of the agricultural field map MP2 and between the start point P2 (P12) of the other of the straight route portions L1a (L1s) and the end P10 (P21) of the agricultural field map MP2. Alternatively, the route creator 51c may place a safety space Vb in a virtual manner either between the end point P1 (P11) of one of the straight route portions L1a (L1s) and the end P10 (P20) of the agricultural field map MP2 or between the start point P2 (P12) of the other of the straight route portions L1a (L1s) and the end P10 (P21) of the agricultural field map MP2.

The route creator 51c may define a turn space by combining the safety space(s) Vb with space extending from the safety space(s) Vb to the end P10 (P20, P21) of the agricultural field map MP2. The turn mode changer 51d may calculate, as the turn dimension Z1 (Z2), the width of the turn space (i.e., the width Z1a or Z1b of the turn space in which the turn route portion L1b is created or the width Z2a or Z2b of the turn space in which the turn route portion L1r is created).

As described earlier, after the turn mode changer 51d calculates the turn dimension(s) Z1 and/or Z2 of the determined turn space(s) G1 and/or G2 where the agricultural machine 1 turns next time (S17 in FIG. 15B), the turn mode changer 51d sets a threshold Zt corresponding to the turn mode confirmed in step S9 in FIG. 15A (S18). For example, an ideal turn dimension, for the agricultural machine 1 and the working device 2 to turn normally in each of the "all-wheel-drive turn", "double-speed turn", and "automatic brake double-speed turn" modes without going beyond the outline H1 of the agricultural field map MP2 (agricultural field) or becoming unable to turn, is preset based on design, test(s), the results of simulation(s), and/or the like, and such ideal turn dimensions are stored in a predetermined memory area of the memory 53 (FIG. 1) as thresholds Zt corresponding to the respective turn modes.

Specifically, as illustrated in FIGS. 16B and 16C, the sum of the imaginary length Y2b of a safety space Vb and a predetermined fourth safety margin A4b is set as a threshold Zt (Zt=Y2b+A4b=Y2+A2b+A3+A4b). There are different fourth safety margins A4b preset for the "all-wheel-drive turn", "double-speed turn", and "automatic brake double-speed turn" modes, respectively. Of these, for example, the fourth safety margin A4b set for the "all-wheel-drive turn" is largest and the fourth safety margin A4b set for the "automatic brake double-speed turn" is smallest.

If the turn dimension Z1 (Z2) is equal to or greater than a corresponding threshold Zt (YES in S19 in FIG. 15B), the turn mode changer 51d outputs, via the communicator 54 to the automatic operation controller 61, a change command to cause the agricultural machine 1 (traveling vehicle body 3) to turn in the turn mode confirmed in step S9 in FIG. 15A the next time the agricultural machine 1 (traveling vehicle body 3) turns, and causes the display operation interface 52 to display the "travel control" screen D8 again (S10a in FIG. 15B).

Figure 17:
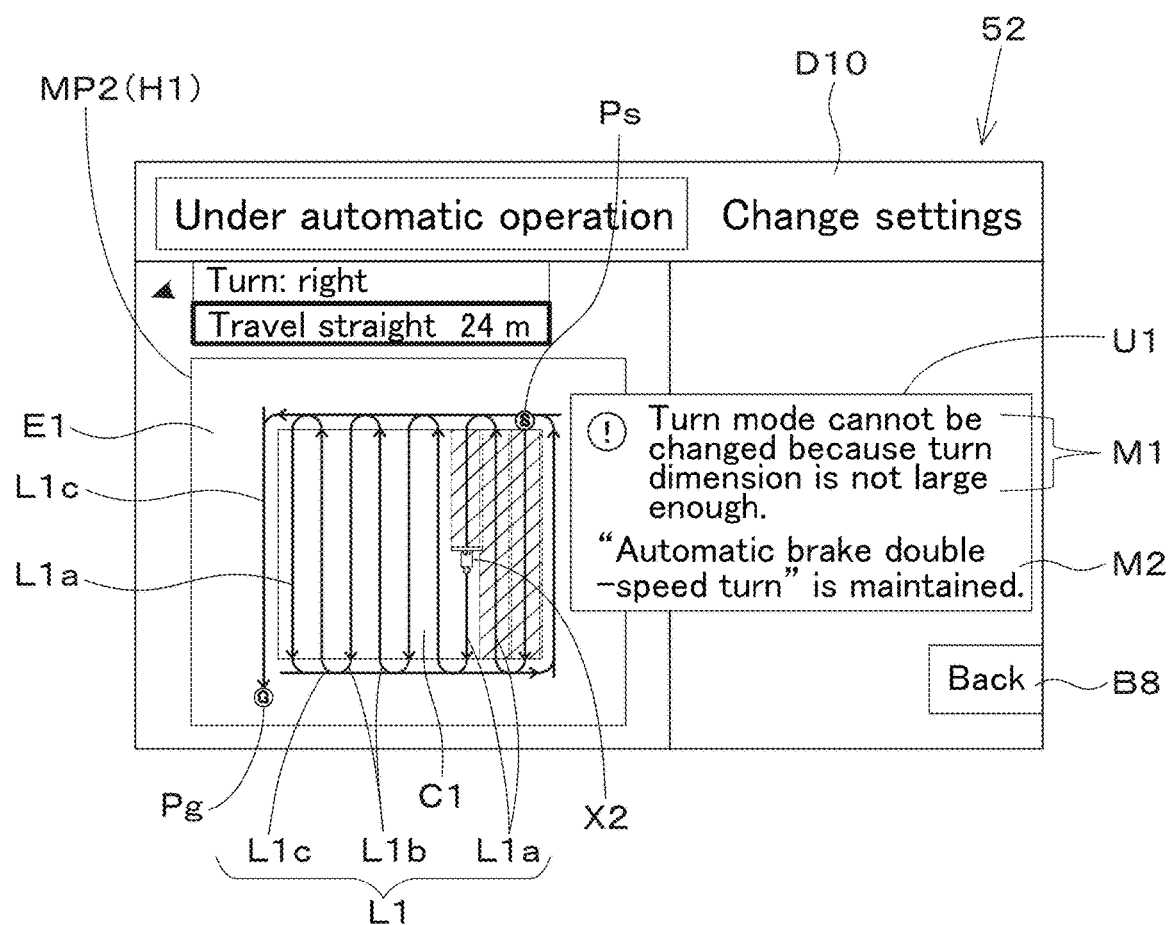
FIG. 17 illustrates an example of an error notification on the "change settings" screen.

On the contrary, if the turn dimension Z1 (Z2) is less than the threshold Zt (NO in S19), the turn mode changer 51d determines that the turn dimension Z1 (Z2) is not large enough, and the turn mode changer 51d disables changes to the turn mode confirmed in step S9 in FIG. 15A (S20 in FIG. 15B) and causes the notifier 51g to give an error notification (S21). In so doing, for example, as illustrated in FIG. 17, the notifier 51g causes an error notification U1 in the form of a popup window to appear on the "change settings" screen D10 (FIGS. 14A to 14C). The error notification U1 includes a message M1 indicating that the turn mode cannot be changed because the turn dimension is not large enough and a message M2 indicating that the current turn mode is maintained.

Once the user has visually recognized the error notification U1 and then tapped the "change settings" screen D10, the error notification U1 disappears. Next, once the user has operated the turn mode change key B51 or B52 to change the turn mode to a different turn mode (NO in S22 in FIG. 15B, YES in S7, S8 in FIG. 15A) and then operated the "back" key B8, the turn mode changer 51d determines that the turn mode is confirmed (YES in S9) and repeats step S16 and subsequent steps in FIG. 15B.

Once the user has operated the "back" key B8 without operating the turn mode change key B51 or B52 (YES in S22), the turn mode changer 51d causes the display operation interface 52 to display the "travel control" screen D8 again (S23). In addition, the turn mode changer 51d deletes, from the internal memory of the controller 51, information indictive of the turn mode confirmed in step S9 in FIG. 15A. Next, if the automatic operation of the agricultural machine 1 is not ended (NO in S11 in FIG. 15B), the turn mode changer 51d repeats step S5 and subsequent steps in FIG. 15A.

In the above-described preferred embodiment, the "all-wheel-drive turn", "double-speed turn", and the "automatic brake double-speed turn" modes are discussed as examples of the turn mode for the automatic operation of the agricultural machine 1. Note, however, that the agricultural machine 1 may be caused to turn during the automatic operation in some other turn mode such as a "2WD turn" mode or a "limited 2WD turn" mode, for example. The "2WD turn" mode is a mode in which the agricultural machine 1 travels in two-wheel drive state (2WD) in which only the rear wheels 7R are driven and makes a turn in the same two-wheel drive state. The "limited 2WD turn" mode is a mode in which the agricultural machine 1 travels in four-wheel drive state and makes a turn in the two-wheel drive state. The agricultural machine 1 may be caused to turn during the automatic operation in a turn mode in which any of the "all-wheel-drive turn", "2WD turn", and "limited 2WD turn" modes is combined with an automatic brake function to brake the rear wheel 7R on the inside of the turn with the brake 6.

The above-described preferred embodiment discusses an example in which the controller 51 of the agricultural assistance apparatus 50 includes the agricultural field registrar 51a, the area definer 51b, the route creator 51c, the turn mode changer 51d, and the notifier 51g. Additionally or alternatively, for example, one or more of the agricultural field registrar 51a, the area definer 51b, the route creator 51c, the turn mode changer 51d, and the notifier 51g may be provided in the controller 60 of the agricultural machine 1 or be device(s) independent of the controller 51.

The input may be, instead of the display operation interface 52, a communication circuit and/or an input interface via which, for example, registration information such as the agricultural field map MP2 (agricultural field), the agricultural machine 1, the working device 2, and/or the job setting(s) is inputted from a server or a storage medium storing such registration information into the agricultural assistance apparatus 50. The input, the display, and the output may each be a communication circuit, an input interface, a display, a touch pad, key(s), and/or an output interface provided on the agricultural machine 1, instead of or in addition to the display operation interface 52 and the communicator 54 of the agricultural assistance apparatus 50. The display operation interface 52 outputs information such as the travel route L1 such that the user can visually recognize the information by displaying the information, and therefore the display operation interface 52 can be regarded as an output.

The agricultural assistance apparatus 50 may be, instead of a portable tablet terminal, a smartphone or a terminal fixed to the agricultural machine 1, for example. The agricultural assistance apparatus may be an electronic device such as a PC which is not located on the agricultural machine 1, such as a server provided in the cloud, for example. The agricultural assistance system may include, instead of the agricultural assistance apparatus, application program(s) which can be acquired from the cloud and installed on an electronic device owned by a user, for example. In such a case, the agricultural field registrar 51a, the area definer 51b, the route creator 51c, the turn mode changer 51d, and the notifier 51g may be the application program(s), and notification(s) from the notifier may be displayed on a display included in or connected to an electronic device on which the application program(s) is/are installed. Notification(s) from the notifier may be in the form of sound outputted from speaker(s) of the agricultural machine and/or the electronic device.

The agricultural assistance system 100, the agricultural machine 1, and the agricultural assistance apparatus 50 of preferred embodiments as discussed above include the following feature(s) and achieve the following effect(s).

An agricultural assistance system 100 according to one or more preferred embodiments includes a route creator 51c to create, on a map (agricultural field map) MP2 representing an agricultural field, a travel route L1 along which an agricultural machine 1 travels, an input (display operation interface) 52 to receive input of a turn mode which is one of turn modes differing in terms of how a traveling device 7 of the agricultural machine 1 is driven, a position detector (positioning device) 40 to detect a position of the agricultural machine 1, an automatic operation controller 61 to perform automatic operation of the agricultural machine 1 based on the travel route L1 created by the route creator 51c, the turn mode inputted via the input 52, and the position of the agricultural machine 1 detected by the position detector 40, and a turn mode changer 51d to, during the automatic operation of the agricultural machine 1 performed by the automatic operation controller 61, allow the input 52 to receive input of another turn mode to change the turn mode to the other turn mode, the other turn mode being another of the turn modes, and output, to the automatic operation controller 61, a change command to cause the agricultural machine 1 to turn in the other turn mode inputted via the input 52.

An agricultural machine 1 according to one or more preferred embodiments includes a vehicle body (traveling vehicle body) 3, a connector 8g, 8h to link a working device 2 to the vehicle body 3, a prime mover 4, a traveling device 7 including front wheels 7F and rear wheels 7R to be driven to cause the vehicle body 3 to travel, the front wheels 7F supporting left and right front portions of the vehicle body 3, the rear wheels 7R supporting left and right rear portions of the vehicle body 3, a transmission 5 to transmit power from the prime mover 4 to the traveling device 7 and change a rotation speed of the front wheels 7F and the rear wheels 7R, a brake 6 to brake at least one of the front wheels 7F and the rear wheels 7R, a route creator 51c to create, on a map MP2 representing an agricultural field, a travel route L1 along which the agricultural machine 1 travels, an input 52 to receive input of a turn mode which is one of turn modes differing in terms of how the traveling device 7 is driven, a position detector 40 to detect a position of the vehicle body 3, an automatic operation controller 61 to perform automatic operation of the vehicle body 3 based on the travel route L1 created by the route creator 51c, the turn mode inputted via the input 52, and the position of the vehicle body 3 detected by the position detector 40, and a turn mode changer 51d to, during the automatic operation performed by the automatic operation controller 61, allow the input 52 to receive input of another turn mode to change the turn mode to the other turn mode, the other turn mode being another of the turn modes, and output, to the automatic operation controller 61, a change command to cause the vehicle body 3 to turn in the other turn mode inputted via the input 52.

An agricultural assistance apparatus 50 according to one or more preferred embodiments includes a route creator 51c to create, on a map MP2 representing an agricultural field, a travel route L1 along which an agricultural machine 1 travels, an input 52 to receive input of a turn mode which is one of turn modes differing in terms of how a traveling device 7 of the agricultural machine 1 is driven, and a turn mode changer 51d to change the turn mode, wherein the turn mode changer 51d is configured or programmed to, during the automatic operation of the agricultural machine 1 performed by the automatic operation controller 61 based on the travel route L1 created by the route creator 51c, the turn mode inputted via the input 52, and a position of the vehicle body 3 detected by a position detector 40, allow the input 52 to receive input of another turn mode to change the turn mode to the other turn mode, the other turn mode being another of the turn modes, and output, to the automatic operation controller 61, a change command to cause the vehicle body 3 to turn in the other turn mode inputted via the input 52.

With the above configuration, it is possible, during the automatic operation of the agricultural machine 1, to change the pre-set turn mode to the turn mode inputted via the input 52 without having to make various settings about the automatic operation all over again by stopping the automatic operation, making it possible to improve convenience.

In one or more preferred embodiments, the automatic operation controller 61 may be configured or programmed to, during the automatic operation of the agricultural machine 1 (vehicle body 3), upon receipt of the change command from the turn mode changer 51d, cause the agricultural machine 1 (vehicle body 3) to turn in the other turn mode indicated by the change command. This makes it possible to cause the agricultural machine 1 to turn in the changed turn mode during the automatic operation of the agricultural machine 1, making it possible to improve convenience.

In one or more preferred embodiments, the turn mode changer 51d may be configured or programmed to not allow the input 52 to receive input of the other turn mode to change the turn mode to the other turn mode, while the agricultural machine 1 is turning during the automatic operation of the agricultural machine 1 performed by the automatic operation controller 61. With this, the turn mode is not changed while the agricultural machine 1 is turning during the automatic operation of the agricultural machine 1, making it possible to eliminate or reduce the likelihood that the turning radius of the agricultural machine 1 will change suddenly or that the behavior of the agricultural machine 1 will become unstable.

In one or more preferred embodiments, the turn mode changer 51d may be configured or programmed to, upon receipt of input of the other turn mode by the input 52 while the agricultural machine 1 is turning during the automatic operation of the agricultural machine 1 performed by the automatic operation controller 61, output, to the automatic operation controller 61, the change command to cause the agricultural machine 1 to turn in the inputted other turn mode next time the agricultural machine 1 turns. With this, the turn mode is not changed while the agricultural machine 1 is turning during the automatic operation of the agricultural machine 1, making it possible to stably perform the current turn of the agricultural machine 1. It is also possible to change the turn mode to the turn mode inputted via the input 52 next time the agricultural machine 1 turns, making it possible to improve convenience.

In one or more preferred embodiments, the agricultural assistance system 100 may further include an area definer 51b to define, in the map MP2, a first area (headland area) E1 and a second area (central area) C1 located inward of the first area E1. The route creator 51c may be configured or programmed to create work route portions L1a, L1s in the first area E1 and/or the second area C1, the work route portions L1a, L1s being portions which are included in the travel route L1 and along which an agricultural job is performed by a working device 2 linked to the agricultural machine 1 during travel of the agricultural machine 1. The turn mode changer 51d may be configured or programmed to, during the automatic operation of the agricultural machine 1 performed by the automatic operation controller 61 based on the work route portions L1a, L1s, not allow the input 52 to receive input of the other turn mode to change the turn mode in which the agricultural machine 1 turns from one L1a, L1s of the work route portions L1a, L1s toward another L1s of the work route portions L1a, L1s that is created in the first area E1.

With this, during the automatic operation of the agricultural machine 1, the turn mode in which the agricultural machine 1 turns toward a work route portion L1s created in the first area E1 is not changed to the turn mode inputted via the input 52. This makes it possible, for example, to eliminate or reduce the likelihood that the turn mode in the narrow first area E1 will be changed to a turn mode with a large turning radius and that the agricultural machine 1 will become unable to turn.

In one or more preferred embodiments, the agricultural assistance system 100 may further include an area definer 51*b* to define, in the map MP2, a first area (headland area) E1 and a second area (central area) C1 located inward of the first area E1. The route creator 51*c* may be configured or programmed to create work route portions L1*a*, L1*s* in the first area E1 and/or the second area C1, the work route portions L1*a*, L1*s* being portions which are included in the travel route L1 and along which an agricultural job is performed by a working device 2 linked to the agricultural machine 1 during travel of the agricultural machine 1. The turn mode changer 51*d* may be configured or programmed such that, during the automatic operation of the agricultural machine 1 performed by the automatic operation controller 61, if a turn dimension Z1, Z2 indicative of a size of a turn space G1, G2 for the agricultural machine 1 to turn from one L1*a*, L1*s* of the work route portions L1*a*, L1*s* toward another L1*s* of the work route portions L1*a*, L1*s* that is created in the first area E1 is equal to or greater than a predetermined threshold Zt corresponding to the turn mode inputted via the input 52, the turn mode changer 51*d* outputs, to the automatic operation controller 61, the change command to cause the agricultural machine 1 to turn in the turn mode inputted via the input 52, and if the turn dimension Z1, Z2 is less than the threshold Zt, the turn mode changer 51*d* does not cause the agricultural machine 1 to turn in the turn mode inputted via the input 52.

With this, during the automatic operation of the agricultural machine 1, if the turn dimension Z1, Z2 for the agricultural machine 1 to turn toward a work route portion L1*s* in the first area E1 is not large enough and is less than the threshold Zt, the turn mode is not changed to the turn mode inputted via the input 52. This makes it possible to eliminate or reduce the likelihood that the agricultural machine 1 will become unable to turn. If the turn dimension Z1, Z2 is large enough and is equal to or greater than the threshold Zt, the turn mode is changed to the turn mode inputted via the input 52, making it possible to improve convenience.

In one or more preferred embodiments, the turn mode in which the agricultural machine 1 turns from the one L1*a*, L1*s* of the work route portions L1*a*, L1*s* toward the other L1*s* of the work route portions L1*a*, L1*s* that is created in the first area E1, the turn mode having been set before start of the automatic operation of the agricultural machine 1 performed by the automatic operation controller 61, may be one of the turn modes that is with the smallest turning radius. This makes it possible, during the automatic operation of the agricultural machine 1, to cause the agricultural machine 1 to stably turn in the turn mode with a small turning radius in the first area E1 having a narrow width.

In one or more preferred embodiments, the agricultural machine 1 may include a prime mover 4, a traveling device 7 including front wheels 7F and rear wheels 7R, a transmission 5 to transmit power from the prime mover 4 to the traveling device 7 and change a rotation speed of the front wheels 7F and the rear wheels 7R, and a brake 6 to brake at least one of the front wheels 7F and the rear wheels 7R. The automatic operation controller 61 may be configured or programmed to control the traveling device 7, the transmission 5, and the brake 6 to cause the agricultural machine 1 to turn in any of the turn modes at least including an all-wheel-drive turn, a double-speed turn, and an automatic brake double-speed turn, the all-wheel-drive turn being a mode in which the front wheels 7F and the rear wheels 7R are driven such that one of the front wheels 7F and one of the rear wheels 7R on outside of the turn are rotated at a higher speed than another of the front wheels 7F and another of the rear wheels 7R on inside of the turn, the double-speed turn being a mode in which the front wheels 7F are rotated at a speed twice as fast as the rear wheels 7R and the one of the front wheels 7F and the one of the rear wheels 7R on the outside of the turn are rotated at a higher speed than the other of the front wheels 7F and the other of the rear wheels 7R on the inside of the turn, the automatic brake double-speed turn being a mode in which the front wheels 7F are rotated at a speed twice as fast as the rear wheels 7R and the other of the rear wheels 7R on the inside of the turn is braked by the brake 6. The input 52 may be configured or programmed to receive input of the all-wheel-drive turn, the double-speed turn, or the automatic brake double-speed turn selectively as the turn mode. This makes it possible, during the automatic operation of the agricultural machine 1, to select, via the input 52, one of the turn modes at least including the all-wheel-drive turn, the double-speed turn, and the automatic brake double-speed turn and cause the agricultural machine to turn in the selected turn mode.

In one or more preferred embodiments, the agricultural assistance system 100, the agricultural machine 1, and the agricultural assistance apparatus 50 may each further include a display (display operation interface) 52 to, during the automatic operation of the agricultural machine 1 (vehicle body 3) performed by the automatic operation controller 61, display the map MP2, the travel route L1, the position of the agricultural machine 1 (vehicle body 3), and the turn mode in which the agricultural machine 1 (vehicle body 3) turns. This makes it possible for the user to, during the automatic operation of the agricultural machine 1, visually recognize the map MP2 representing the agricultural field on which the agricultural job is performed by the agricultural machine 1 and the working device 2, the travel route L1 for the agricultural machine 1, the position of the agricultural machine 1, and the turn mode for the agricultural machine 1 and input a desired turn mode via the input 52 in consideration of the soil conditions and/or the like of the agricultural field. This makes it possible to further improve convenience.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural assistance system comprising:
   a controller, including a processor, to create, on a map representing an agricultural field, a travel route along which an agricultural machine travels;
   an input interface to receive input, from a user, of a first turn mode that is preregistered among more than one predetermined turn modes differing in terms of how a traveling device of the agricultural machine is driven;
   a position detector to detect a position of the agricultural machine;
   an automatic operation controller to perform, based on the travel route created by the controller, the first turn mode, and the position of the agricultural machine detected by the position detector, automatic operation of the agricultural machine to cause the agricultural machine to travel and to cause the agricultural machine to turn in the first turn mode; and a display; wherein in response to the user inputting, during the automatic operation of the agricultural machine performed by the automatic operation controller, a second turn mode which is different from the first turn mode and selected by the user among the more than one predetermined turn modes via the input interface, the controller is configured or programmed to output, to the automatic operation controller, a change command to cause the agricultural machine to turn in the second turn mode;

the automatic operation controller is configured or programmed to, during the automatic operation of the agricultural machine, upon receipt of the change command, cause the agricultural machine to turn in the second turn mode indicated by the change command when the agricultural machine turns in a next turn; and the controller is configured or programmed to:
cause the display to, during the automatic operation of the agricultural machine performed by the automatic operation controller, display the map, the travel route, the position of the agricultural machine, and the first turn mode, and operably display a turn mode change key, to thereby allow the input interface to receive input of the second turn mode upon operation on the turn mode change key; and
cause the display to, while the agricultural machine is turning during the automatic operation of the agricultural machine performed by the automatic operation controller, inoperably display the turn mode change key, to thereby not allow the input interface to receive input of the second turn mode upon operation on the turn mode change key.

2. The agricultural assistance system according to claim 1, wherein the controller is configured or programmed to, upon receipt of input of the second turn mode by the input interface while the agricultural machine is turning during the automatic operation of the agricultural machine performed by the automatic operation controller, output, to the automatic operation controller, the change command to cause the agricultural machine to turn in the inputted second turn mode when the agricultural machine turns in the next turn.

3. The agricultural assistance system according to claim 1, wherein the controller is configured or programmed to:
define, in the map, a first area and a second area located inward of the first area;
create work route portions in the first area and/or the second area, the work route portions being portions which are included in the travel route and along which an agricultural job is performed by a working device linked to the agricultural machine during travel of the agricultural machine; and
cause the display to, while the agricultural machine is traveling in the first area during the automatic operation of the agricultural machine performed by the automatic operation controller, inoperably display the turn mode change key, to thereby not allow the input interface to receive input of the second turn mode upon operation on the turn mode change key.

4. An agricultural assistance system comprising:

a controller, including a processor, to create, on a map representing an agricultural field, a travel route along which an agricultural machine travels;

an input interface to receive input, from a user, of a first turn mode that is preregistered among more than one predetermined turn modes differing in terms of how a traveling device of the agricultural machine is driven;

a position detector to detect a position of the agricultural machine; and an automatic operation controller to perform, based on the travel route created by the controller, the first turn mode, and the position of the agricultural machine detected by the position detector, automatic operation of the agricultural machine to cause the agricultural machine to travel and to cause the agricultural machine to turn in the first turn mode; wherein the controller is configured or programmed to:
define, in the map, a first area and a second area located inward of the first area;
create work route portions in the first area and/or the second area, the work route portions being portions which are included in the travel route and along which an agricultural job is performed by a working device linked to the agricultural machine during travel of the agricultural machine;
in response to the user inputting, while the agricultural machine is not traveling in the first area during the automatic operation of the agricultural machine performed by the automatic operation controller, a second turn mode which is different from the first turn mode and selected by the user among the more than one predetermined turn modes via the input interface, output, to the automatic operation controller, a change command to cause the agricultural machine to turn in the second turn mode; and
in response to the user inputting the second turn mode via the input interface while the agricultural machine is traveling in the first area during the automatic operation of the agricultural machine performed by the automatic operation controller, calculate a turn dimension indicative of a size of a turn space for the agricultural machine to turn from one of the work route portions toward another of the work route portions that is created in the first area;

the controller is configured or programmed such that:
if the turn dimension is equal to or greater than a predetermined threshold corresponding to the second turn mode inputted via the input interface, the controller outputs, to the automatic operation controller, the change command to cause the agricultural machine to turn in the second turn mode inputted via the input interface, and
if the turn dimension is less than the threshold, the controller does not cause the agricultural machine to turn in the second turn mode inputted via the input interface.

5. The agricultural assistance system according to claim 4, wherein the turn mode in which the agricultural machine turns from the one of the work route portions toward the another of the work route portions that is created in the first area, the turn mode having been set before start of the automatic operation of the agricultural machine performed by the automatic operation controller and before the user inputs the first turn mode via the user interface, is one of the more than one predetermined turn modes having a smallest turning radius.

6. The agricultural assistance system according to claim 4, wherein:

the agricultural machine includes
a prime mover, the traveling device including front wheels and rear wheels,
a transmission to transmit power from the prime mover to the traveling device and change a rotation speed of the front wheels and the rear wheels, and
a brake to brake at least one of the front wheels and the rear wheels;
the automatic operation controller is configured or programmed to control the traveling device, the transmission, and the brake to cause the agricultural machine to turn in any of the turn modes at least including an all-wheel-drive turn, a double-speed turn, and an automatic brake double-speed turn, the all-wheel-drive turn being a mode in which the front wheels and the rear wheels are driven such that one of the front wheels and one of the rear wheels on outside of the turn are rotated at a higher speed than another of the front wheels and another of the rear wheels on inside of the turn, the double-speed turn being a mode in which the front wheels are rotated at a speed twice as fast as the rear wheels and the one of the front wheels and the one of the rear wheels on the outside of the turn are rotated at a higher speed than the other of the front wheels and the other of the rear wheels on the inside of the turn, the automatic brake double-speed turn being a mode in which the front wheels are rotated at a speed twice as fast as the rear wheels and the other of the rear wheels on the inside of the turn is braked by the brake; and
the input interface is configured or programmed to receive input of the all-wheel-drive turn, the double-speed turn, or the automatic brake double-speed turn selectively as the turn mode.

7. The agricultural assistance system according to claim 4, further comprising a display to, during the automatic operation of the agricultural machine performed by the automatic operation controller, display the map, the travel route, the position of the agricultural machine, and the turn mode in which the agricultural machine turns.

8. The agricultural assistance system according to claim 4, further comprising the agricultural machine, wherein
the agricultural machine includes:
a vehicle body;
a connector to link a working device to the vehicle body;
a prime mover;
a traveling device including front wheels and rear wheels to be driven to cause the vehicle body to travel, the front wheels supporting left and right front portions of the vehicle body, the rear wheels supporting left and right rear portions of the vehicle body;
a transmission to transmit power from the prime mover to the traveling device and change a rotation speed of the front wheels and the rear wheels;
a brake to brake at least one of the front wheels and the rear wheels;
the controller;
the input interface;
the position detector; and
the automatic operation controller.

9. The agricultural machine according to claim 4, wherein the automatic operation controller is configured or programmed to, during the automatic operation of the agricultural machine, upon receipt of the change command, cause the agricultural machine to turn in the second turn mode indicated by the change command when time the agricultural machine turns in a next turn.

10. The agricultural assistance system according to claim 4, further comprising an agricultural assistance apparatus including a terminal; wherein
the agricultural assistance apparatus includes:
the controller; and
the input interface.

* * * * *